US012764330B2

(12) United States Patent
Oh

(10) Patent No.: US 12,764,330 B2
(45) Date of Patent: Oct. 13, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Hyunmook Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 18/579,774

(22) PCT Filed: Jul. 18, 2022

(86) PCT No.: PCT/KR2022/010452
§ 371 (c)(1),
(2) Date: Jan. 16, 2024

(87) PCT Pub. No.: WO2023/287265
PCT Pub. Date: Jan. 19, 2023

(65) Prior Publication Data
US 2024/0364924 A1 Oct. 31, 2024

(30) Foreign Application Priority Data
Jul. 16, 2021 (KR) ........................ 10-2021-0093745

(51) Int. Cl.
*G06K 9/00* (2022.01)
*G06T 17/00* (2006.01)
(Continued)

(52) U.S. Cl.
CPC ........... *H04N 19/597* (2014.11); *G06T 17/00* (2013.01); *H04N 19/139* (2014.11); *H04N 19/159* (2014.11); *H04N 19/513* (2014.11)

(58) Field of Classification Search
CPC .... G06T 17/00; H04N 19/139; H04N 19/159; H04N 19/51; H04N 19/513; H04N 19/54; H04N 19/597; H04N 19/96
See application file for complete search history.

(56) References Cited

U.S. PATENT DOCUMENTS

2017/0155914 A1* 6/2017 Jeon ..................... H04N 19/513
2019/0080483 A1* 3/2019 Mammou ............. G06T 3/4007
(Continued)

FOREIGN PATENT DOCUMENTS

KR 10-2019-0101574 9/2019
KR 10-2020-0065932 6/2020
(Continued)

OTHER PUBLICATIONS

Extended European Search Report in European Appln. No. 22842527.8, mailed on Jun. 2, 2025, 9 pages.
(Continued)

*Primary Examiner* — Hadi Akhavannik
(74) *Attorney, Agent, or Firm* — Fish & Richardson P.C.

(57) ABSTRACT

A point cloud data transmission method according to embodiments may comprise the steps of: encoding point cloud data; and transmitting signaling information and the encoded point cloud data, wherein the encoding of the point cloud data may include the steps of: dividing a tree structure including the point cloud data into one or more layer groups; acquiring motion vectors of each of the layer groups by performing motion estimation for each of the layer groups; and compressing the point cloud data by performing inter-prediction on the basis of the motion vectors of each of the layer groups.

8 Claims, 37 Drawing Sheets

(51) Int. Cl.

| | |
|---|---|
| ***H04N 19/139*** | (2014.01) |
| ***H04N 19/159*** | (2014.01) |
| ***H04N 19/513*** | (2014.01) |
| ***H04N 19/597*** | (2014.01) |

(56) References Cited

U.S. PATENT DOCUMENTS

| | | | | |
|---|---|---|---|---|
| 2020/0258262 | A1 | 8/2020 | Lasserre et al. | |
| 2020/0394822 | A1* | 12/2020 | Gao | G01S 17/89 |
| 2021/0005016 | A1* | 1/2021 | Oh | G06T 9/001 |
| 2021/0012539 | A1 | 1/2021 | Zhang et al. | |
| 2021/0166436 | A1* | 6/2021 | Zhang | H04N 19/90 |

FOREIGN PATENT DOCUMENTS

| | | |
|---|---|---|
| WO | WO 2020/010446 | 1/2020 |
| WO | WO 2020/262831 | 12/2020 |
| WO | WO 2021/049333 | 3/2021 |

OTHER PUBLICATIONS

Lasserre et al., "[PCC] Global motion compensation for point loud compression in TM3," m44751, International Organisation For Standardisation Organisation Internationale De Normalisation ISO/ IEC JTC 1/SC 29/WG 11 Coding Of Moving Pictures And Audio, Macau, China, Oct. 2018, 4 pages.

Lasserre et al., "m56271—The (early) history of the GPCC ETM," Motion Picture Expert Group, ISO/IEC JTC1/SC29/ WG11, Jan. 11-15, 2021, 30 pages.

Oh et al., "[G-PCC][EE13.44] Slice segmentation forspatial access," m55996, International Organisation For Standardisation Organisation Internationale De Normalisation ISO/IEC JTC 1/SC 29/WG 7 Coding Of Moving Pictures And Audio, Online, Jan. 2021, 5 pages.

Office Action in Korean Appln. No. 10-2021-0111966, mailed on May 22, 2024, 10 pages (with English translation).

International Search Report and Written Opinion in Appln. No. PCT/KR2022/010452, mailed on Oct. 26, 2022, 16 pages (with English translation).

* cited by examiner

FIG. 20
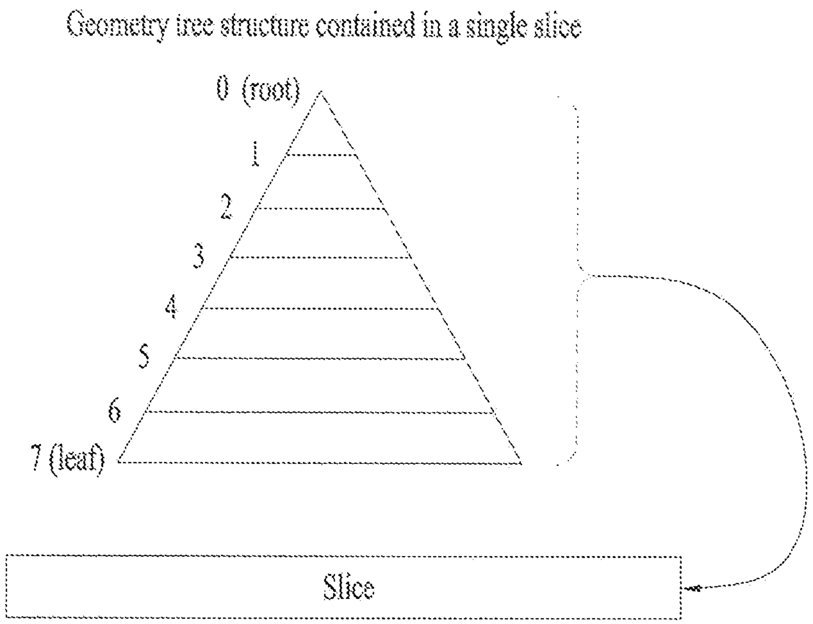
(a)
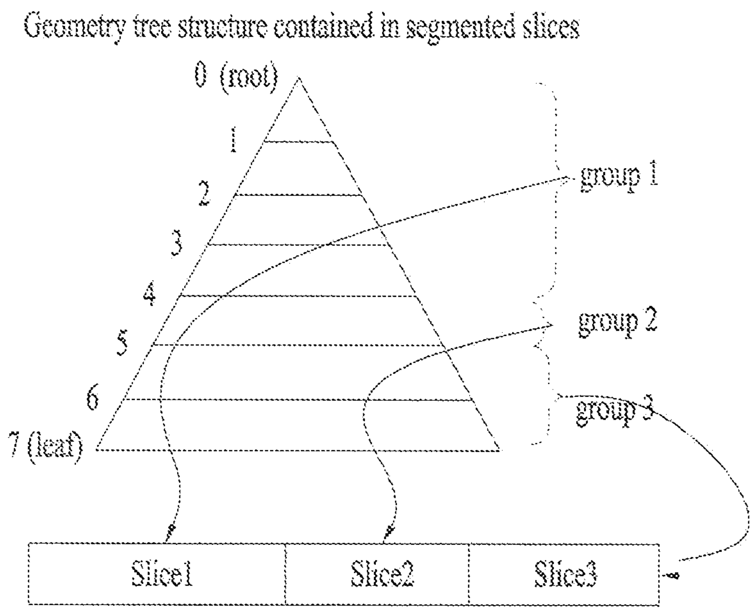
(b)

FIG. 29

| geometry_parameter_set ( ) { | Descriptor |
|---|---|
| ...... | |
| layer_group_enabled_flag | u(1) |
| if(layer_group_enabled_flag) { | |
| num_layer_groups_minus1 | u(8) |
| for(i=0; i<num_layer_groups_minus1; i++) { | |
| layer_group_id | u(8) |
| num_layers_minus1 | u(8) |
| subgroup_enabled_flag | u(1) |
| if(subgroup_enabled_flag) { | |
| num_subgroups_minus1 | u(8) |
| for (j=0; j<num_subgroups_minus1; j++) { | |
| subgroup_id | u(8) |
| subgroup_bbox_origin_bits_minus1 | ue(v) |
| subgroup_bbox_size_bits_minus1 | ue(v) |
| for(k=0;k<3; k++) { | |
| subgroup_bbox_origin | u(v) |
| subgroup_bbox_size | u(v) |
| } | |
| } | |
| } | |
| } | |
| } | |
| ...... | |
| } | |

FIG. 30

| geometry_data_unit( ) { | Descriptor |
|---|---|
| geometry_data_unit_header( ) | |
| if( geom_tree_type == 0 ) | |
| occupancy_tree( ) | |
| else if( geom_tree_type == 1 ) | |
| geometry_predtree_data( ) | |
| geometry_data_unit_footer( ) | |
| } | |

FIG. 31

| geometry_data_unit_header( ) { | Descriptor |
|---|---|
| gsh_geometry_parameter_set_id | u(4) |
| dependent_slice_flag | u(1) |
| gsh_reserved_zero_2bits | u(2) |
| gsh_slice_id | ue(v) |
| slice_tag | u(v) |
| frame_ctr_lsb | u(v) |
| if(! dependent_slice_flag) { | |
| … | |
| if(layer_group_enabled_flag) { | |
| layer_group_id | u(8) |
| num_points_bits_minus1 | ue(v) |
| num_points | u(v) |
| global_motion_vector | |
| } | |
| } | |
| else { | |
| if(layer_group_enabled_flag) { | |
| layer_group_id | u(8) |
| if(subgroup_enabled_flag[layer_group_id]) | |
| subgroup_id | u(8) |
| subgroup_bbox_origin_bits_minus1 | ue(v) |
| subgroup_bbox_size_bits_minus1 | ue(v) |
| for(i=0; i<3; i++) { | |
| subgroup_bbox_origin | u(v) |
| subgroup_bbox_size | u(v) |
| } | |
| ref_slice_id | ue(v) |
| ref_context_slice_id | ue(v) |
| if(subgroup_enabled_flag[layer_group_id]) { | |
| ref_subgroup_id | u(8) |
| num_points_bits_minus1 | ue(v) |
| num_points | u(v) |
| global_motion_vector | |
| local_motion_vector_present_flag | |
| if(local_motion_vetore_present_falg) { | |
| ref_frame_id | u(8) |
| mv_depth_start | u(8) |
| mv_depth_end | u(8) |
| } | |
| } | |
| } | |
| byte_alignment( ) | |
| } | |

FIG. 32

| data_unit ( ) { | Descriptor |
|---|---|
| ...... | |
| if(local+_motion_vector_present_falg) { | |
| for (i = mv_depth_start; i < maxDepth; i++) { | |
| for(j = all nodes in depth i) { | |
| if (i <= mv_depth_end && parentSplitFlag == 1) { | |
| split_flag[i][j] | u(1) |
| if(split_flag[i][j] == 0) { | |
| population_flag[i][j] | u(1) |
| if(population_flag[i][j] == 1) { | |
| for(k=0; k<3; k++) { | |
| motion_vector[i][j][k] | u(8) |
| residual[i][j][k] | u(8) |
| } | |
| } | |
| } | |
| } | |
| else { | |
| for(k=0; k<3; k++) | |
| residual[i][j][k] | u(8) |
| } | |
| } | |
| } | |
| } | |
| ...... | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2022/010452, filed on Jul. 18, 2022, which claims the benefit of Korean Application No. 10-2021-0093745, filed on Jul. 16, 2021. The disclosures of the prior applications are incorporated by reference in their entirety.

TECHNICAL FIELD

Embodiments relate to a method and apparatus for processing point cloud content.

BACKGROUND

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), XR (Extended Reality), and self-driving services. However, tens of thousands to hundreds of thousands of point data are required to represent point cloud content. Therefore, there is a need for a method for efficiently processing a large amount of point data.

DETAILED DESCRIPTION

Technical Solution

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for efficiently transmitting and receiving a geometry-point cloud compression (G-PCC) bitstream.

Another object of the present disclosure is to provide a point cloud data transmission device, a point cloud data transmission method, a point cloud data reception device, and a point cloud data reception method for performing transmission/reception of point cloud data through compression by applying an octree-based coding method so as to efficiently compress the point cloud data.

Another object of the present disclosure is to provide a point cloud data transmission device, a point cloud data transmission method, a point cloud data reception device, and a point cloud data reception method for increasing the compression efficiency of point cloud data by applying a similarity between different frames when the point cloud data is compressed based on an octree.

Another object of the present disclosure is to provide a point cloud data transmission device, a point cloud data transmission method, a point cloud data reception device, and a point cloud data reception method for increasing the compression efficiency of point cloud data in consideration of a layer group structure when the point cloud data is compressed based on an octree.

Objects of the present disclosure are not limited to the aforementioned objects, and other objects of the present disclosure which are not mentioned above will become apparent to those having ordinary skill in the art upon examination of the following description.

Technical Solution

According to embodiments, a method of transmitting point cloud data includes encoding point cloud data, and transmitting the encoded point cloud data and signaling information, wherein the encoding of the point cloud data includes segmenting a tree structure including the point cloud data into one or more layer groups, obtaining a motion vector of each layer group by performing motion estimation in units of layer groups, and compressing the point cloud data by performing inter prediction based on the motion vector of each layer group.

One of the one or more layer groups may include a consecutive portion of layers of the tree structure.

The performing of the motion estimation may include estimating motion by comparing a layer group of a previous frame and a layer group of a current frame, and the layer group of the previous frame and the layer group of the current frame may be at the same level.

The signaling information may include motion vector information of the one or more layer groups, and the motion vector information of a lower layer group of the one or more layer groups may include additional detail information for a motion vector of an upper layer group.

The segmenting of the layer group may include segmenting at least one layer group of the one or more layer groups into a plurality of sub-groups, and the layer group may include a plurality of layers, each sub-group includes a parent-child pair.

According to embodiments, a point cloud data transmission device includes an encoder configured to encode point cloud data, and a transmitter configured to transmit the encoded point cloud data and signaling information.

The encoder may include a group division configured to segment a tree structure including the point cloud data into one or more layer groups, a motion estimation configured to obtain a motion vector of each layer group by performing motion estimation in units of layer groups, and a compressor configured to compress the point cloud data by performing inter prediction based on the motion vector of each layer group.

One of the one or more layer groups may include a consecutive portion of layers of the tree structure.

The motion estimation may be configured to estimate motion by comparing a layer group of a previous frame and a layer group of a current frame, and the layer group of the previous frame and the layer group of the current frame may be at the same level.

The signaling information may include motion vector information of the one or more layer groups, and the motion vector information of a lower layer group of the one or more layer groups may include additional detail information for a motion vector of an upper layer group.

The group division may be configured to segment at least one layer group of the one or more layer groups into a plurality of sub-groups, and when the layer group includes a plurality of layers, each sub-group may include a parent-child pair.

According to embodiments, a point cloud data reception method includes receiving point cloud data and signaling information, decoding the point cloud data based on the signaling information, and rendering the decoded point cloud data.

The decoding of the point cloud data may be performed based on motion vector information of one or more layer groups included in the signaling information.

One of the one or more layer groups may include a consecutive portion of layers of the tree structure.

Motion vector information of a lower layer group of the motion vector information of the one or more layer groups included in the signaling information may include additional detail information for a motion vector of an upper layer group.

The decoding of the point cloud data may include restoring the motion vector of the lower layer group by adding the motion vector information of the lower layer group to the motion vector information of the upper layer group.

The signaling information may include information related to a plurality of sub-groups segmented from at least one layer group of the one or more layer groups.

Advantageous Effects

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as a self-driving service (or an autonomous driving service).

A point cloud data transmission method, a point cloud data transmission device, a point cloud data reception method, and a point cloud data reception device according to embodiments may perform space-adaptive partition of point cloud data for independent encoding and decoding of the point cloud data, thereby improving parallel processing and providing scalability.

A point cloud data transmission method, a point cloud data transmission device, a point cloud data reception method, and a point cloud data reception device according to embodiments may perform encoding and decoding by partitioning the point cloud data in units of tiles and/or slices, and signal necessary data therefore, thereby improving encoding and decoding performance of the point cloud.

A point cloud data transmission method, a point cloud data transmission device, a point cloud data reception method, and a point cloud data reception device according to embodiments may improve compression efficiency of point cloud data by applying an inter prediction-based coding method to an octree-based layer group structure.

A point cloud data transmission method and a point cloud data transmission device according to embodiments may increase the compression efficiency of point cloud data by segmenting a motion vector according to a layer group and transmitting additional detail information.

A point cloud data transmission method, a point cloud data transmission device, a point cloud data reception method, and a point cloud data reception device according to embodiments may improve bit efficiency by using only some bits of a motion vector in a situation of skipping a layer group by segmenting a motion vector according to a layer group and transferring added detail information (e.g., a difference value in a motion vector).

A point cloud data transmission method and a point cloud data transmission device according to embodiments may efficiently compress point cloud data by additionally considering a data prediction mode between frames as well as inter-frame prediction. Similarly, a point cloud data reception method and a point cloud data reception device according to embodiments may receive a bitstream including point cloud data and efficiently restore point cloud data based on signaling information in the bitstream and a decoding operation according to embodiments.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 20(*a*) illustrates an example in which a geometry tree (e.g. octree) structure is not segmented into a plurality of layer groups, according to embodiments.

FIG. 20(*b*) illustrates an example in which a geometry tree structure is segmented into a plurality of layer groups.

FIG. 21(*b*) illustrates an example in which a specific layer group is segmented into a plurality of sub-groups in an attribute tree structure according to embodiments.

FIG. 29 shows an example of a syntax structure of a geometry parameter set according to an embodiment.

FIG. 30 is a diagram showing an example of a syntax structure of geometry data unit according to embodiments.

FIG. 31 is a diagram showing an example of a syntax structure of a geometry data unit header according to embodiments.

FIG. 32 is a diagram showing an example of a syntax structure of a data unit according to embodiments.

BEST MODE

Figure 1:
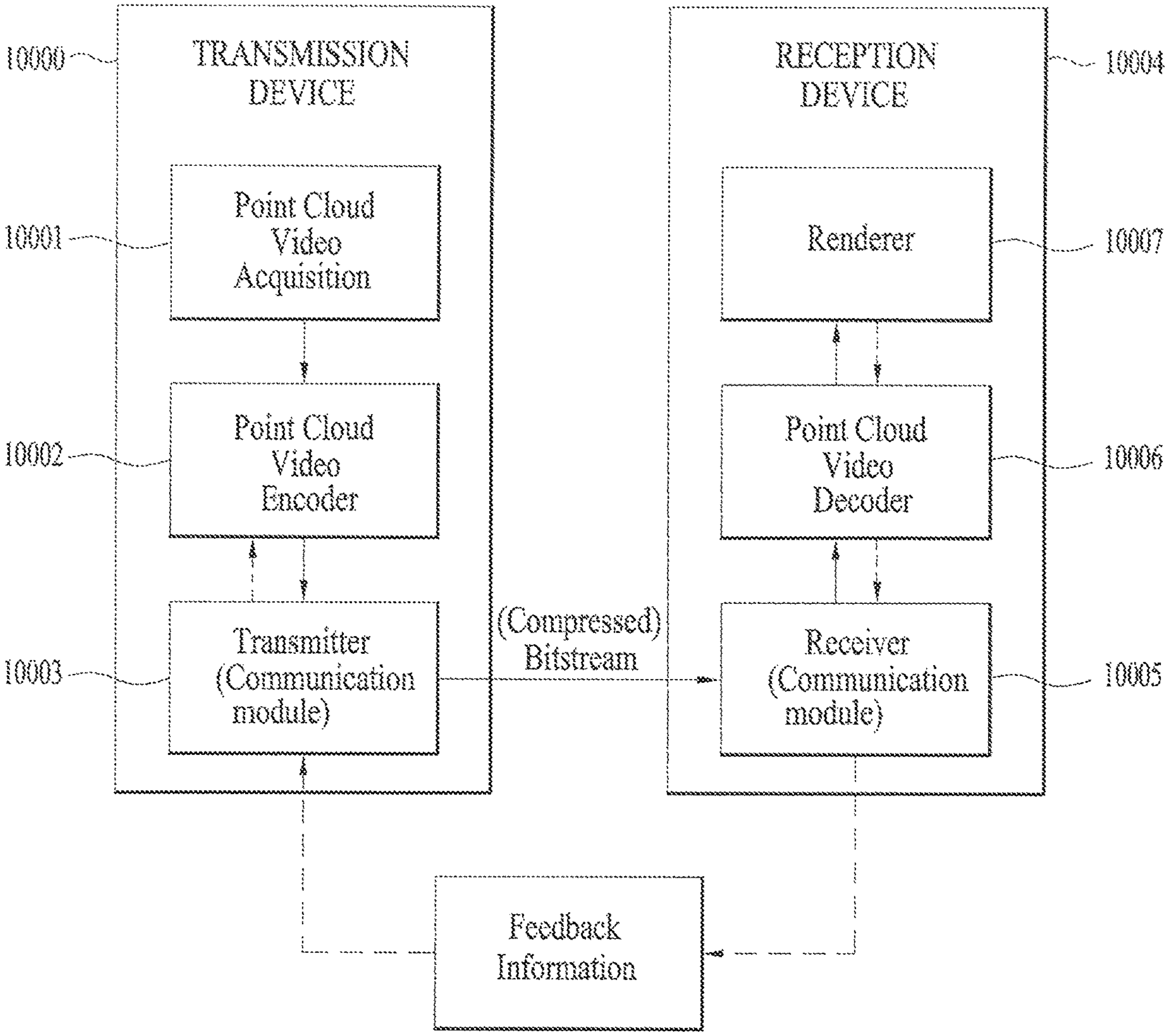
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present disclosure belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation.

The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like).

The dotted lines in FIG. 1 represent a process of transmitting the feedback information secured by the renderer 10007. The point cloud content providing system may process (encode/decode) point cloud data based on the feedback information. Accordingly, the point cloud video decoder 10006 may perform a decoding operation based on the feedback information. The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
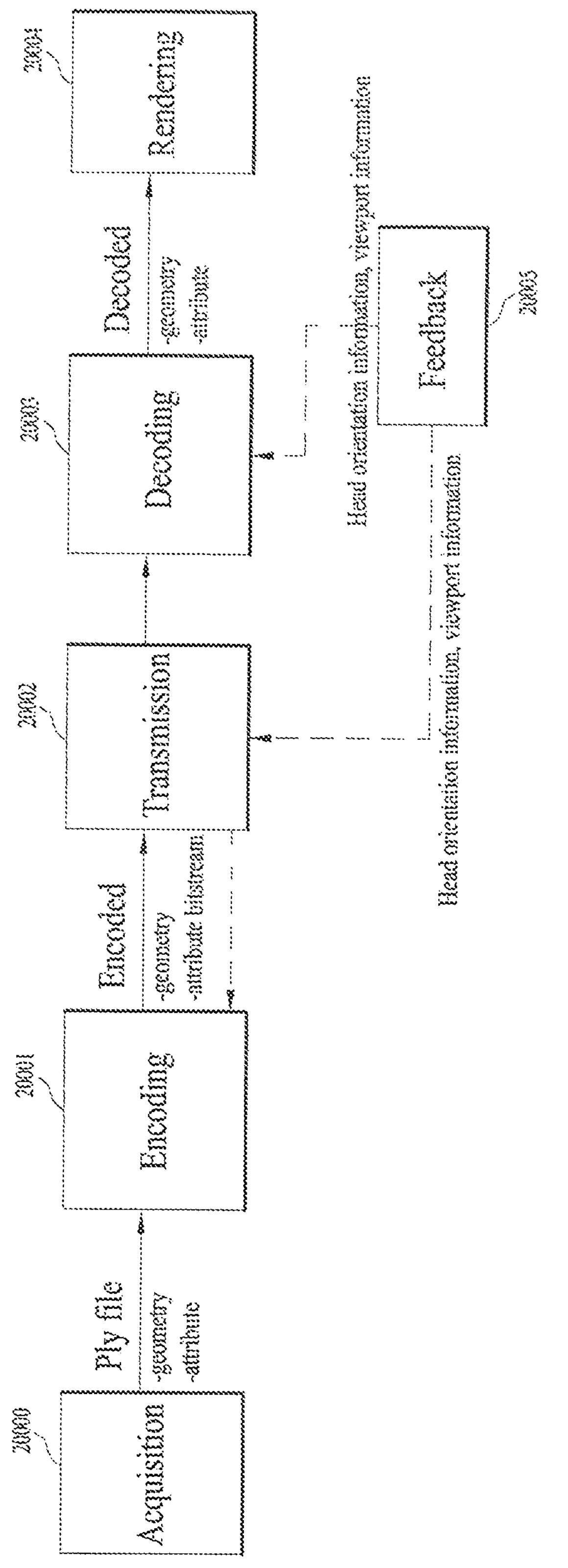
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquisition unit 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
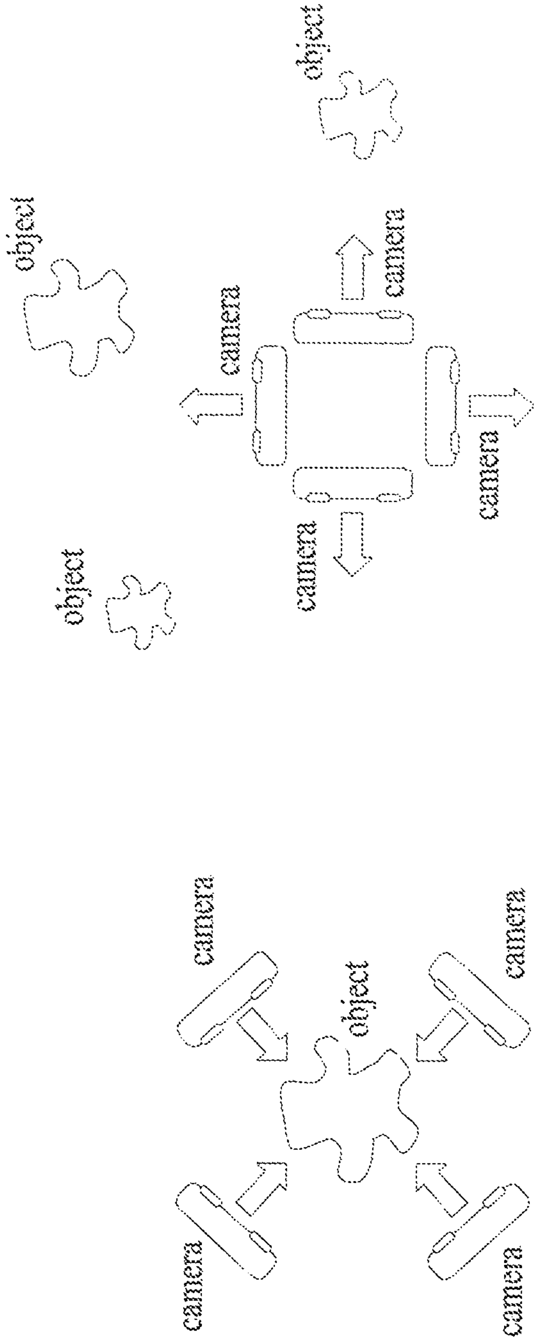
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
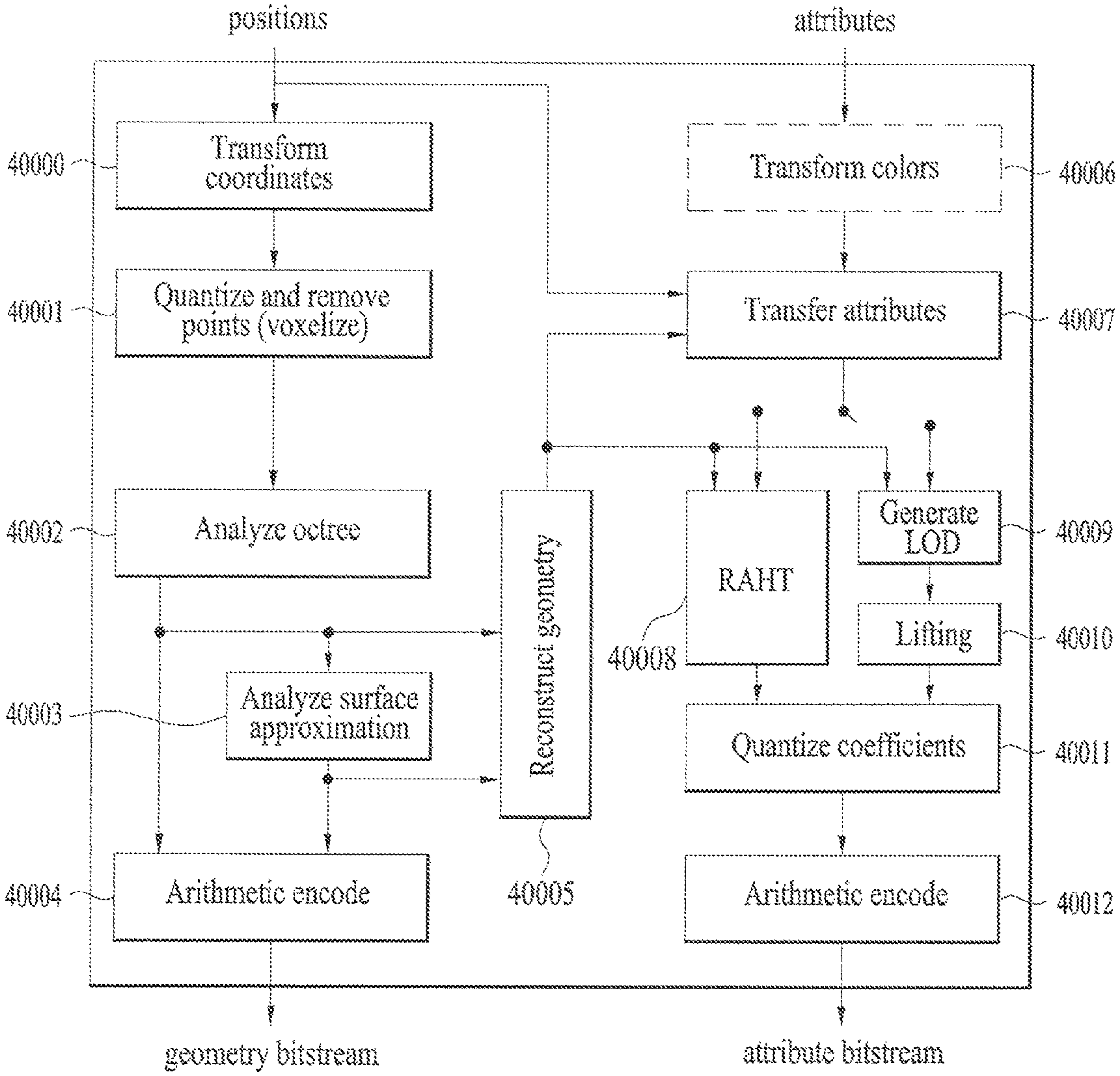
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space. Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (e.g., from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
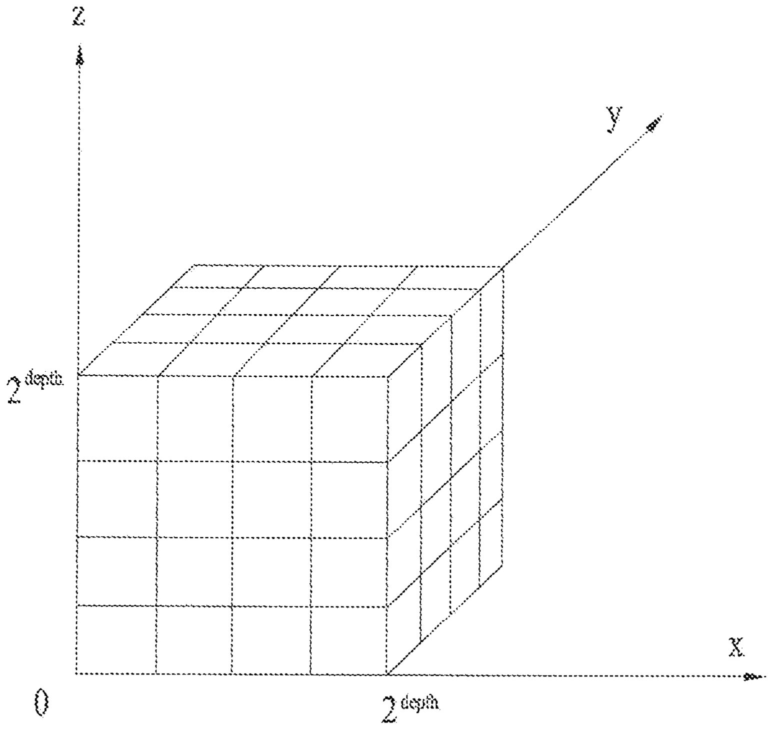
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
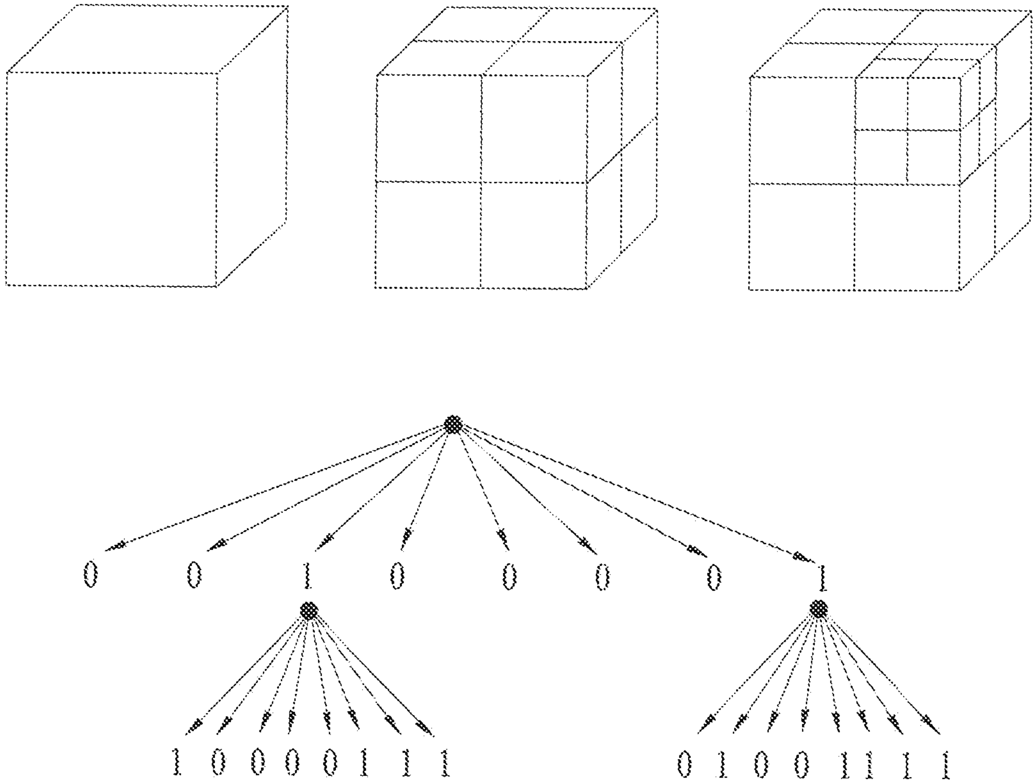
FIG. 6 illustrates an example of octree and occupancy code according to embodiments.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x^{int}_n$, $y^{int}_n$, $z^{int}_n$) denotes the positions (or position values) of quantized points.

$$d = \mathrm{Ceil}\left(\mathrm{Log2}\left(\mathrm{Max}\left(x_n^{int}, y_n^{int}, z_n^{int}, n = 1, \dots , N\right) + 1\right)\right) \quad \text{[Equation 1]}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (e.g., the arithmetic encoder 40004) according to the embodiments may perform entropy encoding on the occupancy codes. In order to increase the compression efficiency, the point cloud video encoder may perform intra/inter-coding on the occupancy codes. The reception device (e.g., the reception device 10004 or the point cloud video decoder 10006) according to the embodiments reconstructs the octree based on the occupancy codes.

The point cloud video encoder (e.g., the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud video encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

[Equation 2]

$$① \begin{bmatrix}\mu_x\\ \mu_y\\ \mu_z\end{bmatrix} = \frac{1}{n}\sum_{i=1}^{n}\begin{bmatrix}x_i\\ y_i\\ z_i\end{bmatrix}$$

$$② \begin{bmatrix}\bar{x}_i\\ \bar{y}_i\\ \bar{z}_i\end{bmatrix} = \begin{bmatrix}x_i\\ y_i\\ z_i\end{bmatrix} - \begin{bmatrix}\mu_x\\ \mu_y\\ \mu_z\end{bmatrix}$$

$$③ \begin{bmatrix}\sigma_x^2\\ \sigma_y^2\\ \sigma_z^2\end{bmatrix} = \sum_{i=1}^{n}\begin{bmatrix}\bar{x}_i^2\\ \bar{y}_i^2\\ \bar{z}_i^2\end{bmatrix}$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of θ. Table 1 below shows a combination of vertices for creating a triangle according to the number of the vertices. The vertices are ordered from 1 to n. Table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

[Table 1] Triangles formed from vertices ordered 1, . . . , n

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

Figure 7:
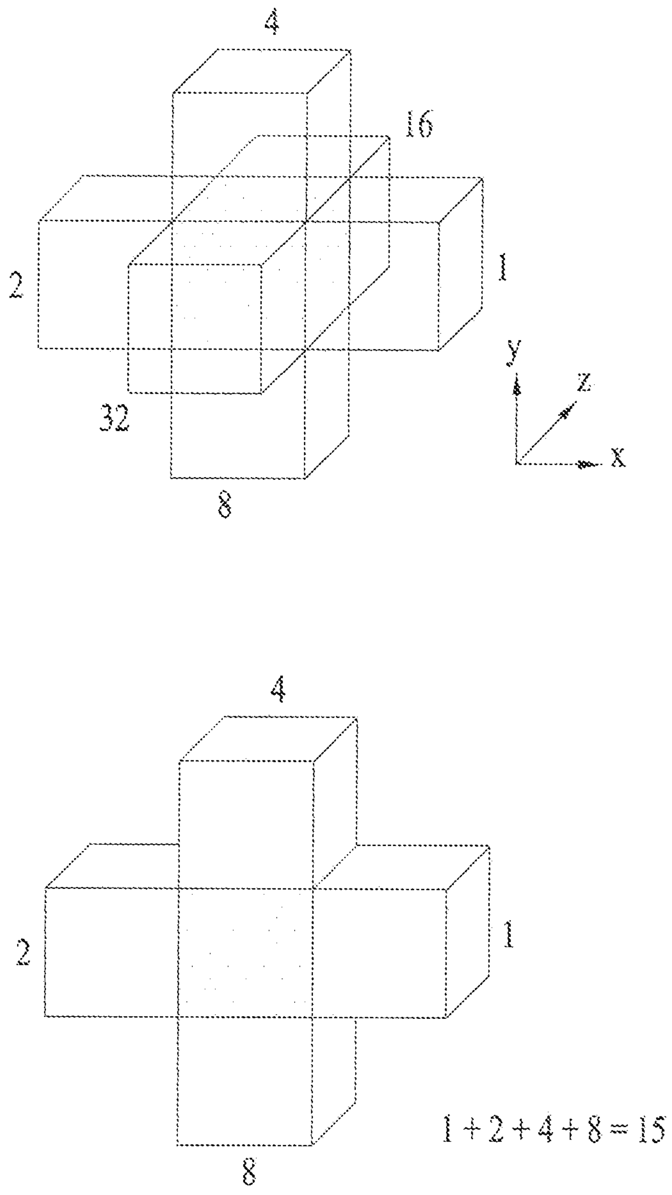
FIG. 7 illustrates an example of a neighbor node pattern according to embodiments.

FIG. 7 shows an example of a neighbor node pattern according to embodiments.

In order to increase the compression efficiency of the point cloud video, the point cloud video encoder according to the embodiments may perform entropy coding based on context adaptive arithmetic coding.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (based on, for example, a table by which 64 is changed to 10 or 6).

Figure 8:
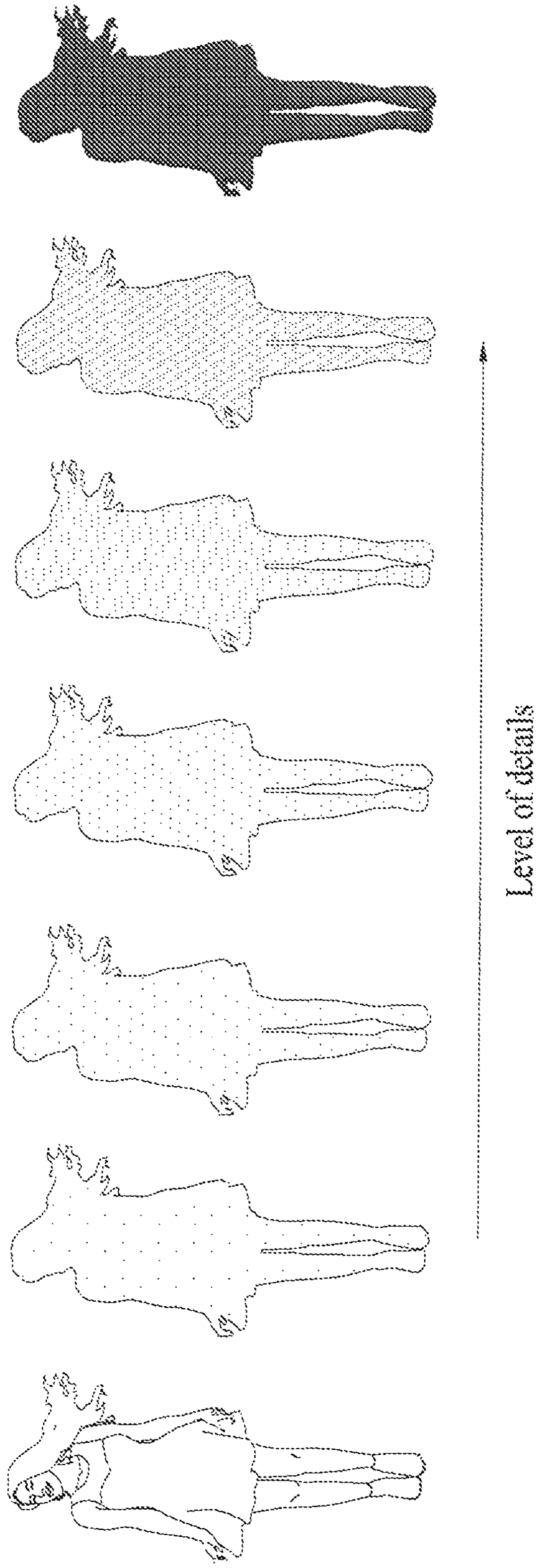
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (e.g., the LOD generator 40009) may classify (reorganize or group) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
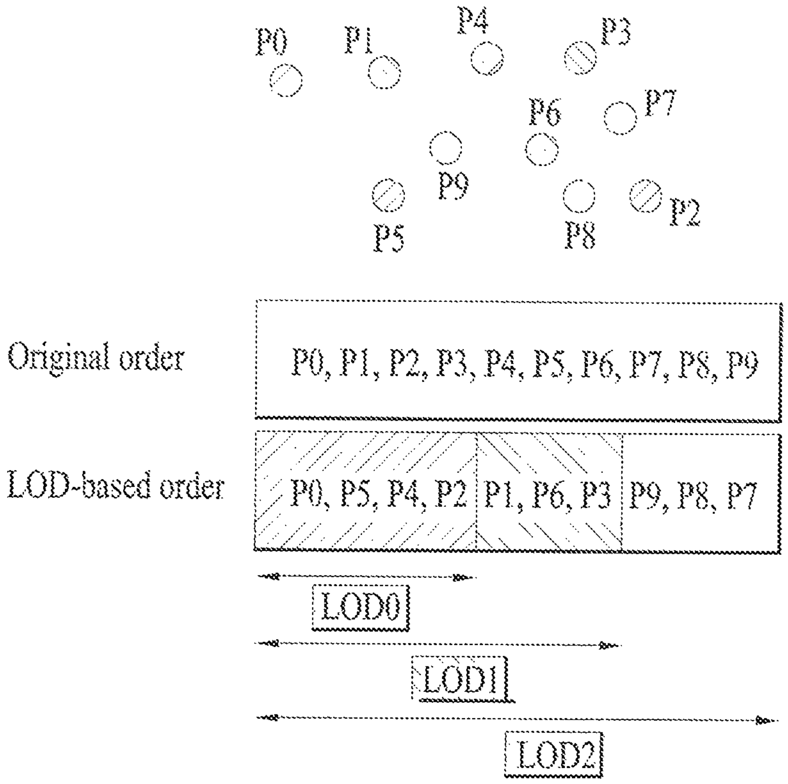
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (e.g., the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (e.g., the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in Table 3.

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 3

```
int PCCInverseQuantization(int value, int quantStep) {
if( quantStep == 0) {
return value;
} else {
return value * quantStep;
}
```

When the predictor of each point has neighbor points, the point cloud video encoder (e.g., the arithmetic encoder 40012) according to the embodiments may perform entropy coding on the quantized and inversely quantized residual attribute values as described above. When the predictor of each point has no neighbor point, the point cloud video encoder according to the embodiments (e.g., the arithmetic encoder 40012) may perform entropy coding on the attributes of the corresponding point without performing the above-described operation.

The point cloud video encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level $l \cdot g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

[Equation 3]

$$\begin{bmatrix} g_{l-1_{x,y,z}} \\ h_{l-1_{x,y,z}} \end{bmatrix} = T_{w1w2}\begin{bmatrix} g_{l_{2x,y,z}} \\ g_{l_{2x+1,y,z}} \end{bmatrix} T_{w1w2} = \frac{1}{\sqrt{w1+w2}}\begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 40012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as Equation 4.

[Equation 4]

$$\begin{bmatrix} gDC \\ h_{0_{0,0,0}} \end{bmatrix} = T_{w1000w1001}\begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
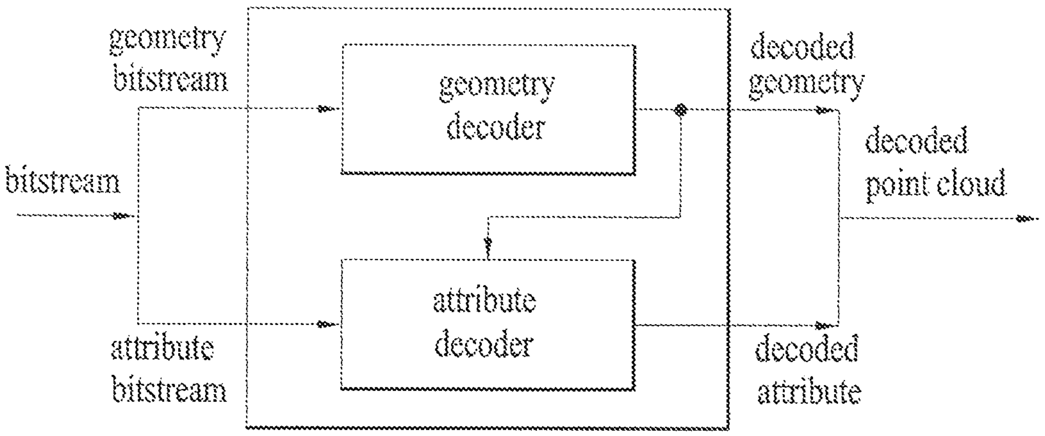
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
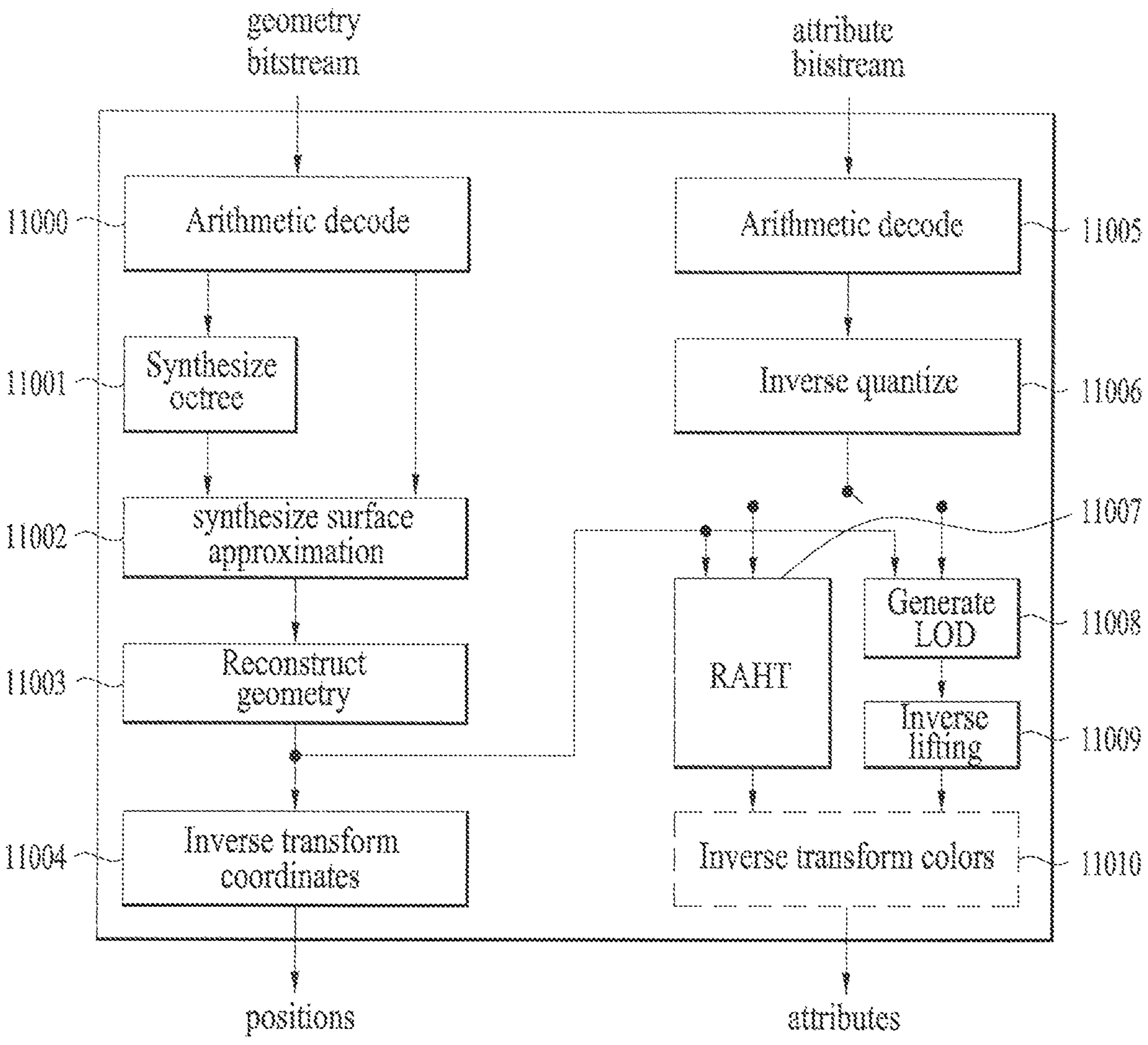
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is the reverse of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as the reverse of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
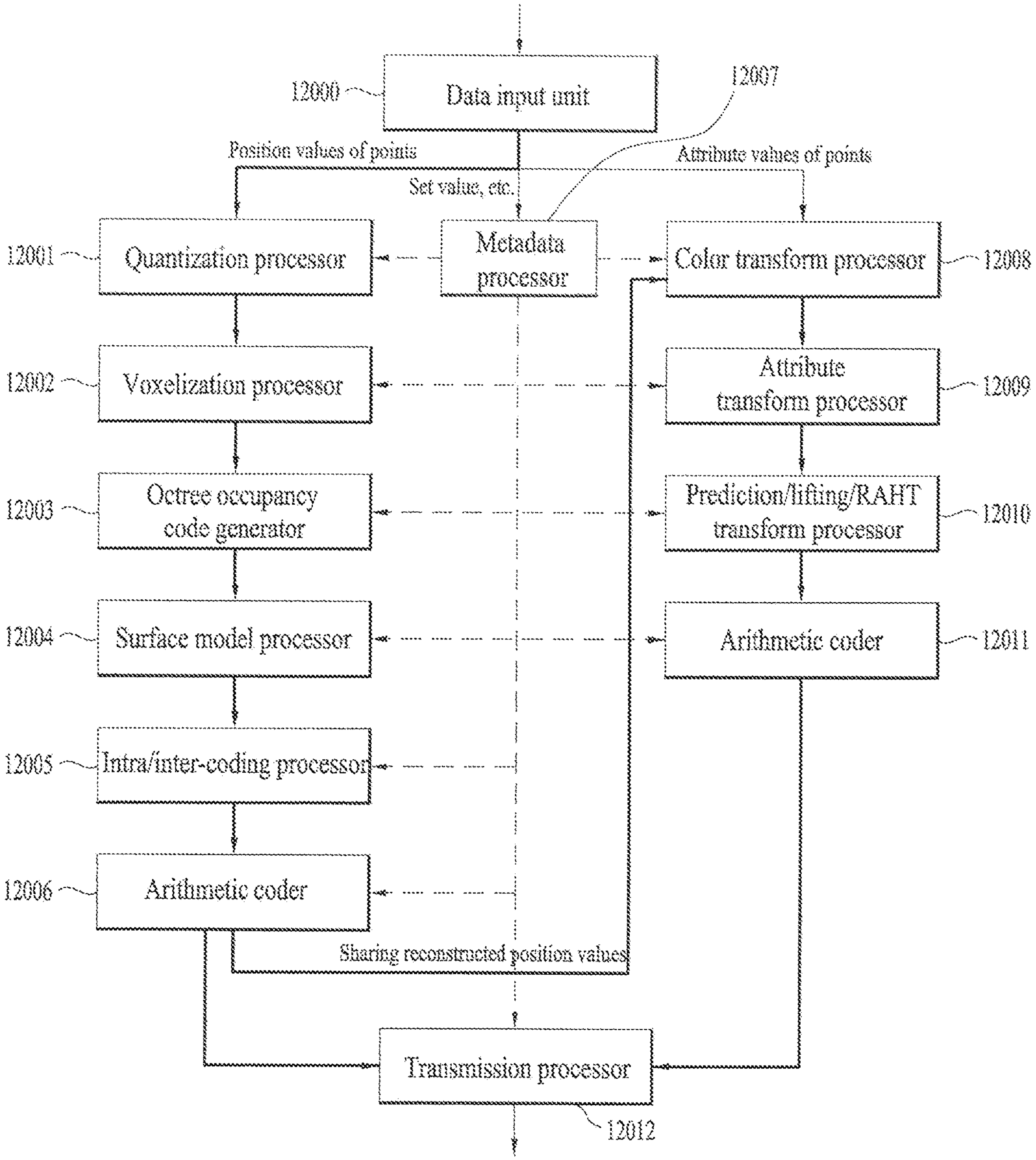
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream $Geom0^0$ and one or more attribute bitstreams Attr00 and Attr10.

The slice is a series of a syntax element representing in whole or in part of the coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
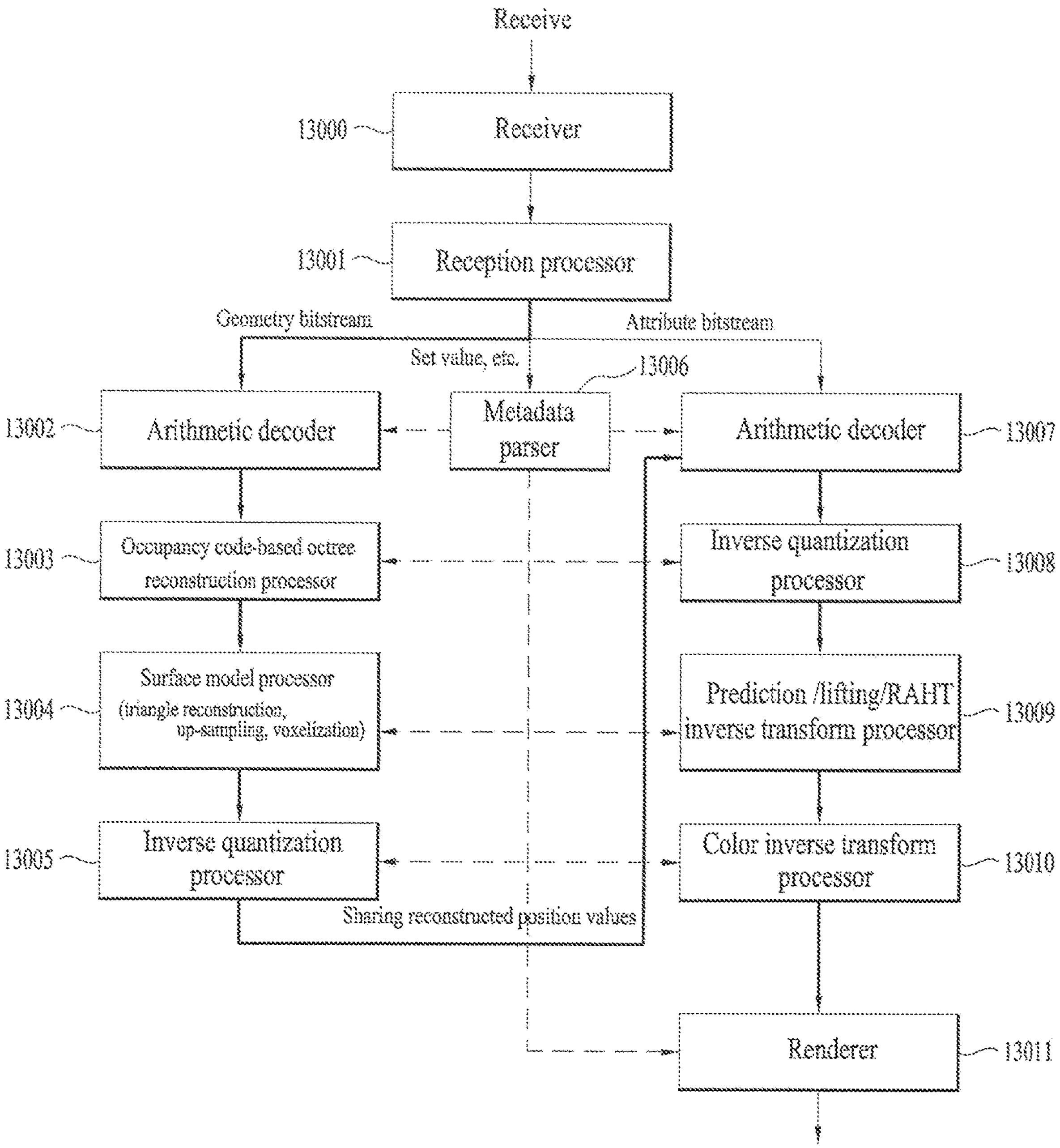
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform the reverse of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
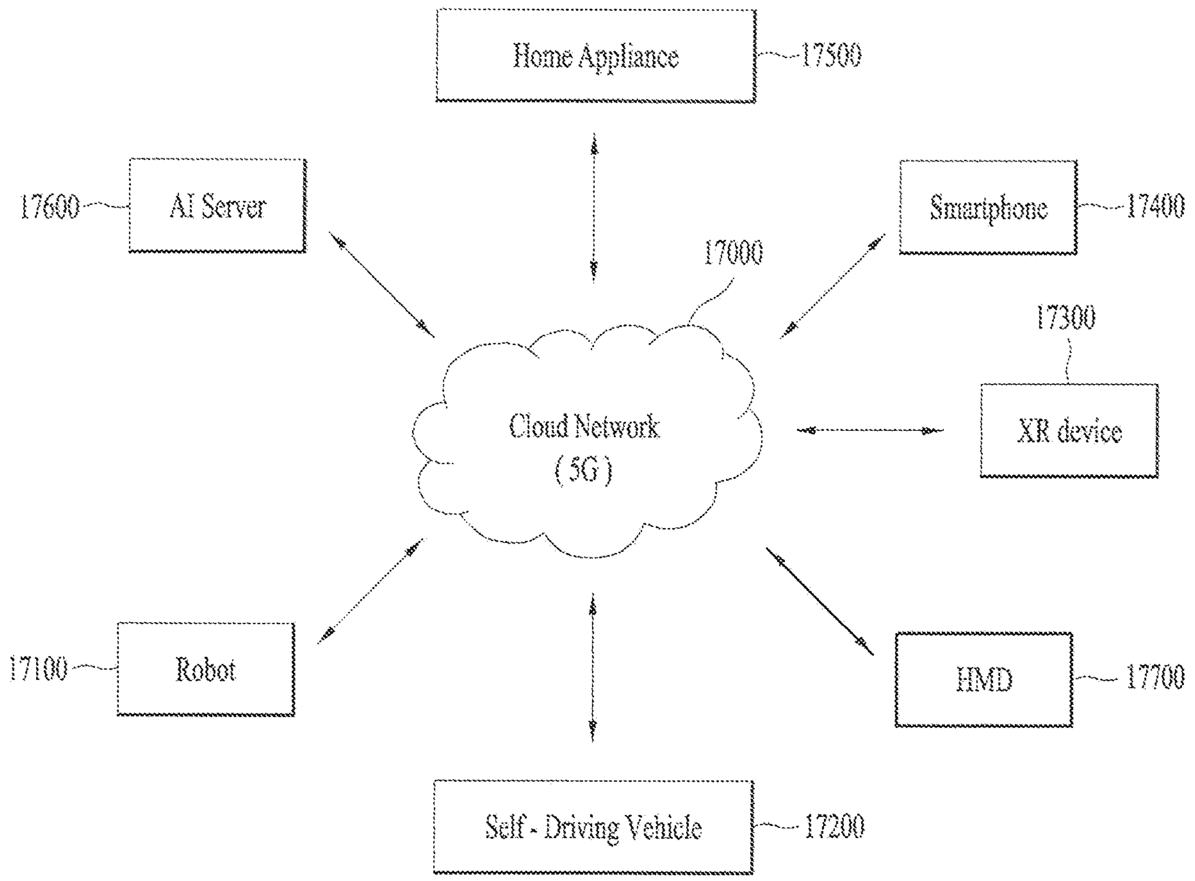
FIG. 14 illustrates an exemplary structure operatively connectable with a method/device for transmitting and receiving point cloud data according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17000. The robot 17100, the self-driving vehicle 17200, the XR device 17300, the smartphone 17400, or the home appliance 17500 is referred to as a device. In addition, the XR device 17300 may correspond to a point cloud compression data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

< *PCC* + *XR* >

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

< *PCC* + Self−driving + *XR* >

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, the point cloud data may include a set of points, and each point may have a geometry (referred to also as geometry information) and an attribute (referred to as attribute information). The geometry information represents three-dimensional (3D) position information (xyz) of each point. That is, the position of each point is represented by parameters in a coordinate system representing a 3D space (e.g., parameters (x, y, z) of three axes, X, Y, and Z axes, representing a space). The attribute information represents color (RGB, YUV, etc.), reflectance, normal vectors, transparency, etc. of the point.

According to embodiments, a point cloud data encoding process includes compressing geometry information based on an octree, a trisoup, or prediction and compressing attribute information based on geometry information reconstructed (or decoded) with position information changed through compression. A point cloud data decoding process includes receiving an encoded geometry bitstream and an encoded attribute bitstream, decoding geometry information based on an octree, a trisoup, or prediction, and decoding attribute information based on geometry information reconstructed through a decoding operation.

The present disclosure aims to improve compression efficiency in compressing point cloud data based on octree by removing redundant information based on correlation between frames.

The present disclosure aims to improve compression efficiency by reflecting the similarity of information between different frames in compressing point cloud data based on octree.

In other words, according to the present disclosure, when point cloud data is composed of consecutive frames, high coding efficiency may be achieved by removing redundant information based on high correlation between neighboring frames.

The present disclosure uses a coding method based on a correlation between frames as a method for efficiently compressing and servicing point cloud data. In this case, the compression efficiency may be increased via prediction based on motion information when position information is compressed.

According to embodiments, the geometry encoder constructs an octree based on the positions of the input points and performs geometry compression based on the octree. The prediction for geometry compression may be performed within a frame, or may be performed between frames. In the present disclosure, the former is referred to as intra-frame prediction and the latter is referred to as inter-frame prediction. That is, geometry coding based on intra-frame prediction is performed based on the similarity between points within the current frame. When point cloud data is composed of consecutive frames, the correlation between neighboring frames is high. If only intra-based geometry compression is performed without considering this feature, the efficiency of geometry coding decreases.

Therefore, in one embodiment of the present disclosure, an inter-prediction based geometry coding method is applied when the point cloud data is composed of consecutive frames.

In particular, when the point cloud data includes consecutive frames and has a hierarchical slice structure through layer group slicing, reference between layers may be difficult.

The present disclosure proposes a method for applying inter prediction to a frame having a hierarchical slice structure through layer group slicing.

That is, according to an embodiment of the present disclosure, an inter prediction-based coding method is applied to an octree-based layer group structure. In other words, point cloud data may be configured in an octree structure having a layer according to a degree of detail, and scalable point cloud data coding and representation may be performed based on the point cloud data. In the present disclosure, the layer group structure may be referred to as a layer group slicing structure or a hierarchical slicing structure.

The present disclosure proposes a position compression method based on motion estimation and motion compensation considering a layer group structure when inter-prediction-based geometry coding is performed.

In this case, global motion estimation and compensation (global MEMC) may be performed on the uppermost layer group, thereby increasing a compression speed and shortening the time.

Local motion estimation and compensation (local MEMC) is performed on a sub-group division intermediate layer group.

Accordingly, it may be possible to use a correlation between frames in a situation of partial decoding by giving a relationship between layer groups of consecutive frames.

According to the present document, a motion vector may be segmented according to a layer group and added detail information instead of the motion vector itself may be transmitted, and thus only some bits of the motion vector may be used in a situation of layer group skip, thereby increasing bit efficiency. According to an embodiment, the motion vector is a global motion vector and/or a local motion vector.

That is, according to the present document, a motion vector for each layer group may be obtained in an octree-based layer group structure to hierarchically increase the accuracy of motion and a difference value between a parent sub-group and a motion vector of a child sub-group may be transmitted, and thus compression efficiency of point cloud data may be improved. According to an embodiment, the motion vector is a global motion vector and/or a local motion vector.

In the present disclosure, a layer group may be referred to as a group, and a layer sub-group may be referred to as a sub-group. Also, a layer group that is not segmented into a plurality of sub-groups may be referred to as a sub-group. That is, when the layer group is not segmented into sub-groups, the layer group is interpreted to have the same meaning as the sub-group.

A method/apparatus for transmitting and receiving point cloud data according to embodiments may be referred to as a method/apparatus according to embodiments.

Figure 25:
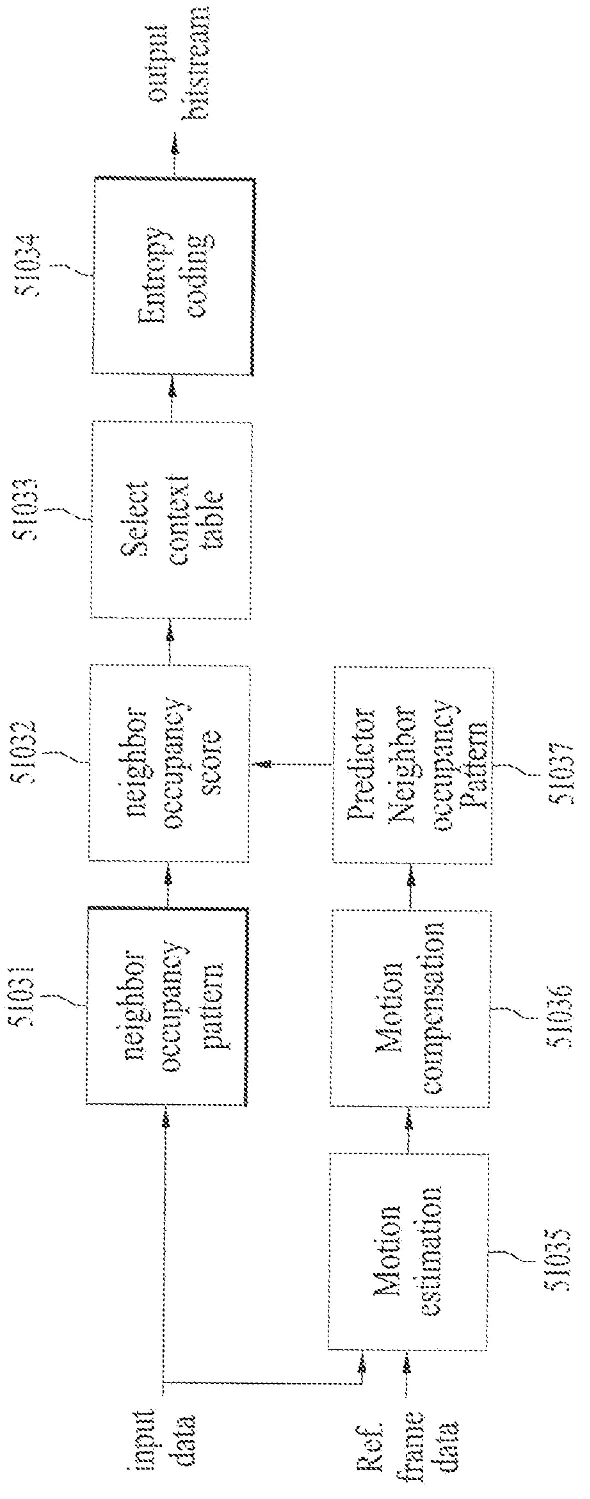
FIG. 25 is a diagram illustrating another example of a point cloud transmission device according to embodiments.

The point cloud data transmission method/apparatus according to embodiments is interpreted as a term indicating the transmission device 10000 of FIG. 1, the point cloud video encoder 10002, the transmitter 10003, the acquisition-encoding-transmission 20000-20001-20002 of FIG. 2, the point cloud video encoder of FIG. 4, the transmission device of FIG. 12, the device of FIG. 14, the transmission device of FIG. 25, and the like.

Figure 33:
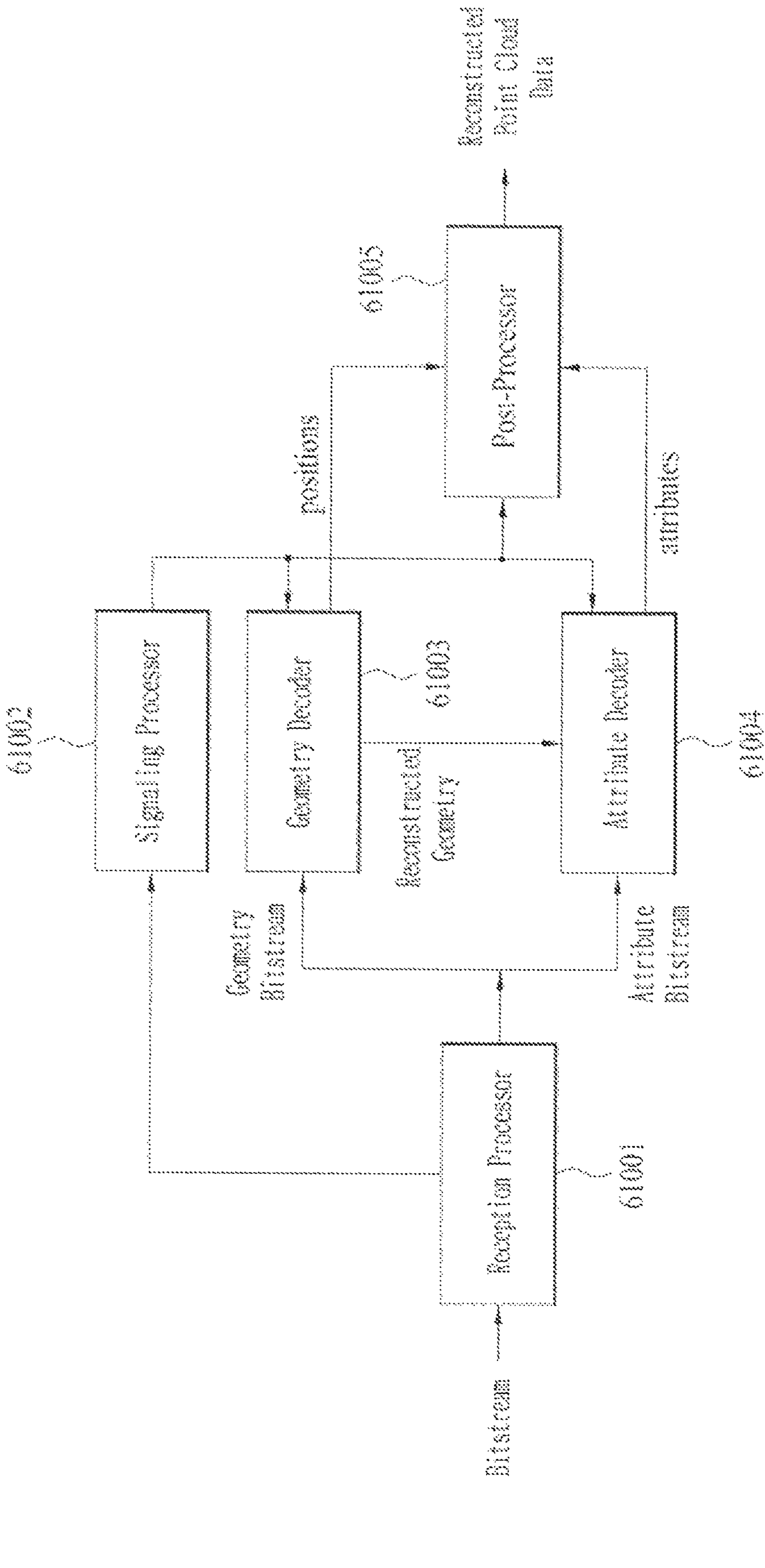
FIG. 33 is a diagram showing another example of a point cloud data reception device according to embodiments.

The point cloud data reception method/apparatus according to embodiments is interpreted as a term indicating the reception device 10004, the receiver 10005, the point cloud video decoder 10006 of FIG. 1, the transmission-decoding-rendering 20002-20003-20004 of FIG. 2, the decoder of FIG. 10, the point cloud video decoder of FIG. 11, the device of FIG. 14, the reception device of FIG. 33, and the like.

Figure 26:
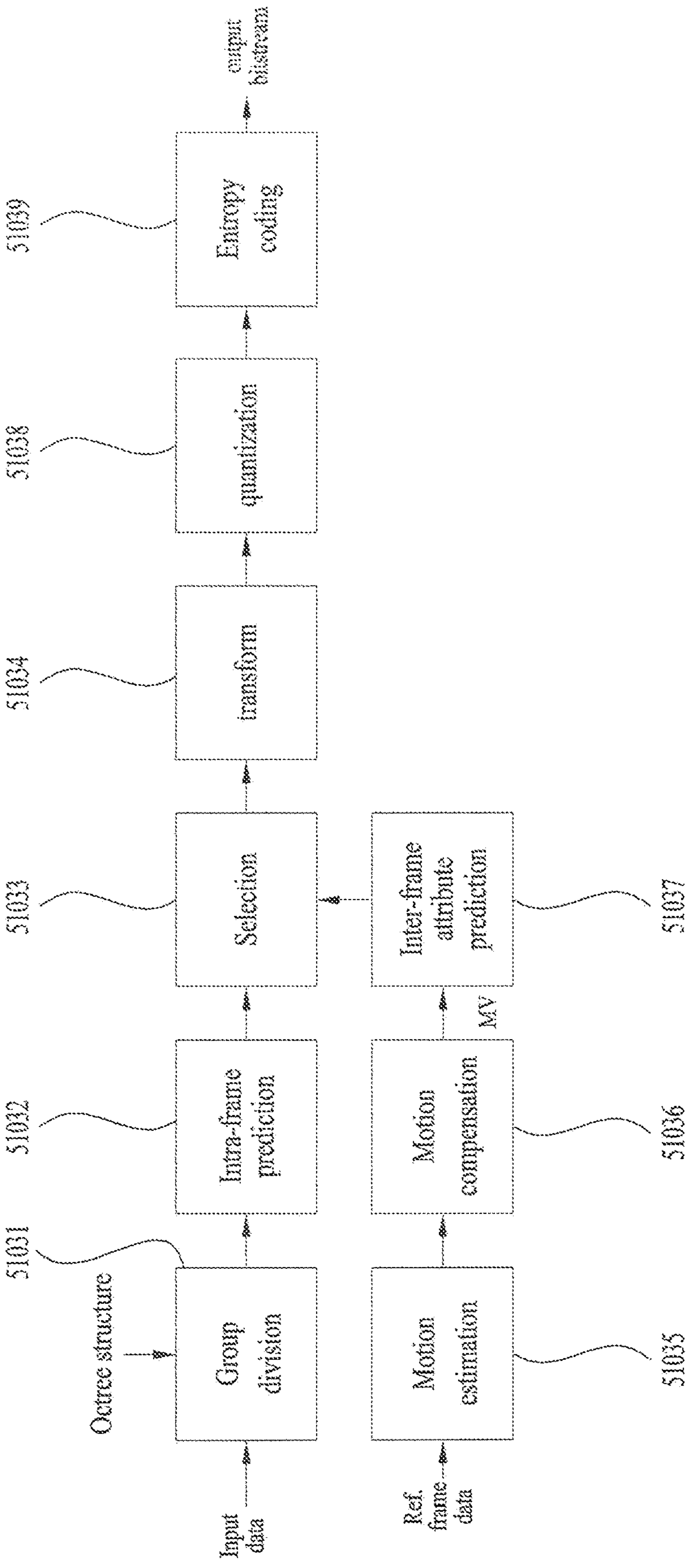
FIG. 26 illustrates an example of a detailed block diagram of a geometry encoder according to embodiments.
Figure 27:
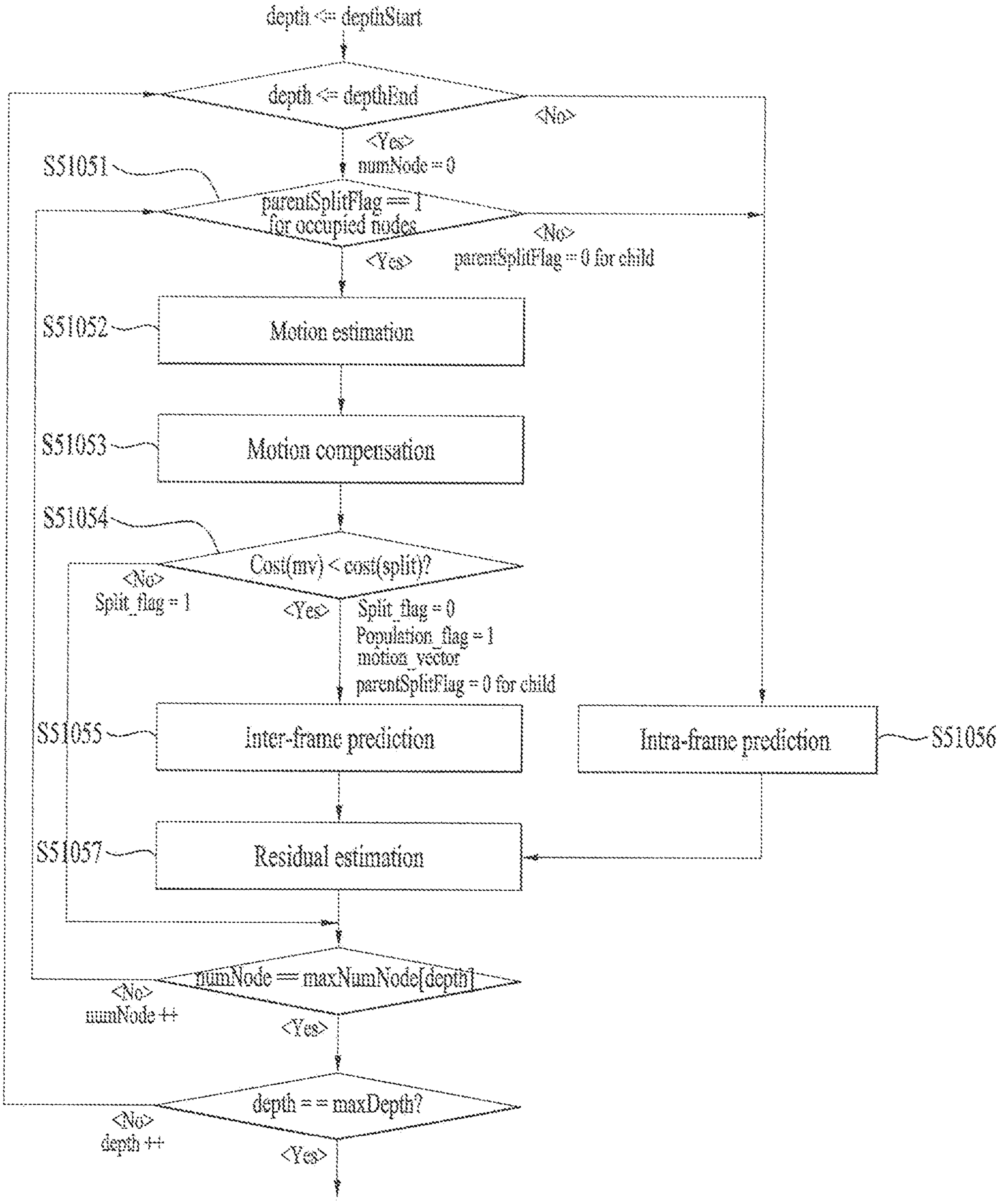
FIG. 27 is a flowchart illustrating an example of a process of encoding geometry information in an octree-based layer group structure according to embodiments.

According to embodiments, the encoding process of the point cloud data may be performed in the point cloud video encoder 10002 of FIG. 1, the encoding 20001 of FIG. 2, the point cloud video encoder of FIG. 4, the point cloud video encoder of FIG. 12, the geometry encoder 51003 of FIG. 25, the geometry encoder of FIG. 26, or the geometry encoding process of FIG. 27. The decoding process of point cloud data according to embodiments may be performed in the point cloud video decoder 10006 of FIG. 1, the decoding 200003 of FIG. 2, the point cloud video decoder of FIG. 11, the point cloud video decoder of FIG. 13, a geometry decoder 61003 of FIG. 33, the geometry decoder of FIG. 34, or the geometry decoding process of FIG. 35. The detailed description of FIGS. 25 to 27 and FIGS. 33 to 35 will be described later.

In some embodiments, geometry data, geometry information, position information, and the like constituting the point cloud data are interpreted to have the same meaning. Attribute data, attribute information, and attribute information constituting the point cloud data are interpreted to have the same meaning.

The following is a detailed description of a method for increasing compression efficiency of point cloud data through inter prediction in an octree-based layer group structure.

According to embodiments, inter prediction is to predict all or part of a current frame by using information having a high similarity to a current frame from a frame on which coding is performed. Inter prediction is a prediction scheme using motion between multiple frames obtained over time and may be performed through motion vector estimation or motion estimation.

In this case, the motion estimation may be segmented into global motion estimation for calculating a motion vector by rotating, moving, enlarging and/or reducing the entire frame, and local motion estimation for predicting a partial region of the frame or a motion of an object.

That is, inter prediction calculates the motion vector based on a similarity between point cloud data of a reference frame and the point cloud data of the current frame, and predicts the point cloud data of the current frame using the motion vector.

According to embodiments, to perform compression of point cloud data between frames, a prediction unit (PU) and a predictor are defined.

According to embodiments, the PU is defined in a current frame, and the predictor is defined in the reference frame (e.g. a previous frame).

In the present disclosure, the PU may be defined as a set of adjacent nodes at a specific depth of an octree of a current frame. That is, the PU may be defined as a coding unit including a compression target node in the current frame. In this case, the PU may be configured as one compression target node or a set of nodes belonging to a predetermined range. In the latter case, the PU may be defined as a set of nodes having the same parent.

In the present disclosure, the predictor may be defined as a prediction unit having a range corresponding to a PU of a previous frame. In other words, the predictor may be defined as information in the reference frame that is found based on the motion estimation. That is, a set of nodes having the most similar characteristic to the PU of the current frame within a search window (or range) of the reference frame may be defined as a predictor. Here, the prediction node may be defined as a node having a high similarity to a compression target node among nodes belonging to the predictor.

In the present disclosure, the predictor is interpreted to have the same meaning as a predictor P. The node may include at least one point. That is, geometry coding may proceed to a root→leaf, and a coding unit in a specific layer within a range from the root to the leaf may be defined as a node. Each node is split into one or more nodes when the geometry coding layer increases, and a node in a leaf layer is matched to a point.

According to embodiments, a motion between frames may be defined in a 3D space such as X, Y, and Z, and a motion between frames may be defined as a global motion vector.

Alternatively, there may be different motions in the frame locally, which may be defined as a local motion vector.

According to embodiments, in a layer group slicing structure, a motion between a layer group of a previous frame and a layer group of a current frame may be defined as a global motion vector. According to an embodiment, the layer group of the previous frame and the layer group of the current frame are at the same group level. Alternatively, there may be different motions in the layer group locally, which may be defined as a local motion vector.

According to embodiments, in the layer group slicing structure, a motion between the sub-group of the previous frame and the sub-group of the current frame may be defined as the global motion vector. According to an embodiment, the sub-group of the previous frame and the sub-group of the current frame are at the same group level. Alternatively, there may be different motions in the sub-group locally, which may be defined as a local motion vector.

According to embodiments, a motion vector (MV) may be transferred from the outside (for example, when data is obtained by a LIDAR mounted on a vehicle, a global motion vector may be obtained through GPS information or the like of the vehicle) or may use a motion estimation technology for estimating a motion vector between frames. The obtained MV may be used to estimate information of a current frame based on information in a previous frame.

According to an embodiment of the present disclosure, the global motion estimation may be performed in units of frames, in units of layer groups, or in units of sub-groups.

In the present disclosure, a PU may be defined as a partial region in a sub-group.

According to an embodiment of the present disclosure, the local motion estimation is performed in units of PUs.

According to embodiments, motion estimation (ME) may be performed within a search window that is a range for searching for a motion vector (MV) on a reference frame (or a previous frame) for each PU. The search window according to embodiments may be defined as all or part of the reference frame and may be defined in a three-dimensional space.

In this case, a similarity between at least one neighboring node of the compression target node and at least one neighboring node of the prediction node as well as a similarity between the compression target node of a current frame and the prediction node of the reference frame may be assumed when a motion between adjacent frames is not large.

Hereinafter, a motion-based position (i.e. geometry) compression method of the point cloud data compression method will be described.

According to embodiments, motion compensation-based point cloud compression is performed by first finding a motion between a previous frame and a current frame according to a prediction unit to obtain a motion vector, performing prediction according to the motion vector, and then comparing the predicted value with a compression target value to remove similar information.

In an embodiment of the present disclosure, a method of compressing a motion prediction-based attribute based on motion estimation and motion compensation used in an octree-based position compression method is described.

Although the position compression described in the present disclosure is mainly described in a position compression method based on an octree structure, a position/attribute compression method that is not an attribute compression or octree structure having an octree structure may be used.

Motion Estimation for Geometry-Attribute

Figure 15:
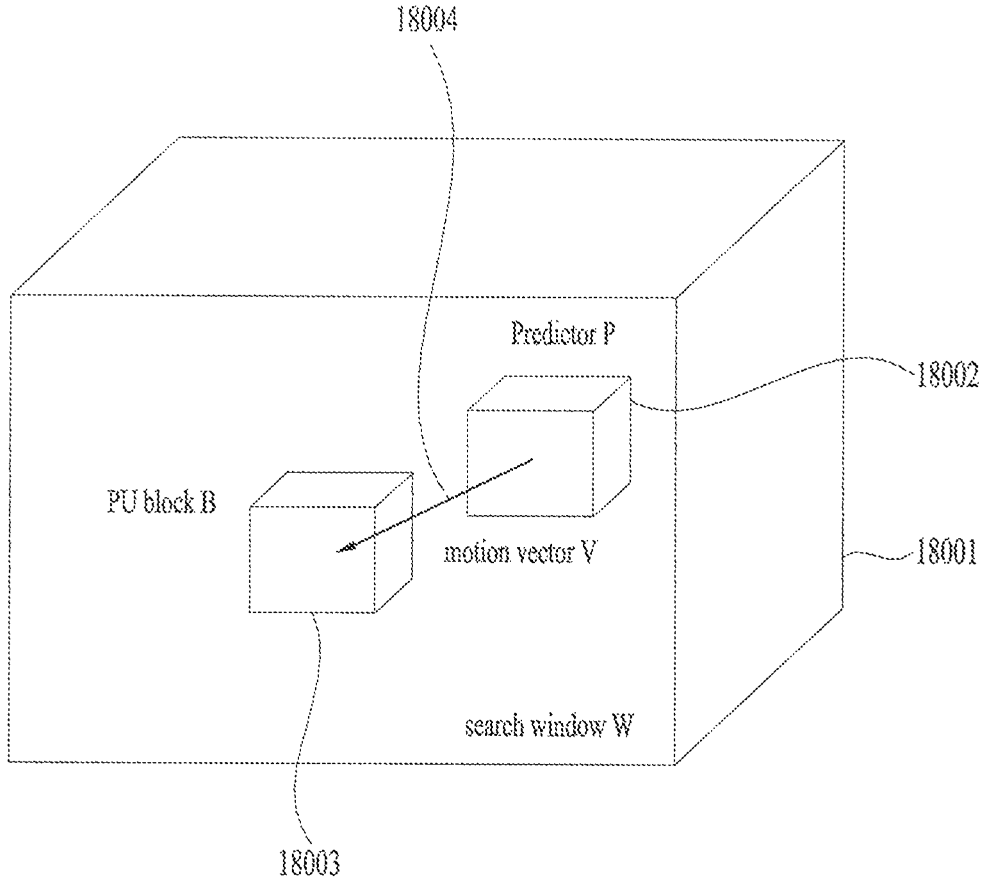
FIG. 15 illustrates an example of a search window and a motion estimation of a reference frame according to embodiments.

FIG. 15 illustrates an example of a search window and a motion estimation of a reference frame according to embodiments.

Motion vector calculation according to embodiments may be performed by the encoder/encoding operation, the decoder/decoding operation, and the transmission/reception apparatus/method described with reference to FIGS. 1, 2, 4, 10, 11, 12, 13, 25 to 28, and 33 to 35. In detail, the intra/inter coding processor 12005 of FIG. 12, the motion estimation of FIG. 26, and the motion estimation operation of FIG. 27 may be performed.

In FIG. 15, motion estimation may be performed on a PU-by-PU basis.

The motion vector calculation according to embodiments may be represented by motion estimation.

Motion estimation (ME) may be performed as shown in FIG. 15 to estimate similar information in a reference frame with respect to any PU 18003 defined in the current frame. In the present disclosure, a reference frame refers to a frame referred to when encoding/decoding a current frame, and may refer to at least one frame encoded and/or decoded before a current frame. That is, when inter-frame prediction is performed, the encoding/decoding efficiency of the current frame may be increased by referring to the frame processed before the current frame. The current frame and the reference frame may be referred to as a first frame and a second frame, respectively. In addition, the reference frame may be referred to as various methods according to the characteristics of a referenced frame such as a previous frame and a subsequent frame.

In this case, for the efficiency of motion estimation, the motion search window 18001 may be defined within the reference frame, and a similarity to information included in the PU 18003 of the current frame may be estimated. According to embodiments of the present disclosure, information of a neighboring node of the PU (i.e., a compression target node) 18003 may be used as a method for increasing the accuracy of motion estimation.

According to embodiments, the position distribution characteristics and attribute distribution characteristics of the points included in the PU 18003 of the current frame may be considered together to increase the accuracy of similarity determination. When a set of points belonging to the PU 18003 of the current frame is defined as a PU block B and a set of points belonging to an arbitrary prediction candidate defined in the search window 18001 W within the reference frame is referred to as a predictor candidate or predictor P 18002, a difference between B and P (i.e. error or residual) D (B, P) may be defined as a function of a difference between position information of each point and attribute information as shown in Equation 5 below.

[Equation 5]

$$D(B,P)=\sum_{b\in B}\log_2\left(1+\min_{p\in P}\{\|b(x,y,z)-p(x,y,z)\|_L+\|b(r,g,b,R)-p(r,g,b,R)\|_L\}\right)$$

or, $$D(B,P)=\sum_{b\in B}\log_2\left(1+\min_{p\in P}\{\|b(x,y,z)-p(x,y,z)\|_L\}\right)+\|\overline{b(r,g,b,R)}-\overline{p(r,g,b,R)}\|_L$$

or, $$D(B,P)=\sum_{b\in B}\log_2\left(1+\min_{p\in P}\{\|b(x,y,z)-p(x,y,z)\|_L\}\right)+\sum_{b\in B}\log_2\left(1+\min_{p\in P}\{\|b(r,g,b,R)-p(r,g,b,R)\|_L\}\right)$$

In Equation 5, when points belonging to B and P are b and p, respectively, the positions of the respective points are defined as b (x, y, z) and P (x, y, z), and the attribute is defined as b (r, g, b, R) and p (r, g, b, R). The motion estimation method proposed by the embodiments may be applied to both attribute compression or location compression, or attribute compression and position compression. According to an embodiment, a difference value between B and P may be referred to as a residual value, a prediction error value, or the like.

That is, in Equation 5, a function D (B, P) indicates difference information considering both inter-frame position information and attribute information.

When a difference between the PU 18003 and the prediction candidate (or predictor candidate) 18002 is defined as described above, motion estimation in a reference frame for the PU 18003 may define the predictor candidate P with the smallest D (B, P) among all the predictor candidate P to be defined in the search window 18001 as a prediction value. In this case, the motion vector V 18004 between the two blocks (e.g., B and P) may be defined as a position difference (P (x, y, z)–B (x, y, z)) of two blocks as shown in Equation 6 below.

$$V(x, y, z) = P(x, y, z) - B(x, y, z) \quad \text{[Equation 6]}$$

When a motion vector is defined according to Equation 6, a minimum error may be generated and an optimal motion vector may be found in terms of transmission efficiency. That is, the transmitting/receiving device/method according to embodiments may apply both a difference in position information between the current frame and the reference frame and a difference in attribute information therebetween to calculate a motion vector. Accordingly, data of the current frame may be effectively predicted from data of the reference frame, and as the prediction accuracy is improved, a residual value may be reduced, and encoding and transmission efficiency may be increased.

In addition, a cost function (C(V)) including a term for adjusting an error D (B, P (W, V) from a motion vector and a bit use (R(V)) generated due to use of the motion vector by a weight function λ may be defined according to Equation 7 below.

$$C(V) = D(B, P(W, V)) + \lambda R(V) \quad \text{[Equation 7]}$$

With the cost function in Equation 7, an optimal motion vector that uses fewer bits while reducing error may be found based on the weighting function. For example, when the weighting function is 0, a motion vector that minimizes error will be used. On the other hand, when the weighting function is infinite, the motion vector will converge to 0 to minimize the bits used (motion vector=0).

Figure 16:
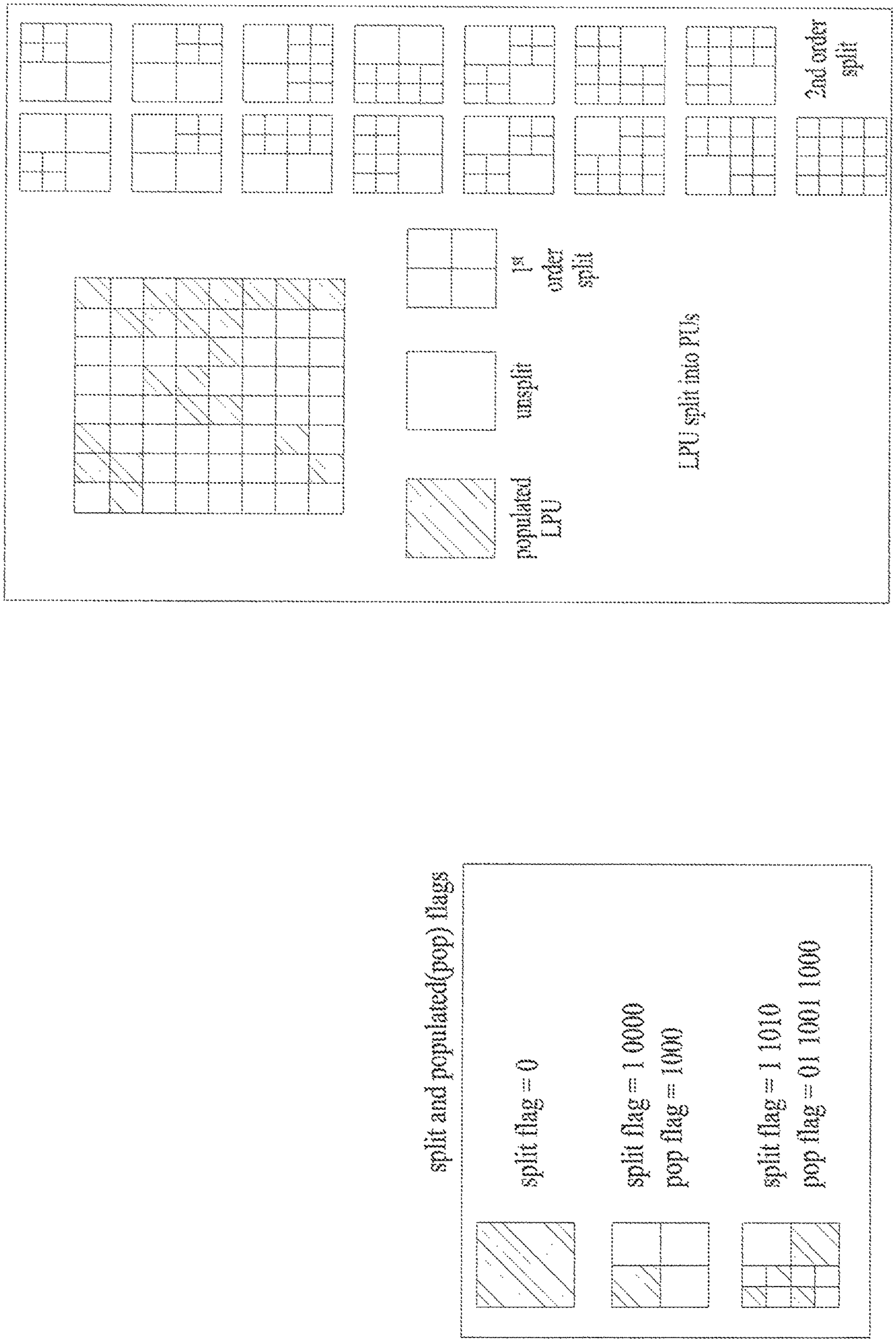
FIGS. 16(*a*) and 16(*b*) are diagrams showing examples of split and signaling of flag information in an octree structure according to embodiments.

FIGS. 16-(*a*) and 16-(*b*) are diagrams illustrating examples of signaling of split and flag information in an octree structure according to embodiments.

According to embodiments, in addition to a motion vector at a specific octree depth, a motion vector for the optimal octree may be found in a specific range of octree depths. In this case, flag information may be used to indicate whether each octree node is occupied, and to indicate that the octree should be split if no motion vector is found.

According to embodiments, the flag information may include a split flag (referred to as split flag information) and a population flag (referred to as population flag information). The flag information may be contained in a data unit (e.g., FIG. 31).

According to embodiments, occupancy bit information for a child node of the current node at the current octree depth may be indicated by the population flag. According to embodiments, whether to transmit a motion vector at the current octree depth or at a lower depth may be indicated by the split flag. The population flag and the split flag may be included and transmitted in geometry compression related information.

For example, when the value of the split flag is 0, the motion vector may be transmitted based on the node at the current depth. That is, the split flag equal to 0 indicates that the corresponding node (e.g., a cube or space) at the current depth is no longer split. Therefore, the motion vector is transmitted at the node.

For example, the split flag equal to 1 may indicate that splitting to the next depth after the current depth is performed. That is, the split flag equal to 1 indicates that the corresponding node (e.g., a cube or space) at the current depth will be split to the next depth. Therefore, no motion vectors will be transmitted at the node.

Furthermore, whether the split region is occupied or not may be indicated using the population flag. For example, the population flag equal to 1 indicates that the region is occupied (i.e., the region contains at least one point), while the population flag equal to 0 indicates that the region is not occupied (i.e., the region does not contain the at least one point). In other words, when the population flag is equal to 1, there is an occupancy bit. When the population flag is equal to 0, there is no occupancy bit.

For example, when the value of the split flag is 0, the node at the current depth is split. As another example, when the value of the split flag is 1, the node at the current depth is split into four nodes in 2D. This means that it will be split into 8 nodes in 3D. If the split nodes are not further split, the value of the split flag will be 0. That is, the split flag will be 1 0000. When the split nodes are referred to as first quadrant, second quadrant, third quadrant, and fourth quadrant in 2D, the value of the population flag will be 1000 if the first quadrant has an occupancy bit and the others do not have an occupancy bit.

In other words, in FIG. 16-(*a*), the first figure is not split, and therefore the value of the split flag is 0. The second figure has been split only once to a lower depth, and therefore the value of the split flag is 1 0000 in the case of 2D, and the value of the population flag is 1000 (where 1 represents the occupied hatched portion). The third figure is obtained by splitting the left two squares (or spaces) in the second figure into a sub-depth again, and therefore the value of the split flag is 1 1010 in the case of 2D and the value of the population flag is 01 1001 1000 (where 1 represents the occupied hatched portions).

FIG. 16-(*b*) illustrates an example of partitioning (i.e., splitting) a large prediction unit (LPU) into multiple PUs. The LPU is the largest prediction unit. In FIG. 16-(*b*), the hatched portion represents a populated LPU. That is, an LPU with an occupancy bit may be split into PUs. On an octree-depth basis, as the depth increases, the nodes may be split more finely.

In 2D, splitting after first splitting at a specific depth may yield various results, as shown in FIG. 16-(*b*). In this case, the presence of an occupancy bit in the split nodes (regions) may be indicated using the population flag.

In the present disclosure, the split flag and population flag are transmitted to the reception device because the reception device needs to perform the same splitting operation as the transmission device. In other words, when the reception device receives an MV, the reception device may identify the node from which the MV is received based on the split flag and the population flag.

To determine whether to perform splitting for each octree depth, the transmission/reception device/method according to embodiments may define a cost function (C(V)) as a cumulative value of the costs of the sub-PUs, as shown in Equation 8 below. where λ1 and λ2 are weighting functions.

$$C(V) = \sum_i D(B, P(W, V_i) + \lambda_1 R(V_i) + \lambda_2 R(\text{split/population flags}) \quad \text{[Equation 8]}$$

In Equation 8, the cost function may include a term that represents the error and bit usage resulting from using the motion vector, or the cost of the operation in the case of splitting a node. Thus, the cost function may determine whether to split an octree node according to the lowest cost calculated in the cost function. In other words, according to embodiments, the cost of splitting an octree node may be compared with the cost of transmitting a motion vector, and the splitting (or encoding operation) may be determined according to the lower cost.

Figure 17:
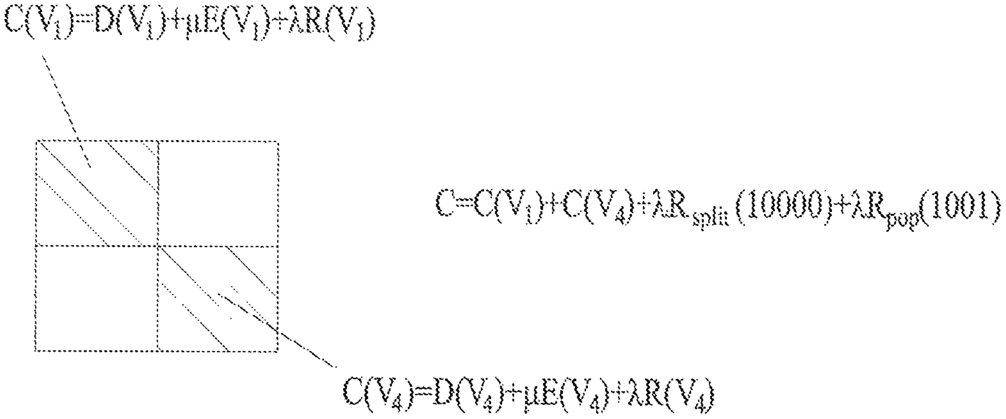
FIG. 17 is a diagram illustrating an example of calculating a cost function for an octree node according to embodiments.

FIG. 17 is a diagram illustrating an example of calculating a cost function for an octree node according to embodiments. In particular, the diagram illustrates an example of calculating a cost function (e.g., C(V1), C(V4)) for the occupied node(s) among the split child nodes. In this case, the value of the split flag is 10000 and the value of the population flag is 1001.

According to embodiments, the cost function for all nodes may be obtained by Equation 9 below, where λ is a weighting function.

$$C = C(V_1) + C(V_4) + \lambda R_{split}(10000) + \lambda R_{pop}(1001) \quad \text{[Equation 9]}$$

That is, based on the cost for MV 1 and the cost for MV 2 that have an occupancy bit, a cost function may be computed. When the occupancy is equal to 1001 at a specific depth, the cost for MV1 and MV2 of the occupancy node may be calculated to determine whether to split the node.

The transmission/reception device/method according to embodiments may select whether to split the node at a specific depth of the octree or apply a motion vector based on the cost function described above.

Figure 18:
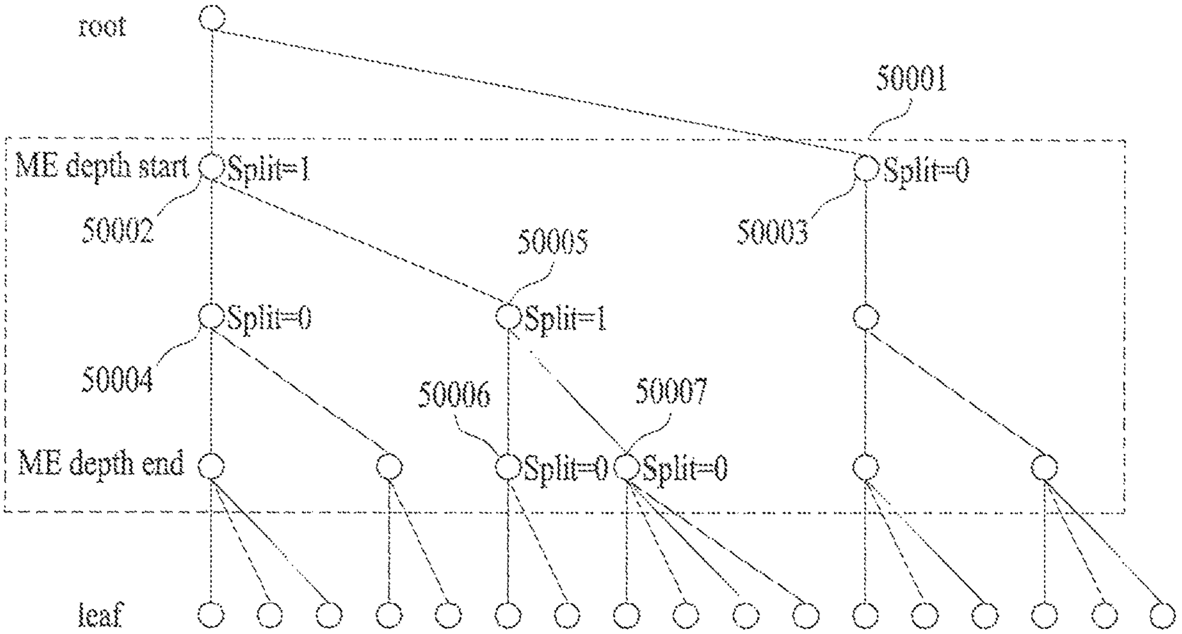
FIG. 18 is a diagram illustrating an example of performing splitting at an octree depth according to embodiments.

FIG. 18 is a diagram illustrating an example of performing splitting at an octree depth according to embodiments.

FIG. 18 shows the result of performing the operation of finding a motion vector for point cloud data having an octree structure. In the figure, a depth range for performing motion estimation in an octree structure from a root to a leaf is indicated as 50001. According to embodiments, in the case where delivering an MV for a specific node without splitting the node requires a lower cost than splitting the node, the split flag for that node may be set to 0 (split flag=0, i.e., No splitting) and the MV for the node may be delivered. Conversely, in the case where splitting the node requires a lower cost than delivering the MV, the split flag for the node may be set to 1 (split flag=1, i.e., split the node) and the MV may be delivered by a child node. In other words, the MV is transmitted at the node if the node is not split, and the MV is transmitted at the child node if the node is split.

Region 50001 may be represented by an ME depth start and an ME depth end. Here, the ME depth start and ME depth end may indicate a range of octree depths (or levels) in which motion estimation is performed. In FIG. 18, it is determined whether motion estimation is performed from the next child of the root node to the immediate parent of the leaf node. Nodes 50003, 50004, 50006, and 50007 with split flag equal to 0 are nodes that do not split because delivering the motion vector is less costly than splitting, and nodes 50002 and 50005 with split flag equal to 1 are nodes that are split because it is less costly to deliver the motion vector than to split the nodes. In the latter case, the MV is delivered at the child nodes.

In other words, the nodes 50003, 50004, 50006, and 50007 with the split flag equal to 0 are not split, and thus their respective MVs are delivered at the nodes 50003, 50004, 50006, and 50007. Also, nodes 50002 and 50005 with the split flag equal to 1 are split, and thus each MV is transmitted at the children of the nodes 50002 and 50005.

According to embodiments, the cost of generating an MV at node 50002 may be calculated, the cost of splitting node 50002 and generating MVs at nodes 50004 and 50005 may be calculated, and the two costs may be compared. If the cost of the lower depth split is more efficient (i.e., lower), the split may proceed at node 50002 and the split flag may be assigned a value of 1.

Figure 19:
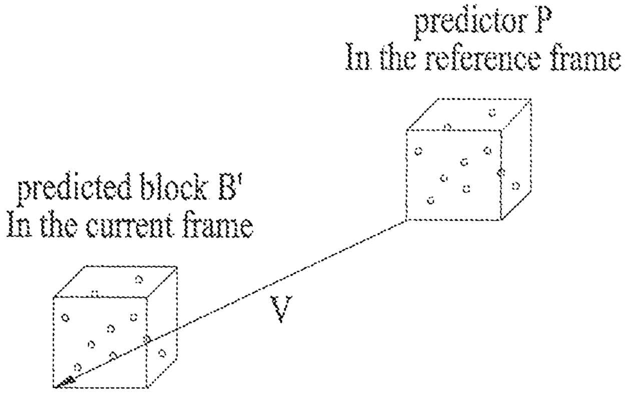
FIG. 19 is a diagram illustrating an example of inter-prediction according to embodiments.

FIG. 19 is a diagram illustrating an example of inter-prediction according to embodiments.

As described above, with an inter-prediction based geometry compression method, a predictor (or prediction block) P in a reference frame may be identified from the information about the motion vector V for the reference frame. When the position of the PU block where the prediction is performed in the current frame is B(x,y,z) and the motion vector V is V(x,y,z), the position P(x,y,z) of the predictor P may be defined as shown in Equation 10 below.

$$P(x, y, z) = B(x, y, z) + V(x, y, z) \quad \text{[Equation 10]}$$

In this case, a position of a block may be defined as a minimum value for each axis of a bounding box for a point included in the block. According to embodiments, a prediction target (or PU block) B of the current frame may be predicted based on the predictor P defined in the reference frame. When the predicted block for a PU of the current frame is B', occupancy of points belonging to B' complies with occupancy of P and may be defined according to Equation 11 below based on a position of points b' belonging to B'(b'(x,y,z) and attributes are a position p(x,y,z) and attribute of points P belonging to P and a motion vector (V(x,y,z)).

$$\text{Occupancy of } B' = \text{occupancy of } P \quad \text{[Equation 11]}$$

$$b'(x, y, z) = p(x, y, z) - V(x, y, z)$$

$$b'(r, g, b, R) = b(r, g, b, R)$$

According to embodiments, the representative attribute of the predicted block B' of B predicted by the predictor P may be defined according to the following Equation 12.

$$B'(r, g, b, R) = avg\{b'(r, g, b, R)\} \quad \text{[Equation 12]}$$

$$B'(r, g, b, R) = med\{b'(r, g, b, R)\}$$

$$B'(r, g, b, R) = \frac{1}{N(T)} \sum_{b' \in T} b'(r, g, b, R) - \frac{1}{N(H)} \sum_{b' \in H} b'(r, g, b, R) - \frac{1}{N(L)} \sum_{b' \in L} b'(r, g, b, R)$$

In Equation 12, avg { } and med { } are functions for outputting an average or median value, and T, H, and L may represent a full set, a set of points belonging to upper a % and lower b % when listed in ascending order. N ( ) may indicate the number of points belonging to the set. As such, a representative attribute may be defined as an average of points belonging to a predefined range.

According to embodiments, the transmitting device compresses geometry information (e.g., position) and attribute information (e.g., color/brightness/reflectance) of point cloud data and transfers the compressed geometry information (e.g. position) and attribute information (e.g. color/brightness/reflectance) to the receiving device. In this case, the point cloud data may be configured in an octree structure having a layer according to a degree of detail, and based on this, scalable point cloud data coding and representation are possible.

Layering of the point cloud data may have a layer structure in various perspectives, such as SNR, sparial resolution, color, temporal frequency, or bitdepth depending on an application field, and may define a layer in a direction in which a density of data increases based on an octree structure or an LoD structure.

In the apparatus and method according to embodiments, a layer group may be configured by grouping one or more layers of an octree structure including point cloud data. For example, each layer group may include one layer or may include one or more layers. As another example, an entire octree structure having a plurality of layers may constitute one layer group. That is, according to the present disclosure, the layer group may be used as a unit for representing a set of one or more layers.

In the apparatus and method according to embodiments, a consecutive part of layers of an octree structure may be designated as one layer group. In other words, one layer group may include a consecutive part of layers of an octree structure.

In the present disclosure, the layer may be interpreted as having the same meaning as the depth. The level may be referred to as a group level or a layer group level.

The layer group may be re-segmented into one or more sub-groups. In this case, a layer group that is not segmented into a plurality of sub-groups may be referred to as a sub-group. That is, when the layer group is not segmented into sub-groups, the layer group is interpreted to have the same meaning as the sub-group.

According to embodiments, when a layer group including a plurality of layers is segmented into one or more sub-groups, each sub-group may include parent-child pairs.

According to embodiments of the present document, a slice may be provided by segmenting and processing a bitstream of the point cloud data for each layer group or sub-group.

According to embodiments, one layer group may be matched to one slice. When the layer group is segmented into a plurality of sub-groups, one sub-group may be matched to one slice. As described above, when a layer group that is not segmented into sub-groups is regarded as one sub-group, the slice and the sub-group may have a 1:1 correspondence structure.

In the apparatus and method according to embodiments, slice segmentation may be performed to transfer a bitstream of point cloud data in units of layer groups and/or sub-groups.

FIG. 20(*a*) illustrates an example in which a geometry tree (e.g. octree) structure is not segmented into a plurality of layer groups, according to embodiments, and FIG. 20(*b*) illustrates an example in which a geometry tree structure is segmented into a plurality of layer groups.

The method/apparatus according to embodiments may configure one or more slices to transfer point cloud data, as shown in FIGS. 20(*a*) and 20(*b*).

That is, as shown in FIG. 20(*a*), an entire coded bitstream may be included in a single slice according to the G-PCC technology. As shown in FIG. 20(*b*), when the geometry tree structure is segmented into a plurality of layer groups, each slice may include bitstreams of each layer group. The order of the slices may be the same as the order of the layer groups. In other words, the bitstream may be accumulated in a breadth first order of the geometry tree, and each slice may be matched with each layer group as shown in FIG. 20(*b*). In addition, the segmented slice may inherit the layering structure of the G-PCC bitstream.

Just as upper layers of a geometry tree do not affect lower layers, current slices may not affect previous slices.

Figure 21:
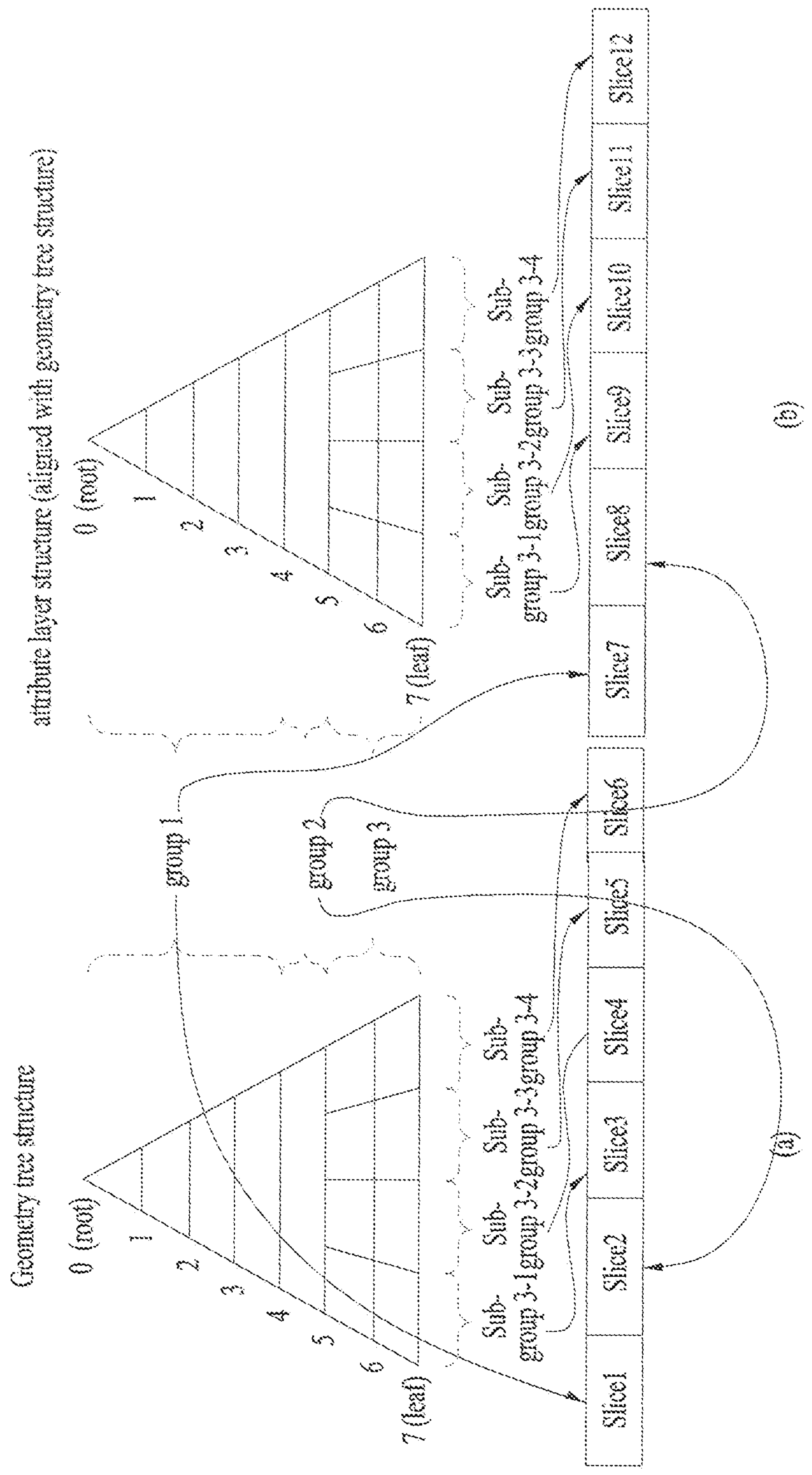
FIG. 21(*a*) illustrates an example in which a specific layer group is segmented into a plurality of sub-groups in a geometry tree structure according to embodiments.

FIG. 21(*a*) illustrates an example in which a specific layer group is segmented into a plurality of sub-groups in a geometry tree structure according to embodiments, and FIG. 21(*b*) illustrates an example in which a specific layer group is segmented into a plurality of sub-groups in an attribute tree structure according to embodiments. In particular, FIG. 21(*b*) illustrates an example of an attribute tree structure aligned with the geometry tree structure of FIG. 21(*a*).

The method/apparatus according to embodiments may generate layer group(s) and/or sub-group(s) using a layer structure of a geometry tree, as illustrated in FIGS. 20(*b*) and 21(*a*).

Referring to FIG. 21(*a*), an octree having eight layers is segmented into three layer groups, one of which is segmented into four sub-groups. For convenience of description, three layer groups are referred to as first to third layer groups (group 1 to group 3), and four sub-groups segmented from the third layer group (i.e. group 3) will be referred to as first to fourth sub-groups (sub-group 3-1 to sub-group 3-4). The first layer group (i.e. layer group 1) may be referred to as a root layer group or an uppermost layer group.

Six slices are used to transfer bitstreams (or sub-bitstreams) belonging to the first layer group, the second layer group, and the first to fourth sub-layer groups, respectively. That is, this is an example in which a single slice is segmented into six slices.

In FIG. 21(*a*), the first layer group (i.e. group 1) includes layers 0 to 4, the second layer group (i.e. group 2) includes layer 5, and the third layer group (i.e. group 3) includes layer 6 and layer 7.

The third layer group (i.e. group 3) is re-segmented into first to fourth sub-groups (i.e. group 3-1 to group 3-4), and in this case, the parent and child pairs are present in each sub-group.

In a layer group structure of a geometry coding tree as shown in FIG. 21(*a*), slice 1 is used to transmit a geometry sub-bitstream belonging to a first layer group, slice 2 is used to transmit a geometry sub-bitstream belonging to a second layer group, slice 3 is used to transmit a geometry sub-bitstream belonging to a first sub-group, slice 4 is used to transmit a geometry sub-bitstream belonging to a second sub-group, slice 5 is used to transmit a geometry sub-bitstream belonging to a third sub-group, and slice 6 is used to transmit a geometry sub-bitstream belonging to a fourth sub-group.

When scalable attribute coding is used and the attribute tree structure is the same as the geometry tree structure, the same octree-slice mapping is used to make attribute slice segments as shown in FIG. 21(*b*), according to an embodiment. That is, in an aligned layer group structure of an attribute coding tree such as FIG. 21(*b*), slice 7 is used to transmit an attribute sub-bitstream belonging to a first layer group, slice 8 is used to transmit an attribute sub-bitstream belonging to a second layer, slice 9 is used to transmit an attribute sub-bitstream belonging to a first sub-group, slice 10 is used to transmit an attribute sub-bitstream belonging to a second sub-group, slice 11 is used to transmit an attribute sub-bitstream belonging to a third sub-group, and slice 12 is used to transmit an attribute sub-bitstream belonging to a fourth sub-group.

A sub-group according to embodiments may be represented as a set of adjacent nodes based on position information for one layer group. Alternatively, a group may be configured based on the lowermost layer (which may mean the closest layer to the root, layer 6 in the case of group 3 of FIG. 21) within a layer group, a sub-group may be configured as a bundle of adjacent nodes by a Morton code order, a sub-group may be configured as a bundle of distance-based adjacent nodes, or a sub-group may be configured as a bundle of adjacent nodes according to a coding order. Nodes having a parent-child relationship may be defined to be present in one sub-group.

When a sub-group is defined, a boundary is generated in the middle of a layer, and signaling information (e.g. sps_entropy_continuation_enabled_flag or gsh_entropy_continuation_flag) is used as to whether the boundary has continuity. That is, the continuity with the previous slice may be continuously maintained by informing whether entropy is continuously used and informing ref_slice_id.

The segmented slices as described above are effective in terms of error robustness, effective transmission, supporting region of interest, and the like.

In other words, compared with a single slice structure, the segmented slices may be more robust to the error. That is, when one slice includes an entire bitstream of a frame, a data loss may affect entire frame data. In contrast, when a geometry tree is segmented into a plurality of layer groups, and a bitstream is segmented into a plurality of slices in correspondence to the segmented layer groups, it may be possible to decode at least one slice that is not affected by loss even if at least one slice is lost.

As described above, in the apparatus and method according to embodiments, the reception device may perform selective decoding or parallel decoding by segmenting a tree structure having a plurality of layers into one or more layer groups and/or one or more sub-groups and transmitting the geometry and/or attribute data of the segmented layer group and/or sub-group through each slice.

The method/apparatus according to embodiments may define a slice segmentation structure of the point cloud data, and may signal a layer group, a sub-group, and a slice structure for scalable transmission.

According to embodiments, the apparatus and method proposes a method for applying inter prediction to a frame having a hierarchical slice structure via layer group slicing as described above. That is, according to an embodiment of the present disclosure, an inter prediction-based coding method is applied to an octree-based layer group structure. In the present disclosure, the layer group structure may be referred to as a layer group slicing structure or a hierarchical slicing structure.

According to embodiments, the apparatus and the method propose a position compression method based on motion estimation and motion compensation considering a layer group structure when inter-prediction-based geometry coding is performed.

That is, the transmission device and method according to embodiments may improve compression efficiency of point cloud data by obtaining a motion vector for each layer group in an octree-based layer group structure to hierarchically increase the accuracy of motion and transmitting a difference value in a motion vector between a parent sub-group and a child sub-group. According to an embodiment, the motion vector is a global motion vector and/or a local motion vector.

Figure 22:
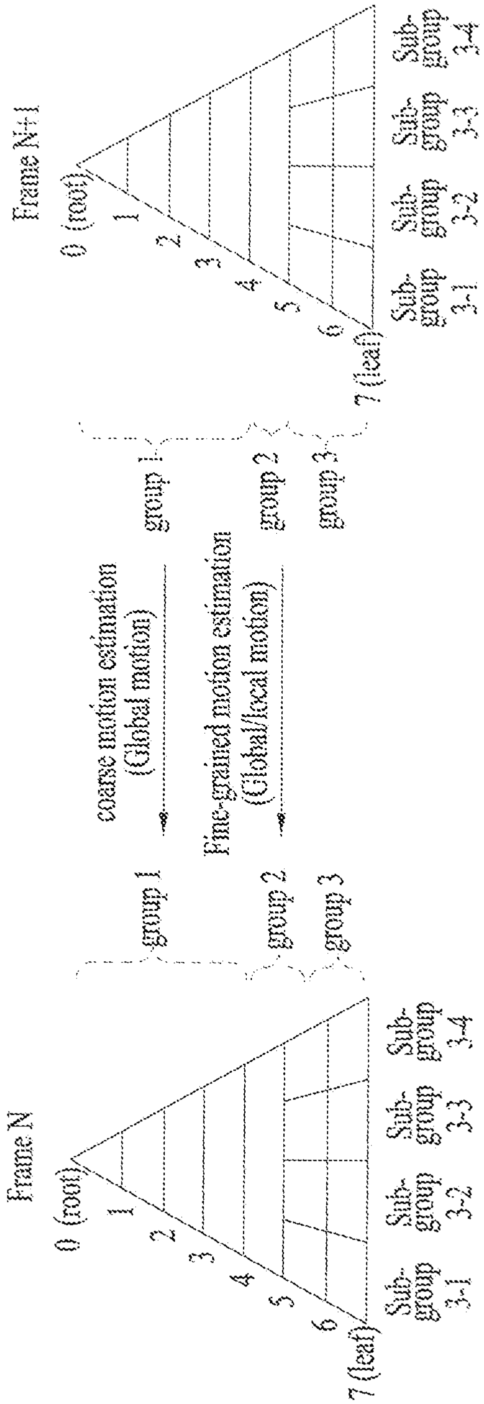
FIG. 22 is a diagram illustrating an example of a layer group structure and a motion estimation according to embodiments.

FIG. 22 is a diagram illustrating an example of a layer group structure and a motion estimation according to embodiments. That is, FIG. 22 illustrates an example in which a consecutive part of layers of an octree structure is designated as one layer group and a specific layer group is segmented into a plurality of sub-groups as shown in FIG. 21(*a*). According to embodiments, motion estimation for obtaining a global motion vector in the transmitting device and method is performed in units of layer groups and/or sub groups.

As described above, the layer group that is not segmented into the sub-groups in the octree structure may be treated as one sub-group, and thus it may be considered that the octree structure of FIG. 22 is segmented into six sub-groups. That is, each of the layer group 1 and the layer group 2 may be regarded as a sub-group. In this case, it may be considered that the global motion vector is obtained in units of sub-groups and is transferred in units of sub-groups.

In FIG. 22, the first layer group (i.e. layer group 1) may be referred to as a root layer group or an uppermost layer group.

As described above, each layer group may be transferred to an independent slice, which may be used for partial decoding and spatial access.

When decoding is performed with only some slice (i.e. specific layer group) information in the reception device and method, sufficient information may not be transmitted to reference the information of the previous frame. To prevent this, according to the present disclosure, prediction may be performed according to a layer group structure between frames when inter-prediction is performed. That is, in motion estimation, the layer group of the previous frame and the layer group of the current frame are at the same group level. For example, prediction of the layer group 2 of the current frame is performed using the layer group 2 of the previous frame. The present embodiment may also be applied equally to the sub-group. For example, prediction of the sub-group 3-3 of the current frame is performed using the sub-group 3-3 of the previous frame.

In this case, in the case of an upper layer group, a density between points is low, whereas in the case of a lower layer group, a density between points is high. Therefore, when inter prediction is performed on the upper layer group, the accuracy of the motion vector may be degraded. However, a motion suitable for the resolution of the corresponding layer group may be found, and in this case, the characteristics of the global motion may be obtained. In a next layer group, inter prediction between layer groups at the same group level may be performed, and a local motion vector may be obtained while searching for a motion of a higher resolution.

As a level of the layer group increases, a detail of the motion vector of the previous level may be added.

Therefore, the transmission device and method according to embodiments may transfer only an additional detail about a motion vector of the upper layer group (i.e. the parent layer group) (i.e. a difference value between the vector value of the upper layer group and the vector value of the lower layer group) of the motion vector of the upper layer group (i.e. the parent layer group).

In FIG. 22, when the layer group 1 and the layer group 2 are examples, a motion vector value of the layer group 1 may be transmitted without change, a motion vector value of the layer group 2 may be transmitted without change, or a difference between the motion vector value of the layer group 1 and the motion vector value of the layer group 2 (which is referred to as additional detail information of a motion vector of a vector residual or the layer group 1) may also be transmitted. According to an embodiment of the present disclosure, the motion vector is a global motion vector. That is, the global motion vector of the layer group 1 refers to a change vector of the total motion obtained by comparing the layer group 1 of the previous frame (Frame N) and the layer group 1 of the current frame (Frame N+1). In addition, the global motion vector of the layer group 2 refers to a change vector of the total motion obtained by comparing the layer group 2 of the previous frame (Frame N) and the layer group 2 of the current frame ((Frame N+1)).

In this case, a density between points of the layer group 1 is lower than density between points of the layer group 2, that is, the number of points included in the layer group 1 is smaller than the number of points included in the layer group 2, and thus motion estimation in the layer group 1 may be referred to as a coarse motion estimation, and motion estimation in the layer group 2 may be referred to as a fine-grained motion estimation. Here, the low density means that the resolution is low. In other words, the number of points in the layer group 2 is greater than the number of points in the layer group 1, and thus the resolution of the layer group 2 is higher than the resolution of the layer group 1.

As described above, the transmission device and method according to embodiments may perform motion estimation for each layer group in an octree-based layer group structure to obtain a motion vector (e.g. a global motion vector) for each layer group, and a motion vector value of a lower layer group may transfer a difference between motion vector values of an upper layer group, that is, additional detail information on the motion vector of the upper layer group. Accordingly, the number of transmitted bitstreams may be reduced, and thus compression performance may be improved.

According to another embodiment, motion estimation for each layer group in an octree-based layer group structure may be performed to obtain a motion vector (e.g. a global motion vector) for each layer group, and a motion vector value of each layer group may be transmitted without change. In particular, the motion vector value obtained from the layer group 1 (i.e. the root layer group) is transmitted without change.

That is, when a global motion vector is obtained for each layer group, motion vector information transferred from each layer group to a receiving side may be an actual motion vector value obtained from the layer group, or additional detail information about a motion vector of an upper layer group.

Figure 23:
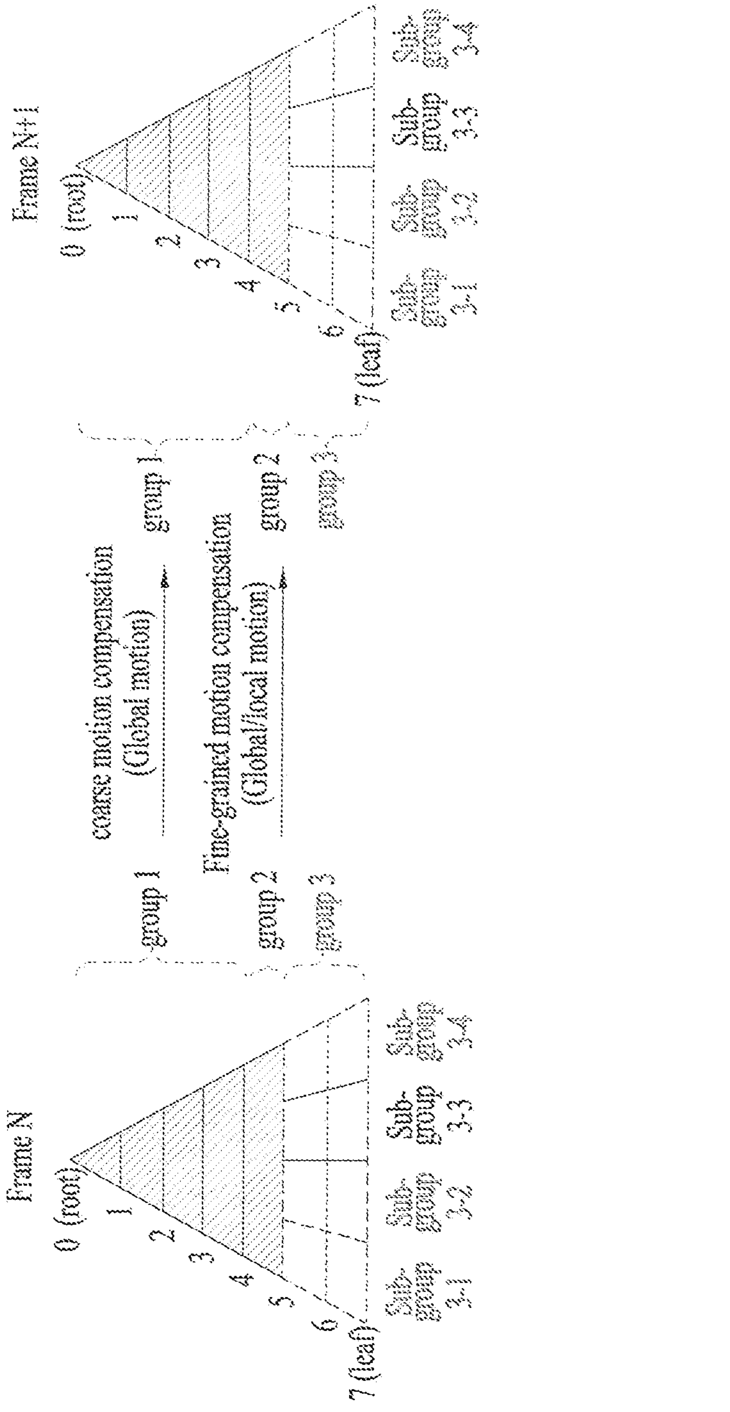
FIG. 23 is a diagram illustrating an example of a layer group structure and motion compensation according to embodiments.
Figure 24:
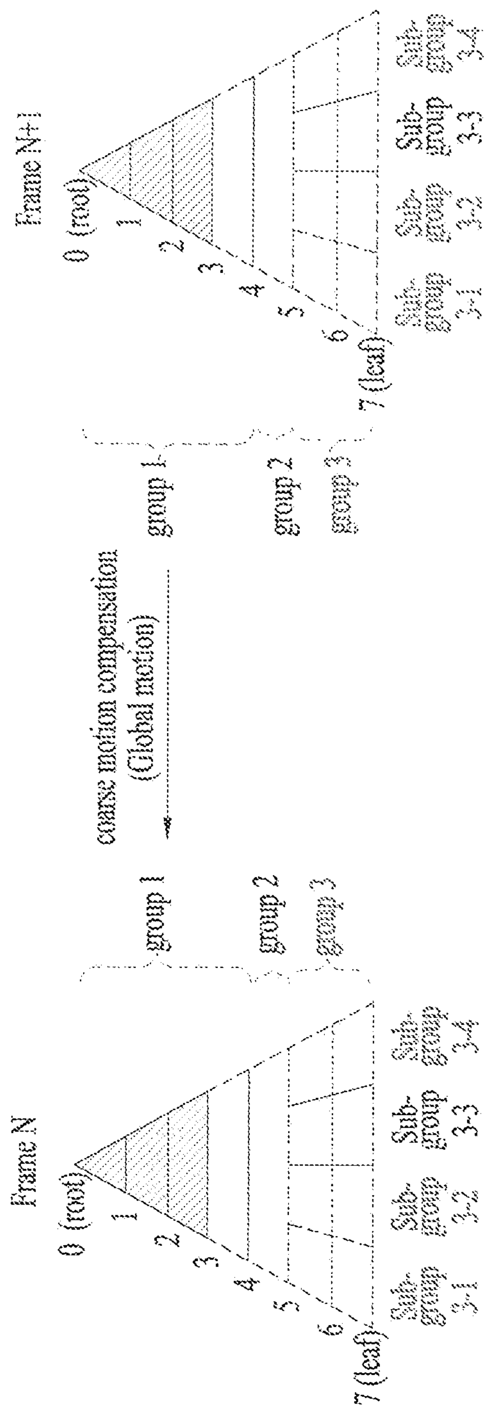
FIG. 24 is a diagram illustrating another example of a layer group structure and motion compensation according to embodiments.

According to embodiments, the reception device and method may perform different motion compensation according to a layer group level of a previous frame as illustrated in FIG. 23 or 24. At this time, the scalability may be effectively supported by limiting use of only information of the corresponding layer group.

FIG. 23 is a diagram illustrating an example of a layer group structure and motion compensation according to embodiments. Motion compensation may be performed in the reception device and method. In addition, motion compensation may be performed in the transmission device and method to use a previous frame as a reference frame during inter-prediction.

For example, as shown in FIG. 22, it is assumed that the global motion vector value obtained in the layer group 1 is transmitted without change, and the additional detail information about the motion vector of the layer group 1 (that is, a difference between the motion vector value of the layer group 1 and the motion vector value of the layer group 2) is transmitted instead of the actual motion vector value obtained in the layer group 2 for the layer group 2.

In this case, in the reception device and method according to embodiments, when motion compensation of the layer group 2 is performed, the motion vector value of the layer group 2 may be restored based on the global motion vector value of the layer group 1. That is, the motion vector value of the layer group 2 may be restored by adding the additional detail information on the motion vector of the layer group 1 (i.e. a difference between the motion vector value of the layer group 1 and the motion vector value of the layer group 2) to the motion vector value of the layer group 1.

FIG. 24 is a diagram illustrating another example of a layer group structure and motion compensation according to embodiments. Motion compensation is performed in the reception device and method. In addition, motion compensation may be performed in a transmission device and method to use a previous frame as a reference frame during inter-prediction.

According to embodiments, when a specific layer group is segmented into a plurality of sub-groups, the global motion vector is transmitted in units of sub-group bounding boxes, and thus the global motion vector may indicate a motion vector relative to the existing global motion vector, and may be referred to as a sub-group motion vector.

According to embodiments, a global motion vector (or a sub-group motion vector) obtained in units of sub-groups is transmitted as many as the number of sub-groups, and thus a motion vector of a child layer group may be transferred as additional detail information about a motion vector of a parent layer group in consideration of a parent-child relationship between layers of a layer group.

For example, when a motion vector of a child sub-group (n, m) is transferred, the motion vector may be independently transferred without consideration for a layer group relationship, but a difference value (res_sub-group_mv(n, m)) for a motion vector of a parent sub-group (n−1, m') may be transferred, and in the reception side, a motion vector sub-group_MV(n, m) of the child sub-group may be restored based on the motion vector sub-group_MV(n−1, m') of the parent sub-group according to Equation 13 below.

$$\text{sub-group\_}MV(n,\ m) = \text{sub-group\_}MV(n-1,\ m') + res\_\text{sub-group\_}mv(n,\ m) \qquad \text{[Equation 13]}$$

In Equation 13, sub-group_MV(n, m) may mean the motion vector of the m-th sub-group in the n-th layer group, m' may mean a parent sub-group for a sub-group m, and res_sub-group_mv(n, m) may mean a difference of the motion vector.

In the sub-group 3-3 of FIG. 24, in Equation 13, n denotes the layer group 3, n−1 denotes the layer group 2, m denotes the sub-group 3-3, and m' denotes a parent sub-group of the sub-group 3-3.

When motion vectors of respective layer groups have different position resolutions according to a max tree depth of each layer group, a relationship of a motion vectors between the sub-groups in a parent-child relationship may be represented according to Equation 14 below. According to embodiments, the maximum tree depth of each layer group may be defined as the number of layers included in each layer group.

$$\text{sub-group\_}MV(n, m) = \text{sub-group\_}MV(n-1, m') << \text{layer\_group\_shift}(n, n-1) + res\text{\_sub-group\_}mv(n, m) \quad \text{[Equation 14]}$$

In Equation 14, sub-group_MV(n, m) denotes a motion vector of a m-th sub-group of a n-th layer group, and layer_group_shift denotes a tree depth difference between a parent layer group and a child layer group.

According to embodiments, when a maximum tree depth of a nth layer group is referred to as a max tree depth (n), layer_group_shift (n, n−1)) may be represented by Equation 15 below.

$$\text{layer\_group\_shift}(n, n-1) = \text{max tree depth } (n) - \text{max tree depth } (n-1) \quad \text{[Equation 15]}$$

According to embodiments, when layer_group_shift is not used, a motion vector in all layer groups may be represented for a max tree depth of a max layer-group.

When the sub-group motion vector is used, the reference frame may be determined by prior appointment, and when the reference frame needs to be changed in units of sub-groups or in units of layer groups, sub-group_mv_ref_frame_id for the global motion vector may be separately signaled in signaling information (e.g., GPS and/or geometry data unit header).

As described above, the apparatus and method according to embodiments may segment the global motion vector according to a layer group and transmit added detail information (e.g. res_sub-group_mv of Equation 13), and thus may use only some bits of the motion vector in a situation of layer group skip, thereby increasing bit efficiency.

According to embodiments, a local motion vector may be obtained for each sub-group. In this case, a value of local_motion_vector_present_flag may be 1, and a local motion vector may be transferred within a sub-group. For example, when a value of local_motion_vector_present_flag is 1, a local motion vector may exist between mv_depth_start and mv_depth_end, and in this case, mv_depth_start and mv_depth_end may indicate the start and end of an octree depth through which the motion vector may be transmitted, and these values may be determined within the range of the tree depth included in the layer group. According to embodiments, local_motion_vector_present_flag, mv_depth_start, and mv_depth_end are included in a geometry data unit header.

According to embodiments, when a local motion vector is used, a motion vector may be transmitted in units of local motion vector prediction units in a sub-group. In this case, detailed motion information may be transferred with respect to an object that is independent of a region with a lot of movement or movement of a global motion vector/sub-group motion vector. For example, this may correspond to a case in which, when a vehicle obtains point cloud data while driving, there is an object moving in a direction different from a driving direction of the vehicle.

According to embodiments, when a value of local_motion_vector_present_flag is 0, a local motion vector is not used for the corresponding sub-group, and in this case, only the sub-group motion vector (i.e. the global motion vector) is used. In this case, the sub-group motion vector relative to the global motion vector may be used as the local motion vector by using the same motion vector for a bounding box range of the sub-group.

FIG. 25 is a diagram illustrating another example of a point cloud transmission device according to embodiments. The elements of the point cloud transmission device illustrated in FIG. 25 may be implemented by hardware, software, processors, and/or combinations thereof.

According to embodiments, the point cloud transmission device may include a data input unit 51001, a signaling processor 51002, a geometry encoder 51003, an attribute encoder 51004, and a transmission processor 51005.

The geometry encoder 51003 and the attribute encoder 51004 may perform some or all of the operations described in the point cloud video encoder 10002 of FIG. 1, the encoding 20001 of FIG. 2, the point cloud video encoder of FIG. 4, and the point cloud video encoder of FIG. 12.

The data input unit 51001 according to embodiments receives or acquires point cloud data. The data input unit 51001 may perform some or all of operations of the point cloud video acquisition unit 10001 in FIG. 1 or some or all of the operations of the data input unit 12000 in FIG. 12.

The data input unit 51001 outputs positions of points of point cloud data to the geometry encoder 51003, and outputs attributes of points of point cloud data to the attribute encoder 51004. Parameters are output to the signaling processor 51002. In some embodiments, the parameters may be provided to the geometry encoder 51003 and the attribute encoder 51004.

The geometry encoder 51003 constructs an octree based on the positions of the input points and performs geometry compression based on the octree. The prediction for geometry compression may be performed within a frame, or may be performed between frames. In the present disclosure, the former is referred to as intra-frame prediction and the latter is referred to as inter-frame prediction. The geometry encoder 51003 performs entropy encoding on the compressed geometry information and outputs the result to the transmission processor 51005 in the form of a geometry bitstream.

According to an embodiment of the present disclosure, geometry compression is performed based on inter-frame prediction. That is, as described with reference to FIGS. 20 to 24, the geometry encoder 51003 segments the octree structure into one or more layer groups, obtains a global motion vector for each layer group, and transmits the motion vector information for each layer group.

In this case, the motion vector information of the uppermost layer group (i.e. the root layer group) is an actual global motion vector value obtained in the layer group 1. The motion vector information of the lower layer group may be an actual global motion vector value obtained from the lower layer group or the additional detail information on the global motion vector of the upper layer group.

With regard to the layer group 1 and the layer group 2 of FIG. 22 as an example, in the case of the layer group 1, the actual global motion vector value obtained in the layer group 1 is transferred as motion vector information. In contrast, in the case of the layer group 2, the actual global motion vector value obtained in the layer group 2 may be transferred as the motion vector information of the layer group 2 or the additional detail information on the global motion vector of the layer group 1 (that is, a difference between the global motion vector value of the layer group 1 and the global motion vector value of the layer group 2) may be transmitted.

When segmenting an octree structure into layer groups, the geometry encoder 51003 may also segment a specific layer group into a plurality of sub-groups. In this case, according to an embodiment, the motion vector (i.e. the global motion vector or the sub-group motion vector) of the child layer group is transferred as the additional detail information about the motion vector of the parent layer group in consideration of the parent-child relationship between the layers of the layer group.

That is, when performing inter prediction in a layer group structure, the geometry encoder 51003 obtains a motion vector of each layer group and each sub-group by performing motion estimation for each layer group and each sub-group when there are sub-groups, and performs compression of the geometry information in a layer group unit and/or a sub-group unit. The geometry information compressed in the layer group and/or the sub-group is transmitted through the corresponding slice.

The geometry encoder 51003 reconfigures the geometry information based on positions changed through compression, and outputs the reconfigured (or decoded) geometry information to the attribute encoder 51004.

The attribute encoder 51004 compresses attribute information based on positions at which geometry encoding is not performed and/or reconfigured geometry information. According to an embodiment, the attribute information may be coded using any one or a combination of one or more of RAHT coding, LOD-based predictive transform coding, and lifting transform coding. The attribute encoder 51004 performs entropy encoding on the compressed attribute information and outputs the information to the transmission processor 51005 in the form of an attribute bitstream.

The signaling processor 51002 may generate and/or processes signaling information necessary for encoding/decoding/rendering of the geometry information and attribute information and provide the generated and/or processed signaling information to the geometry encoder 51003, the attribute encoder 51004, and/or the transmission processor 51005. Alternatively, the signaling processor 51002 may be provided with the signaling information generated by the geometry encoder 51003, the attribute encoder 51004, and/or the transmission processor 51005. The signaling processor 51002 may provide information fed back from the reception device (e.g., head orientation information and/or viewport information) to the geometry encoder 51003, the attribute encoder 51004, and/or the transmission processor 51005.

In the present specification, signaling information may be signaled and transmitted in units of parameter sets (sequence parameter set (SPS), geometry parameter set (GPS) attribute parameter set (APS), tile parameter set (TPS) (or tile inventory), and the like). The signaling information may also be signaled and transmitted in units of coding units (or compression units or prediction units) of each image, such as slices or tiles. The signaling information may be signaled and transmitted in units of motion vector estimation, such as a layer group or a sub-group.

The transmission processing unit 51005 may perform the same or similar operation and/or transmission method as the operation and/or transmission method of the transmission processor 12012 of FIG. 12, and may perform the same or similar operation and/or transmission method as the operation and/or transmission method of the transmitter 10003 of FIG. 1. A detailed description will be omitted herein with reference to the description of FIG. 1 or 12.

The transmission processor 51005 may multiplex a geometry bitstream of a slice unit output from the geometry encoder 51003, an attribute bitstream of a slice unit output from the attribute encoder 51004, and a signaling bitstream output from the signaling processor 51002 into one bitstream, and then transmit the multiplexed bitstream without change or may encapsulate the bitstream to a file, a segment, or the like and transmit the same. According to an embodiment of the present disclosure, the file is an ISOBMFF file format.

According to embodiments, a file or a segment may be transmitted to a receiving device, or may be stored in a digital storage medium (e.g., USB, SD, CD, DVD, blue-ray, HDD, or SSD). The transmission processor 51005 may perform wired/wireless communication through a network such as 4G, 5G, or 6G. The transmission processor 51005 may perform a necessary data processing operation according to a network system (e.g. a communication network system such as 4G, 5G, or 6G). The transmission processor 51005 may transmit encapsulated data according to an on-demand scheme.

According to embodiments, the geometry compression-related information may be included in a header of a GPS and/or a TPS and/or geometry data unit (or a geometry slice bitstream) and transmitted by at least one of the signaling processor 51002, the geometry encoder 51003, and the transmission processor 51005.

FIG. 26 illustrates an example of a detailed block diagram of the geometry encoder 51003 according to embodiments. More specifically, FIG. 26 is a detailed block diagram of the geometry encoder 51003 for performing geometry compression based on an octree-based layer group structure according to embodiments. The elements of the geometry encoder shown in FIG. 26 may be implemented by hardware, software, a processor, and/or a combination thereof.

According to embodiments, the geometry encoder 51003 may include a group division 51031, an intra-frame prediction 51032, a selection 51033, a transform 51034, a motion estimation 51035, a motion compensation 51036, an inter-frame attribute prediction 51037, a quantization 51038, and an entropy coding 51039.

As described with reference to FIGS. 20 to 24, the group division 51031 may segment an octree structure into one or more layer groups based on position information of an octree structure of a current frame and points of input point cloud data.

For example, each layer group may include one layer or may include one or more layers. As another example, an entire octree structure having a plurality of layers may constitute one layer group. That is, the layer group may be used as a unit for representing a set of one or more layers.

According to an embodiment of the present disclosure, the group division 51031 designates a consecutive part of layers of the octree structure as one layer group. In other words, one layer group may include a consecutive part of layers of the octree structure.

In the present disclosure, the layer may be interpreted as having the same meaning as the depth. The level may be interpreted to have the same meaning as the group level or the layer group level.

The group division 51031 may segment the layer group into one or more sub-groups. In this case, a layer group that is not segmented into a plurality of sub-groups may be referred to as a sub-group. That is, when the layer group is not segmented into sub-groups, the layer group is interpreted to have the same meaning as the sub-group.

According to an embodiment of the present disclosure, when a layer group including a plurality of layers is segmented into one or more sub-groups, each sub-group is segmented into parent-child pairs.

The group division 51031 may segment the slice into a plurality of slices (or sub-slices) according to the number of layer groups and/or the number of sub-groups. For example, as shown in FIG. 22(*a*), when it is assumed that the octree structure is segmented into three layer groups and the layer group 3 is divided into 4 sub-groups, the slice is segmented into six slices, according to an embodiment.

According to an embodiment, points of point cloud data may be sorted in consideration of geometry information of each point within a slice for each slice.

In an embodiment, the intra frame prediction or the inter frame prediction is performed based on at least one of a frame unit, a slice unit, a layer group unit, or a sub-group unit.

The intra-frame prediction 51032 determines an intra prediction mode of each point based on an octree structure in the current frame, obtains the residual information of each point based on the determined intra prediction mode, and then outputs the intra prediction mode information and the residual information to the selection 51033. In another embodiment, the intra-frame prediction 51032 may predict the position information of the points included in the layer group and/or the sub-group with reference to the position information of the points in the layer group and/or the sub-group.

As described with reference to FIGS. 22 to 24, the motion estimation 51035 receives the reference frame data and performs motion estimation of the current frame for each layer group or each sub-group to obtain a global motion vector of each layer group and/or a global motion vector of each sub-group.

In an embodiment, the motion estimation 51035 may output additional detail information (that is, a difference between a vector value of an upper layer group and a vector value of a lower layer group) of a global motion vector of an upper layer group (i.e. a parent layer group).

With regard to the layer group 1 and the layer group 2 of FIG. 22 as an examples, the motion estimation 51035 may output a global motion vector value of the layer group 1 without change, may transmit a global motion vector value of the layer group 2 without change, and may output a difference between the global motion vector value of the layer group 1 and the global motion vector value of the layer group 2 (referred to as vector residual or additional detail information on the motion vector of the layer group 1).

When a specific layer group is segmented into a plurality of sub-groups, the motion estimation 51035 transfers a global motion vector (or a sub-group motion vector), which is obtained in units of sub-groups, as many as the number of sub-groups. In this case, to increase the efficiency of motion vector transfer, a motion vector of a child layer group may be output as additional detail information about a motion vector of a parent layer group in consideration of a parent-child relationship between layers of a layer group.

For example, when a motion vector of a child sub-group (n, m) is transferred, a difference value res_subgroup_mv (n,m) with respect to a motion vector of a parent sub-group (n−1, m') may be transferred. Here, n denotes a n-th layer group, and m denotes a m-th sub-group of a n-th layer group. n−1 denotes an upper layer group of a n-th layer group, and m' denotes a parent sub-group of a sub-group m.

The motion estimation 51035 may obtain a local motion vector for motion estimation in units of PUs. In an embodiment, the PU is defined within the sub-group. That is, the PU may represent a portion of the point belonging to the sub-group.

When the motion estimation 51035 performs motion estimation, the motion compensation 51036 performs motion compensation in units of layer groups and/or sub-groups based on a motion vector (MV) obtained as a result of the motion estimation as described with reference to FIGS. 23 to 24.

A process of estimating a motion vector and performing motion compensation by the motion estimation 51035 and the motion compensation 51036 is described above in detail with reference to FIGS. 20 to 24 and Equations 13 to 15, and thus a description thereof will be omitted herein.

The inter-frame attribute prediction 51037 estimates a predictor of a corresponding layer group and/or a sub-group in a layer group and/or a sub-group of a previous frame at the same group level based on a motion vector of a corresponding layer group or a sub-group, obtained by the motion estimation 51035. The inter-frame attribute prediction 51037 performs inter-frame prediction for selecting an inter-prediction mode by using the estimated predictor. That is, the inter-frame attribute prediction 51037 may find a point similar to the compression target point of the current layer group or the sub-group in the predictor generated by the motion compensation 51036, and perform inter-layer or sub-group prediction based on the found point. That is, the inter-frame attribute prediction 51037 obtains the residual information of each point on the basis of the selected inter-prediction mode and the inter-prediction mode, and then outputs the inter-prediction mode information and the residual information to the selection 51033.

The selection 51033 selects the intra-prediction mode information and the residual information output from the intra-frame predictor 51032 or the inter-prediction mode information and the residual information output from the inter-frame attribute prediction 51037, and outputs the selected information to the transform 51034. In this case, the selected residual information is output to the transform 51034, and the prediction mode information is output to the entropy coding 51039.

According to an embodiment of the present disclosure, the motion vector information of each layer group and/or sub-group obtained by the motion estimation 51035 is signaled to signaling information (e.g. a geometry data unit header) and transmitted to a receiving side. Here, the motion vector information may be an actual motion vector value or vector difference information. The transfer of the motion vector information will be described in detail with reference to FIGS. 22 to 24.

The residual information (or prediction error) of the points output from the selection 51033 is transformed from the transform 51034 to the compression domain and then quantized by the quantization 51038. In this case, when the quantization is performed, the quantized value may be updated when the quantization is performed, thereby reducing an error that may occur in the receiving device. The quantized residual information and the prediction mode information (i.e. inter-prediction mode information or intra-prediction mode information) of the points output from the selection 51033 are entropy-encoded in the entropy coding 51039 and output in the form of a geometry bitstream.

FIG. 27 is a flowchart illustrating an example of a process of encoding geometry information in an octree-based layer group structure according to embodiments. The operation shown in FIG. 27 may be performed by point cloud data transmission devices (e.g. the transmission device of FIG. 1, the encoding of FIG. 2, the point cloud video encoder of FIG. 4, the transmission device of FIG. 12, the geometry encoder of FIG. 25, or the geometry encoder of FIG. 26) or a combination thereof according to embodiments. The elements of the point cloud data transmission device according to embodiments may be configured by hardware, software, a processor, and/or a combination thereof.

The method/apparatus according to embodiments segments an octree structure into one or more layer groups, segments at least one layer group into one or more sub-groups, and then performs motion estimation and motion compensation for each layer group and/or for each sub-group. The motion prediction and motion compensation process according to the embodiments are described with reference to FIGS. 15 to 26, and thus a description thereof will be made with reference to FIGS. 20 to 26.

That is, the current depth is set to a depth start (referred to as depthStart or motion estimation depth start) and is input, and it is checked whether the current depth is equal to or smaller than the depth end (referred to as depthEnd or motion estimation depth).

When the current depth is less than or equal to the depth end, a value of numNode is set to 0 and then operation 51051 is performed, otherwise, operation 51056 is performed.

In operation S 51051, whether a value of parentSplitFlag for occupied nodes is 1 is checked. The parentSplitFlag is an internal parameter indicating whether split is performed with respect to a parent node. The parentSplitFlag may have the same meaning as the split flag. According to embodiments, whether to perform a motion estimation (or prediction) based on parentSplitFlag is determined, and for all nodes belonging to depthStart, parentSplitFlag=1 is assumed and motion prediction is performed from depthStart (operation 51052).

In operation 51052, the global motion vector is obtained in a layer group unit and/or a sub group unit by performing motion estimation based on a correlation between the layer group and/or the sub-group proposed in the present disclosure, when a value of parentSplitFlag is 1 for an occupied node (i.e., population_flag=1). Here, a process of estimating a global motion vector in units of a layer group and/or a sub-group unit and transferring motion vector information based on the estimated global motion vector is described in detail with reference to FIGS. 20 to 26, and thus a detailed description thereof will be omitted herein.

In operation 51053, a predictor similar to the layer group of the current frame and/or the compression target node (i.e. the current node) of the sub-group is obtained from the corresponding layer group and/or the sub-group of the reference frame by performing motion compensation based on the obtained motion vector.

In operation 51053, when the predictor in the reference frame is selected, a cost in the case of transmitting the motion vector and a cost in the case of performing split without transferring the motion vector are compared (operation 51054).

As the comparison result in operation 51054, when the cost in the case of transmitting the motion vector is less than the cost in the case of performing split, the split is not performed, geometry prediction between the layer groups and/or between the sub-group is performed based on the predictor when the motion vector is used, and a value of parentSplitFlag is designated as 0 (operation 51055). When inter prediction is performed in operation 51055, prediction geometry information of each point included in the used inter prediction mode, the corresponding layer group, or the sub-group is output.

When the depth is greater than the depthEnd in operation 51056, or when a value of the parentSplitFlag for occupied nodes in operation 51051, intra prediction is performed. When the intra prediction is performed in operation 51056, prediction geometry information of each point included in the used intra prediction mode, the corresponding layer group, or the sub-group is output.

In operation 51057, residual geometry information (or residual information) is estimated using the prediction geometry information and the original geometry information output in operation 51055 or 51056. The residual information estimated in operation 51057 and the prediction mode at this time are entropy-coded and output in the form of a bitstream.

Then, whether the number numNode of nodes of the current frame is equal to the maximum number maxNumNode [depth] of nodes may be compared. When the values are not the same, a value of numNode is increased by 1 and then the method is returned to operation 51051, and when the values are the same, whether the current depth is equal to maxDepth is compared. When the values are the same, the above process is terminated, and when the values are not the same, a value of the depth is increased by 1, and then the method is returned to the first operation.

A portion not described or omitted in FIG. 27 will be described with reference to FIGS. 15 to 26.

Figure 28:
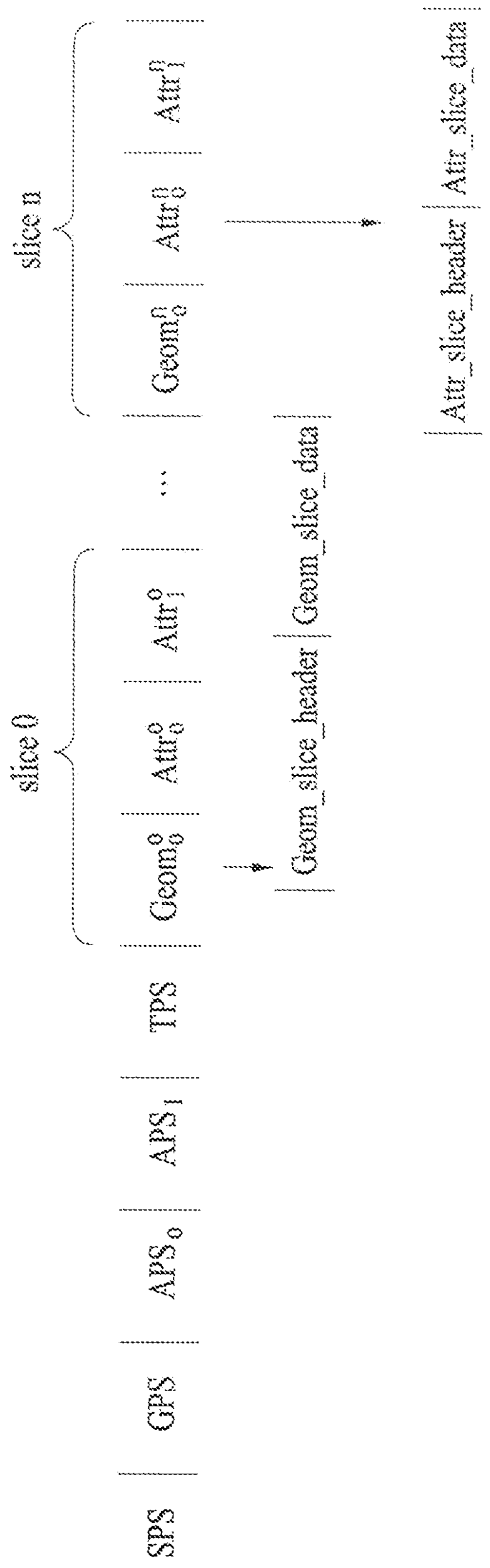
FIG. 28 illustrates an example of a bitstream structure of point cloud data for transmission/reception according to embodiments.

FIG. 28 illustrates an example of a bitstream structure of point cloud data for transmission/reception according to embodiments. According to embodiments, a bitstream output from any one point cloud video encoder of FIG. 1, FIG. 2, FIG. 4, FIG. 12, FIG. 24, and FIG. 25 may be in the form of FIG. 28.

According to embodiments of the present disclosure, a tile or a slice is provided to segment and process a bitstream of point cloud data for each region. Each region of the bitstream according to embodiments may have different importance. Therefore, when the point cloud data is segmented into tiles, different filters (encoding method) and different filter units may be applied for the respective tiles. In addition, when the point cloud data is segmented into slices, different filters and different filter units may be applied to the respective slices.

According to embodiments of the present disclosure, one or more layer groups or one or more sub-groups based on an octree structure is provided to segment and process a bitstream of point cloud data for each region.

The transmitting device and method according to the embodiments may transmit point cloud data according to the bitstream structure as shown in FIG. 28, and thus provided may be provided a method of applying different encoding operations according to importance and using an encoding method with good quality in an important area. In addition, efficient encoding and transmission according to the characteristics of point cloud data may be supporte4d and an attribute value according to user requirements may be provided.

The receiving device and method according to embodiments receives point cloud data according to the bitstream structure as shown in FIG. 28, and thus different filtering methods (decoding methods) may be applied for each region (region divided into tiles or slices) instead of using a complicated decoding (filtering) method for entire point cloud data according to the processing capacity of the receiving device. Accordingly, a better image quality in an important region to a user and appropriate latency on a system may be ensured.

When a geometry bitstream, an attribute bitstream, and/or a signaling bitstream (or signaling information) according to embodiments constitute one bitstream (or G-PCC bitstream) as shown in FIG. 28, the bitstream may include one or more sub bitstreams. A bitstream according to embodiments may include a sequence parameter set (SPS) for signaling of a sequence level, a geometry parameter set (GPS) for signaling of geometry information coding, one or more attribute parameter sets ($APS_0$ and $APS_1$)) for signaling of attribute information coding, a tile inventory for signaling at a tile level (also referred to as a TPS), and one or more slices (slice 0 to slice n). That is, a bitstream of point cloud data according to embodiments may include one or more tiles, and each tile may be a group of slices including one or more slices (slice 0 to slice n). A tile inventory (i.e., TPS) according to embodiments may include information about each tile (e.g., coordinate value information and height/size information of a tile bounding box) for one or more tiles. Each slice may include one geometry bitstream (Geom0) and/or one or more attribute bitstreams (Attr0 and Attr1). For example, slice 0 may include one geometry bitstream ($Geom0^0$) and one or more attribute bitstreams ($Attr0^0$ and $Attr1^0$).

The geometry bitstream in each slice may include a geometry slice header (geom_slice_header) and geometry slice data (geom_slice_data). According to embodiments, the geometry bitstream within each slice is also referred to as a geometry data unit, the geometry slice header is referred to as a geometry data unit header, and the geometry slice data is referred to as geometry data unit data. A geometry slice header (or geometry data unit header) according to embodiments may include information (geomBoxOrigin, geom_box_log 2_scale, geom_max_node_size_log 2, geom_num_points) and the like about data included in identification information (geom_parameter_set_id), a tile identifier (geom_tile_id), a slice identifier (geom_slice_id), and geometry slice data (geom_slice_data) of a parameter set included in a geometry parameter set (GPS). geomBoxOrigin is geometry box origin information indicating the box origin of the corresponding geometry slice data, geom_box_log 2_scale is information indicating a log scale of the corresponding geometry slice data, geom_max_node_size_log 2 is information indicating the size of the root geometry octree node, and geom_num_points is information related to information related to the number of points of the corresponding geometry slice data. Geometry slice data (or geometry data unit data) according to embodiments may include geometry information (or geometry data) of point cloud data within a corresponding slice.

Each attribute bitstream in each slice may include attribute slice header (attr_slice_header) and attribute slice data (attr_slice_data). According to embodiments, an attribute bitstream within each slice is also referred to as an attribute data unit, an attribute slice header is referred to as an attribute data unit header, and attribute slice data is referred to as attribute data unit data. An attribute slice header (or attribute data unit header) according to embodiments may include information about the corresponding attribute slice data (or corresponding attribute data unit), and the attribute slice data may include attribute information (also referred to as attribute data or attribute value) of point cloud data in the corresponding slice. When there are a plurality of attribute bitstreams in one slice, each attribute bitstream may include different attribute information. For example, one attribute bitstream may include attribute information corresponding to color, and another attribute stream may include attribute information corresponding to reflectance.

According to embodiments, parameters required for encoding and/or decoding of point cloud data may be defined in parameter sets of point cloud data (e.g., SPS, GPS, APS, and TPS (also referred to as a tile inventory)) and/or a header of the corresponding slice. For example, during encoding and/or decoding of geometry information, the parameters may be added to a geometry parameter set (GPS), and during tile-based encoding and/or decoding, the parameters may be added to a tile and/or a slice header.

According to embodiments, geometry compression-related information may be signaled to at least one of a geometry parameter set, a geometry slice header (also referred to as a geometry data unit header), or geometry slice data (also referred to as geometry data unit data).

According to embodiments, geometry compression-related information may be signaled to an attribute parameter set and/or an attribute slice header (also referred to as an attribute data unit header) in connection with an attribute coding method or applied to attribute coding.

According to embodiments, the geometry compression-related information may be signaled to a sequence parameter set and/or a tile parameter set.

According to embodiments, when a syntax element defined below is to be applied to a plurality of point cloud data streams as well as the current point cloud data stream, the geometry compression-related information may be transferred through a parameter set of a higher concept, and the like.

According to embodiments, the geometry compression-related information may be defined in a corresponding position or a separate position depending on the application or system, and an application range, an application method, and the like may be used differently. A field, a term used in syntaxes of the present specification described below, may have the same meaning as a parameter or a syntax element.

According to embodiments, parameters (which may be variously called metadata, signaling information, and the like) including the geometry compression-related information may be generated by a metadata processor (or metadata generator) or a signaling processor of a transmitting device, and may be transferred to a receiving device to be used in a decoding/reconstruction process. For example, a parameter generated and transmitted by a transmitting device may be obtained from a metadata parser of the receiving device.

According to embodiments, when inter prediction is performed in the octree-based layer group structure proposed by the present disclosure, one slice may transmit a geometry bitstream of one layer group. According to embodiments, one slice may transmit a geometry bitstream of one subgroup.

FIG. 29 shows an example of a syntax structure of a geometry parameter set (geometry_parameter_set( )) (GPS) according to an embodiment of the present disclosure. The GPS according to embodiments may include information about a method of encoding geometry information of the point cloud data contained in one or more slices.

The GPS according to the embodiments may include a geom_tree_type field. The geom_tree_type field indicates whether the position information (i.e., geometry information) is encoded using an octree or a predictive tree. For example, geom_tree_type equal to 0 indicates that the position information (i.e., geometry information) is encoded using an octree, while geom_tree_type equal to 1 indicates that the position information (i.e., geometry information) is encoded using a predictive tree.

When a value of the geom_tree_type field is 0, that is, when position information (i.e., geometry information) is indicated to be encoded using an octree, the geometry parameter set according to embodiments may further include a layer_group_enabled_flag field.

When a value of the layer_group_enabled_flag field is 1, this specifies that a geometry bitstream of a frame or a tile is contained in multiple slices matched to coding layers (or layer) of a group or a sub-group thereof. When a value of the layer_group_enabled_flag field is 0, this specifies that a geometry bitstream of a frame or a tile is contained in a single slice.

When a value of the layer_group_enabled_flag field is 1, the geometry parameter set may include a num_layer_groups_minus1 field.

1 may be added to the num_layer groups_minus1 field to indicate the number of layer groups. In this case, the layer group indicates a group of consecutive layers as a portion of a geometry coding tree structure (e.g., octree). A value of the num_layer_groups_minus1 field may be between 0 and the number of layers.

A GPS according to embodiments includes an iteration that repeats as many times as a value of the num_layer_groups_minus1 field.

The iteration may include a layer_group_id field, a num_layers_minus1 field, and a sub-group_enabled_flag field.

The layer_group_id field specifies an indicator of a layer group of a frame or a tile. That is, an i-th layer gropu may be identified in an octree structure using a value of the layer_group_id field. A range of values of the layer group_id field may be between 0 and a value of the num_layer groups_minus1 field.

1 may be added to the num_layers_minus1 field to indicate the number of coding layers contained in an i-th layer group. According to embodiments, a total number of layer groups may be derived by adding all values (num_layers_minus1[i]+1) for each i corresponding to num_layer_groups_minus1 from 0.

When a value of the sub-group_enabled_flag field is 1, this specifies that the current layer group includes sub-groups to be contained in multiple slices. When a value of the sub-group_enabled_flag field is 0, this specifies that the current layer group is contained in a single slice. The sub-groups are exclusive each other and the sum of sub-groups is identical to the layer-group.

The GPS according to embodiments may further include a num_sub-groups_minus1 field when a value of the sub-group_enabled_flag field is 1.

1 may be added to a value of the num_sub-groups_minus1 field to specify the number of sub-groups contained in a layer group identified by a value of the layer_group_id field.

The GPS according to embodiments may further include an iteration that repeats as many times as a value of the num_sub-groups_minus1 field.

The iteration may further include a sub-group_id field, a sub-group_bbox_origin_bits_minus1 field, and a sub-group_bbox_size_bits_minus1 field.

The sub-group_id field specifies an indicator of a j-th sub-group contained in a layer group identified by a value of the layer_group_id field. That is, the sub-group_id field may identify a j-th sub-group contained in a layer group identified by a value of the layer_group_id field. A range of range of the sub-group_id field may be between 0 and num_sub-groups_minus1 [layer_group_id]. Here, the sub-group_id field may represent an order of slices within the same layer_group_id field. When the field is not present, a value of the field may be inferred to be 0.

1 may be added to a value of the sub-group_bbox_origin_bits_minus1 field to specify a length in bits of a subsequent sub-group_bbox_origin field.

The GPS according to embodiments may include a sub-group_bbox_origin field and a sub-group_bbox_size field for each dimension.

The sub-group_bbox_origin field specifies an origin of a sub-group bounding box of a sub-group indicated by a sub-group_id field in a layer group indicated by a value of the layer_group_id field.

1 may be added to a value of the sub-group_bbox_size_bits_minus1 field to specify a length in bits of a subsequent sub-group_bbox_size field.

The sub-group_bbox_size field specifies a size of a sub-group bounding box of a sub-group indicated by a sub-group_id field in a layer group indicated by a value of the layer_group_id field.

According to embodiments of the present disclosure, fields contained in the GPS of FIG. 29 may be referred to as geometry compression related information.

FIG. 30 is a diagram showing an example of a syntax structure of geometry_data_unit( ) according to embodiments.

The geometry_data_unit( ) according to embodiments may include geometry_data_unit_header( ), byte_alignment( ), and geometry_data_unit_footer( ).

When a value of the geom_tree_type field contained in the geometry parameter set is 0, the geometry_data_unit( ) according to embodiments may further include geometry_octree( ), and when the value of the geom_tree_type field contained in the geometry parameter set is 1, the geometry_data_unit( ) may further include geometry_predtree_data( ).

FIG. 31 is a diagram showing an example of a syntax structure of geometry_data_unit_header( ) according to embodiments.

In FIG. 31, a gsh_geometry_parameter_set_id field specifies a value of the gps_geom_parameter_set_id field of an active GPS.

The gsh_tile_id field specifies an identifier of a corresponding tile referenced by the corresponding geometry_data_unit_header( ).

When a value of the dependent_slice_flag field is 1, this specifies that the corresponding slice is dependent to a slice indicated by the ref_slice_id field and the ref_layer_group_id field. When the value of the dependent_slice_flag field is 0, this specifies that the corresponding slice is not dependent to another slice and may be a start of decoding of related slices.

The gsh_slice_idfield specifies an identifier of a corresponding slice for reference by other syntax elements.

The slice_tag field may be used to identify one or more slices having a specific value of slice_tag.

The frame_ctr_lsb field specifies least significant bits (LBS) of a notional frame number counter.

When a value of the dependent_slice_flag field is not true, that is, when the corresponding geometry bitstream is not dependent on other slices, and a value of the layer_group_enabled_flag field is true, the geometry_data_unit_header( ) according to embodiments may further include a layer_group_id field, a num_points_bits_minus1 field, a num_points field, and a global_motion_vector field.

The layer group_enabled_flag field is a field contained in the GPS, and when a value of the field is 1, this specifies that a geometry bitstream of a frame or a tile is contained in coding layers (or layers) of a layer group or multiple slices matched to a sub-group thereof.

The layer group_id field specifies an indicator of a layer group of a frame or a tile. That is, the field may identify a layer group related to a slice identified by the gsh_slice_idfield. For example, the layer group identified by the layer_group_id field may be a root layer group including the uppermost layer in an octree structure.

1 may be added to the num_points_bits_minus1 field to specify the length in bits of a subsequent num_points field.

The num_points field specifies the number of points output by decoding the current slice.

The global_motion_vector field specifies a global vector value of a layer group identified by the layer group_id field.

When a value of the dependent_slice_flag field is true, that is, when the corresponding slice is dependent on a slice indicated by the ref_slice_id field and ref_layer_group_id field, and a value of the layer_group_enabled_flag field is true, the geometry_data_unit_header( ) according to embodiments may further include a layer_group_id field, a ref_slice_id field, a ref_context_slice_id field, a global_motion_vector field, a num_points_bits_minus1 field, and a num_points field.

The layer_group_id field specifies an indicator of a layer group of a frame or a tile. That is, a layer group related to a slice identified by the gsh_slice_idfield may be identified. For example, the layer group identified by the layer_group_id field may be one of the remaining layer groups excluding the root layer group in the octree structure.

The ref_slice_id field specifies an indicator of a corresponding reference slice. A range of values of the ref_slice_id field may be within a range of the slice_id field used for the current frame or the current tile.

The ref_context_slice_id field specifies an indicator of a reference layer group. A range of values of the ref_context_slice_id field may be within a range between 0 and a value of a num_layer group_minus1field of the current frame or the current tile. The ref_context_slice_id field may be referred to as a ref_layer_group_id field.

1 may be added to the num_points_bits_minus1 field to specify the length in bits of a subsequent num_points field.

The num_points field specifies the number of points output by decoding the current slice.

The global_motion_vector field represents global motion vector information of a layer group identified by the layer group_id field. In this case, the layer group identified by the layer group_id field is not the uppermost layer group (i.e., a root layer group) in an octree structure, and thus global motion vector information transferred by the global_motion_ vector field may be additional detail information (i.e., a difference value between a motion vector value of layer group 1 and a motion vector value of layer group 2) for a motion vector of an upper layer group of the layer group identified by the layer_group_id field. With regard to FIG. 22 as an example, when the layer group identified by the layer group_id field is the layer group 2, motion vector information transferred by the global_motion_vector field may be additional detail information (i.e., a difference value between a motion vector value of the layer group 1 and a motion vector value of the layer group 2) for a motion vector of the layer group 1. According to another embodiment, motion vector information transferred by the global_motion_ vector field may be an actual global motion vector value obtained in the layer 2.

When a value of the sub-group_enabled_flag field is true, the geometry_data_unit_header( ) according to embodiments may further include a sub-group_id field, a sub-group_bbox_origin_bits_minus1 field, and a sub-group_bbox_size_bits_minus1 field.

The sub-group_id field specifies an indicator of a sub-group contained in a layer group identified by a value of the layer_group_id field.

1 may be added to a value of the sub-group_bbox_origin_bits_minus1 field to specify the length in bits of a subsequent sub-group_bbox_origin field.

1 may be added to a value of the sub-group_bbox_size_bits_minus1 field to specify the length in bits of a subsequent sub-group_bbox_size field.

The geometry_data_unit_header( ) according to embodiments may include a sub-group_bbox_origin field and a sub-group_bbox_size field for each dimension.

The sub-group_bbox_origin field specifies an origin of a sub-group bounding box of a sub-group indicated by the sub-group_id field within a layer group indicated by a value of the layer_group_id field.

The sub-group_bbox_size field represents a size of a sub-group bounding box of a sub-group indicated by the sub-group_id field within a layer group indicated by a value of the layer_group_id field.

The geometry_data_unit_header( ) according to embodiments may further include a ref_sub-group_id field when a value of the sub-group_enabled_flag field is true.

The ref_sub-group_id field specifies an indicator of a reference sub-group of a layer group indicated by the ref_layer_group_id field. A range of values of the ref_sub-group_id field may be a range between 0 and a value of the num_sub-group_id_minus1 field of the current layer group. When the field is not pre sent, a value of the field may be inferred to be 0.

When a value of the layer_group_enabled_flag field is 1 and a value of the dependent_slice_flag field is 0, common information for an entire slice and information a layer-group 1 may be transferred. When a value of the layer group_enabled_flag field is 1 and a value of the dependent_slice_flag field is 1, it may be seen that common information is not provided and only additional information required to decode the current slice is provided. The ref_slice_id field may be defined to designate a first slice having common information for decoding among slices segmented by layer group slicing.

It is also possible to use the context of a previous slice to obtain generally high coding efficiency. However, to enable parallel processing of a sub-group belonging to the same layer group, a ref_context_slice_id field may be designated to indicate a slice at a parent level or an ancestor level.

The geometry_data_unit_header( ) according to embodiments may further include a local_motion_vector_present_flag field, and when a value of the local_motion_vector_present_flag field is true, the geometry_data_unit_header( ) may further include a ref_frame_id field, a mv_depth_start field, and a mv_depth_end field.

The local_motion_vector_present_flag field indicates whether local motion vector information is present in the corresponding sub-group or layer group. For example, when a value of the local_motion_vector_present_flag field is 1, this may indicate that a local motion vector is to be transferred within a corresponding sub-group.

The ref_frame_id field may indicate an index of a reference frame used for PU prediction. The mv_depth_start field and the mv_depth_end field may represent a start and end of an octree depth in which a motion vector is to be transferred.

That is, when a value of the local_motion_vector_present_flag field is 1, a local motion vector may be present for each sub-group between a value of the mv_depth_start field and a value of the mv_depth_end field, and in this case, the mv_depth_start field and the mv_depth_endfield may be determined within a range of a tree depth contained in the layer group. When the local motion vector is used, a motion vector may be transferred units of local motion vector prediction within a sub-group. Detailed motion information may be transferred with respect to an object that is independent of a region with a lot of movement or movement of a global motion vector/sub-group motion vector. For example, this may correspond to a case in which, when a vehicle obtains point cloud data while driving, there is an object moving in a direction different from a driving direction of the vehicle.

When a value of the local_motion_vector_present_flag field is 0, a local motion vector is not used for the corresponding sub-group, and in this case, only the sub-group motion vector (i.e. the global motion vector) is used. In this case, the sub-group motion vector instead of the global motion vector may be used as the local motion vector by using the same motion vector for a bounding box range of the sub-group.

According to embodiments, when a value of the dependent_slice_flag field is 1 and a value of the layer_group_enabled_flag field is 1, the global motion vector may be transferred in units of sub-groups. In this case, the global motion vector carries the motion vector of the sub-group bounding box unit, and thus the global motion vector may refer to a motion vector relative to the existing global motion vector and may be referred to as a sub-group motion vector.

In this case, the sub-group motion vector is transmitted as many as the number of sub-groups included in the corresponding layer group, and thus the motion vector of the child layer group may be transmitted as the additional detail information about the motion vector of the parent layer group in consideration of the parent child relationship between the layers of the layer group. The details of transmitting the additional detail information on the motion vector of the parent layer group are described in Equations 13 to 15, and thus a description thereof will be omitted herein.

As described above, when the sub-group motion vector is used, the reference frame may be determined by prior appointment, and when the reference frame needs to be changed in units of sub-groups or in units of layer groups, sub-group_mv_ref_frame_id for the global motion vector may be separately signaled in the geometry_data_unit_header( ).

As described above, the motion vector is segmented according to a layer group and additional detail information (e.g. res_sub-group_mv) is transferred, and thus only some bits of the motion vector are used in a situation of the layer group skip, thereby increasing bit efficiency.

According to embodiments of the present disclosure, the above fields contained in the geometry data unit of FIG. 31 may be referred to as geometry compression related information.

FIG. 32 is a diagram showing an example of a syntax structure of data_unit( ) according to embodiments. According to an embodiment, the data_unit( ) of the data unit of FIG. 32 corresponds to a payload part located after the geometry_data_unit_header( ) of FIG. 31 and residual information of geometry is transferred.

In FIG. 32, split_flag[i][j] field indicates whether to split a j-th node among nodes belonging to an i-th octree depth of an octree. For example, when a value of the split_flag[i][j] field is 1, a motion vector for a j-th node of an i-th octree depth is transferred after a child is split. That is, the j-th node of the i-th octree depth is split. When a value of the split_flag[i][j] field is 0, a motion vector for the j-th node of the i-th octree depth is transferred. That is, the j-th node of the i-th octree depth is not split, and thus a motion vector is transferred in the j-th node.

The pupolation_flag[i][j] field is included when a value of the split_flag[i][j] field is 0, and indicates whether the j-th node among the nodes belonging to the i-th octree depth of the octree is occupied. For example, when a value of the pupolation_flag[i][j] field is 1, a j-th node of an i-th octree depth is occupied, and when the value of the pupolation_flag [i][j] field is 0, the j-th node of the i-th octree depth is not occupied. That is, the pupolation_flag[i][j] may indicate whether a non-split node is occupied.

When a value of the pupolation_flag[i][j] field is 1, the motion_vector[i][j][k] field is included, and indicates a motion vector for each axis of a j-th node among nodes belonging to the i-th octree depth of the octree. Here, k represents x, y, and z axes.

The motion_vector[i][j][k] field may transfer the residual information of a j-th node among nodes belonging to an i-th octree depth of an octree. Here, k represents x, y, and z axes.

FIG. 33 is a diagram showing another example of a point cloud data reception device according to embodiments. Elements of the point cloud data reception device shown in FIG. 33 may be implemented by hardware, software, processor, and/or a combination thereof.

According to embodiments, the point cloud data reception device may include a reception processor 61001, a signaling processor 61002, the geometry decoder 61003, an attribute decoder 61004, and a post-processor 61005.

The reception processor 61001 according to embodiments may receive one bitstream or may receive each of a geometry bitstream, an attribute bitstream, and a signaling bitstream. When receiving a file and/or a segment, the reception processor 61001 according to embodiments may decapsulate the received file and/or segment and output the decapsulated file and/or segment in a bitstream.

When receiving (or decapsulating) one bitstream, the reception processor 61001 according to embodiments may demultiplex a geometry bitstream, an attribute bitstream, and/or a signaling bitstream from one bitstream, output the demultiplexed signaling bitstream to the signaling processor 61002, output the geometry bitstream to the geometry decoder 61003, and output the attribute bitstream to the attribute decoder 61004.

When receiving (or decapsulating) a geometry bitstream, an attribute bitstream, and/or a signaling bitstream, the reception processor 61001 according embodiments may transfer the signaling bitstream to the signaling processor 61002, transfer the geometry bitstream to the geometry decoder 61003, and transfer the attribute bitstream to the attribute decoder 61004.

The signaling processor 61002 may parse and process information included in signaling information, e.g., SPS, GPS, APS, TPS, and metadata from the input signaling bitstream and provide the parsed and processed information to the geometry decoder 61003, the attribute decoder 61004, and the post-processor 61005. According to another embodiment, signaling information included in the geometry data unit header and/or the attribute data unit header may also be pre-parsed by the signaling processor 61002 prior to decoding of corresponding slice data.

According to embodiments, the signaling processor 61002 may also parse and process signaling information (e.g., geometry compression-related information) signaled to GPS and/or the geometry data unit header and provide the parsed and processed information to the geometry decoder 61003.

According to embodiments, the geometry decoder 61003 may perform a reverse process of the geometry encoder 51003 of FIG. 25 based on signaling information on the compressed geometry bitstream to restore geometry. The geometry information restored (or reconstructed) by the geometry decoder 61003 is provided to the attribute decoder 61004. The attribute decoder 61004 may restore an attribute by performing a reverse process of the attribute encoder 51004 of FIG. 25 based on signaling information and reconstructed geometry information for the compressed attribute bitstream.

According to embodiments, the post-processor 61005 may reconstruct point cloud data by matching geometry information (i.e., positions) restored and output from the geometry decoder 61003 with attribute information restored and output from the attribute decoder 61004 and display/render the matched information.

Figure 34:
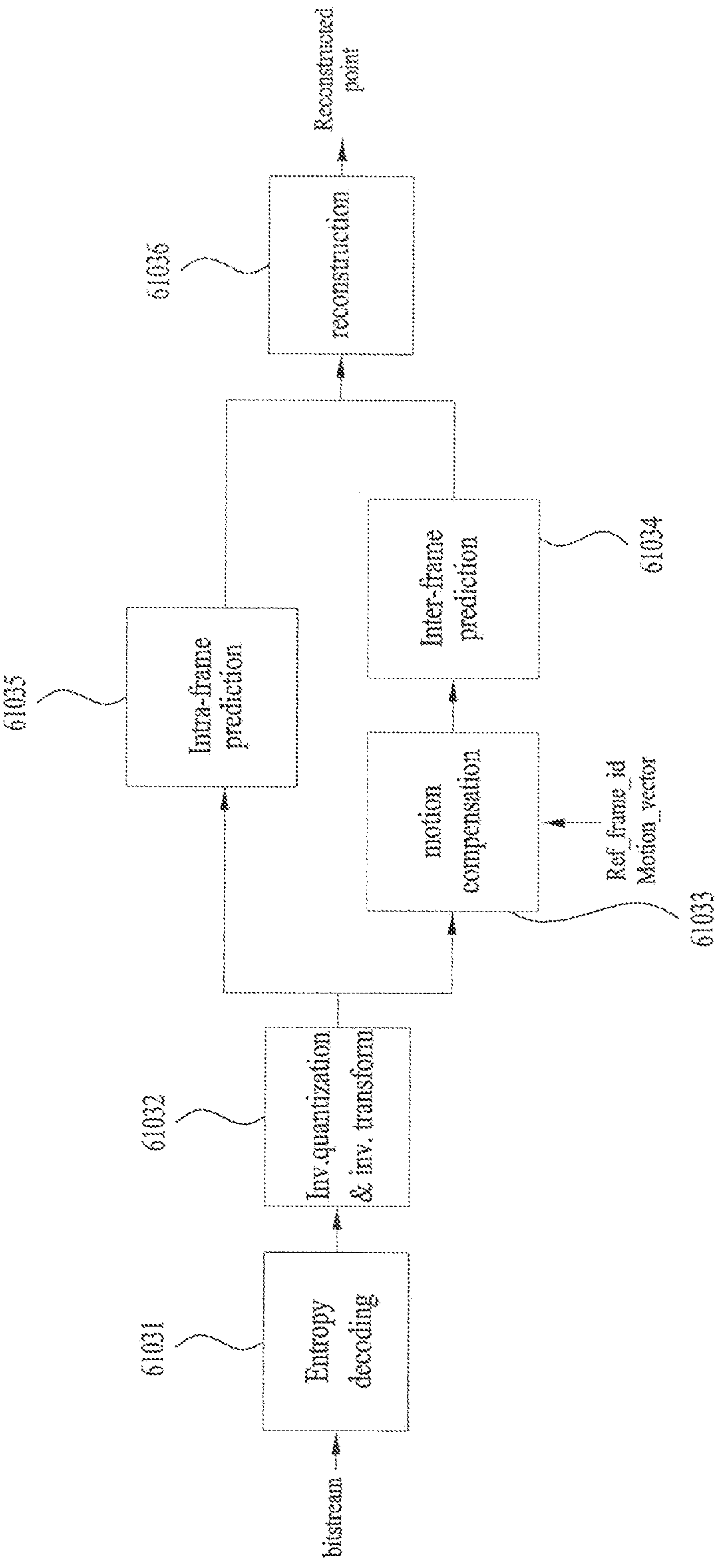
FIG. 34 is a diagram showing an example of a detailed block diagram of a geometry decoder according to embodiments.

FIG. 34 is a diagram showing an example of a detailed block diagram of the geometry decoder 61003 according to embodiments. FIG. 34 illustrates an example of a detailed block diagram of a geometry decoder for restoring geometry information based on an octree-based layer group structure.

According to embodiments, the geometry decoder 61003 may include an entropy decoding 61031, an inv. quantization & inv. transform 61032, a motion compensation 61033, an inter-frame prediction 61034, an intra-frame prediction 61035, and a reconstruction 61036.

The elements of the geometry decoder shown in FIG. 34 may be implemented in hardware, software, a processor, and/or a combination thereof. In FIG. 34, the order of performing each block may be changed, some blocks may be omitted, and some blocks may be newly added.

According to embodiments, when the reception processor 61001 obtains a bitstream, the geometry compression related information described with reference to FIGS. 29 to 32 may be obtained.

According to embodiments, the geometry decoder 61003 restores geometry information by performing an inverse process of the geometry encoder of the transmission device.

That is, the entropy decoding unit 61031 entropy-decodes the residual information (i.e. the prediction error) and the prediction mode information for the points of each slice included in the bitstream input through the reception processor 61001, and outputs the entropy-decoded residual information (i.e. prediction error) and the prediction mode information to the inv. quantization & inv. transform 61032.

The inv. quantization & inv. transform 61032 inverse quantizes and inversely transforms the entropy-decoded residual information.

According to embodiments, the inv. quantization & inv. transform 61032 or a separate block may configure an octree based on an occupancy code and geometry compression related information obtained from the entropy-decoded geometry bitstream (or information on geometry ensured from the decoding result), segment the octree into one or more layer groups as in the transmission side, and segments a specific layer group among the segmented layer groups into a plurality of sub-blocks. That is, the same octree-based layer group structure may be generated from the transmitting side.

According to embodiments, the inv. quantization & inv. transform 61032 or the separate block checks whether the entropy-decoded prediction mode information is inter prediction mode information or intra prediction mode information, outputs the inter prediction mode information and the inversely transformed residual information to the motion compensation 61033 when the entropy-decoded prediction mode information is the inter prediction mode information, and outputs the intra prediction mode information and the inversely transformed residual information to the intra-frame prediction 61035 when the entropy-decoded prediction mode information is the intra prediction mode information.

The motion compensation 61033 may generate a predictor by performing motion compensation in units of layer groups and/or in units of sub-groups based on signaling information including GPS and/or geometry compression related information included in the geometry_data_unit_header( ).

For example, as shown in FIG. 22, it is assumed that the global motion vector value obtained in the layer group 1 is transmitted as motion vector information without change, and additional detail information (i.e., a difference between a motion vector value of the layer group 1 and a motion vector value of the layer group 2) for a motion vector of the layer group 1 instead of an actual motion vector value obtained in the layer group 2 is transmitted for the layer group as motion vector. In this case, the motion vector information is included in the geometry_data_unit_header( ) of FIG. 31.

In this case, when performing motion compensation of the layer group 2, the motion compensation 61033 may restore a motion vector value of the layer group 2 based on a global motion vector value of the layer group 1. That is, a motion vector value of the layer group 2 may be restored by adding additional detail information (i.e., a difference value between the motion vector value of the layer group 1 and the motion vector value of the layer group 2) for the motion vector of the layer group 1, to the motion vector value of the layer group 1.

According to embodiments, when a specific layer group is segmented into a plurality of sub-groups, a global motion vector (or sub-group motion vector) obtained in units of sub-groups is transferred as many as sub-groups, and thus it is assumed that a motion vector of a child layer group is transferred as additional detail information for a motion vector of a parent layer group in consideration a parent-child relationship between layers of the layer group.

For example, when a motion vector of a child sub-group (n, m) is transferred, if a difference value (res_sub-group_mv(n,m)) with a motion vector of a parent sub-group (n−1, m') is transferred, the motion compensation 61033 may restore the motion vector sub-group_MV(n, m) of the child sub-group based on the motion vector sub-group_MV (n−1, m') of the parent sub-group like in Equation 13.

The motion compensation process in the motion compensation 61033 is described above in detail with reference to FIGS. 23 and 24, and Equations 13 to 15, and a portion that is not described will be described with reference to FIGS. 23 and 24, and Equations 13 through 15.

The inter-frame prediction 61034 performs inter prediction between layer groups and/or between inter-groups based on the motion compensation result of the motion compensation 61033 to generate a prediction value (or predicted information).

The reconstruction 61036 restores a final point by adding the predicted information of the decoded point generated by the inter-frame prediction 61034 and the residual information (or prediction residual information) received together with the inter-prediction mode information. That is, the reconstruction 61036 reconstructs (or restores) the geometry information (i.e. the position of the final point) using the information predicted through the inter prediction and the residual information at this time.

The intra-frame prediction 61035 performs prediction (that is, intra-frame prediction) in a frame, a layer group, or a sub-group by using intra-prediction mode information to generate a prediction value (or predicted information).

The reconstruction 61036 restores the final point by adding the predicted information of the decoded point generated by the intra-frame prediction 61035 and the residual information (or prediction residual information) that is received together with the intra prediction mode information and restored through decoding. That is, the reconstruction 61036 reconstructs (or restores) the geometry information (i.e. the position of the final point) using the information predicted through the intra prediction and the residual information at this time.

Figure 35:
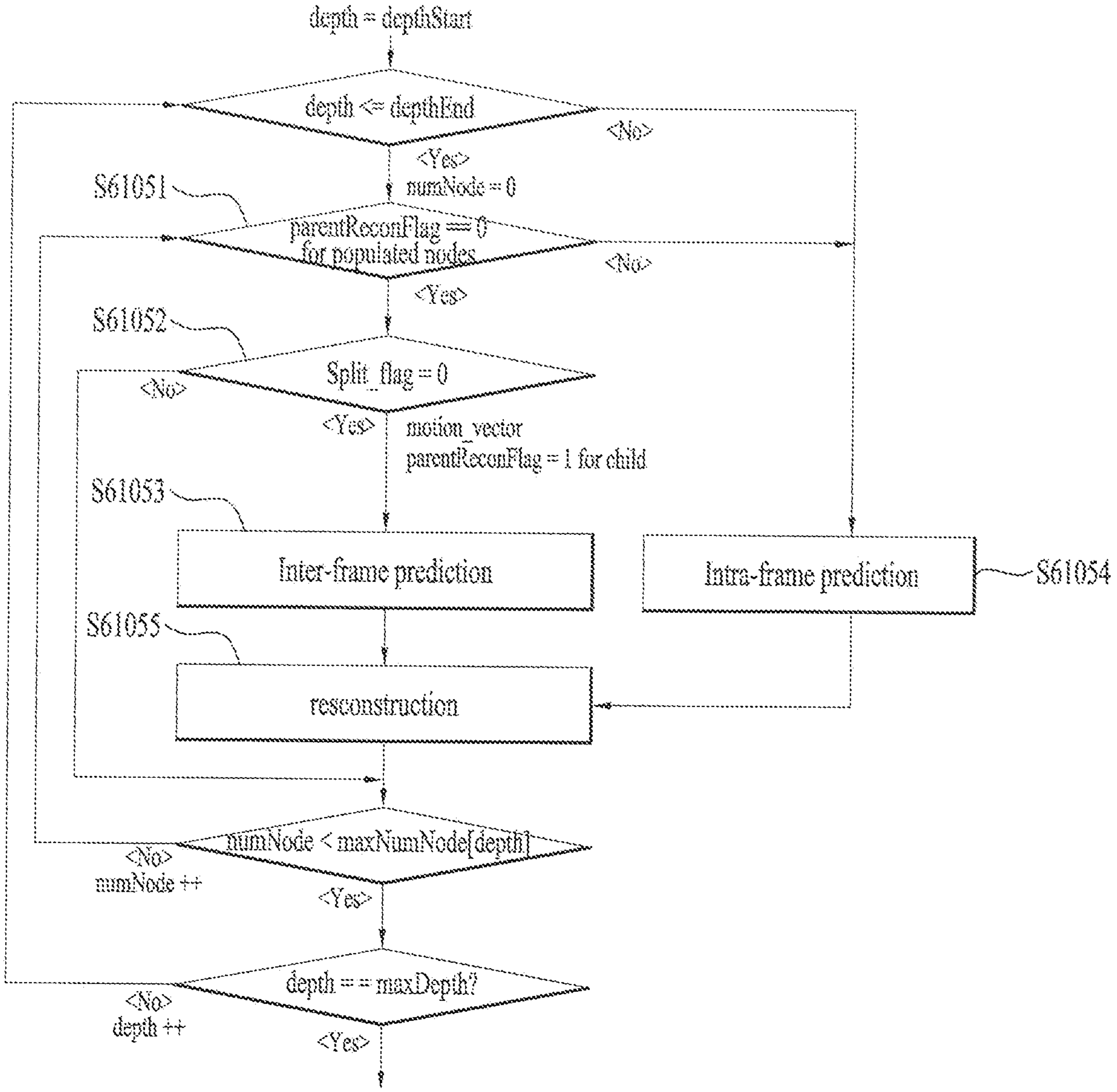
FIG. 35 is a flowchart of an example of a geometry decoding method according to embodiments.

FIG. 35 is a flowchart illustrating an example of a geometry decoding method for restoring a compressed geometry based on a layer group structure of an octree according to embodiments. The operation shown in FIG. 35 may be performed by a point cloud data receiving device (e.g. the receiving device of FIG. 1, the decoding of FIG. 2, the point cloud video decoder of FIG. 11, the receiving device of FIG. 13, the geometry decoder of FIG. 33, or the geometry decoder of FIG. 34) or a combination thereof according to embodiments. The elements of the point cloud data reception device according to embodiments may be configured by hardware, software, a processor, and/or a combination thereof.

The current depth is set to a depth start (referred to as a depthStart or a motion estimation depth start) and is input, and it is checked whether the current depth is equal to or smaller than the depth end (referred to as the depthEnd or motion estimation depth end).

When the current depth is less than or equal to the depth end, a value of the numNode is set to 0 and then operation 61051 is performed, otherwise, operation 61054 is performed. In operation 61051, it is determined whether a value of parentReconFlag for the populated nodes is 0. The parentReconFlag is an internal parameter indicating whether a parent node is decoded. That is, when a value of ParentReconFlag is 1, geometry may be reconstructed using a geometry prediction value in a frame, a layer group, or a sub-group based on intra prediction (operation 61054), and when the value of ParentReconFlag is 0, this means that there is an MV for the current node, and thus a split_flag field included in the geometry compression related information may be checked to determine whether to decode the split_flag field (operation 61052).

According to an embodiment, when a value of the split_flag field is 1, additional split may be performed, and thus the MV is not transferred. In contrast, when the value of the split_flag field is 0, geometry prediction may be performed through a prediction block for which a motion is compensated using a motion vector included in the geometry compression related information within a reference frame specified by the reference_frame_idfield included in the geometry compression related information (operation 61053). The motion compensation process in operation 61053 is described above in detail with reference to FIGS. 23 and 24 and Equations 13 to 15, and thus a detailed description thereof is omitted herein.

A final point may be restored by adding predicted information of the decoded point generated in operation 61053 or 61054 and residual information received together with the predicted information of the generated decoded point (operation 61055). That is, in operation 61055, the geometry information (i.e., the position of the final point) may be reconstructed (or restored) using information predicted through inter prediction or intra prediction and the residual information at this time.

Then, whether the number of nodes of the current frame is equal to the maximum number (maxNumNode [depth]) of nodes. When the values are not the same, the value of numNode is increased by 1 and then the method is returned to operation 61051, and when the values are the same, whether the current depth is equal to maxDepth is compared. When the values are the same, the above process is terminated, and when the values are not the same, a depth value is increased by 1, and then the method may be returned to the first operation.

A portion not described or omitted in FIG. 35 will be described with reference to FIGS. 15 to 34.

Figure 36:
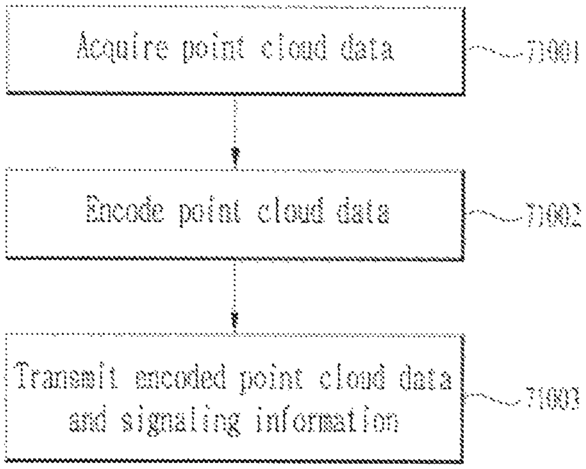
FIG. 36 is a flowchart of a point cloud data transmission method according to embodiments.

FIG. 36 is a flowchart of a point cloud data transmission method according to embodiments.

The point cloud data transmission method according to embodiments may include obtaining point cloud data (71001), encoding the point cloud data (71002), and transmitting the encoded point cloud data and signaling information (71003). In this case, a bitstream including the encoded point cloud data and the signaling information may be encapsulated and transmitted in a file.

In operation 71001 of obtaining the point cloud data, some or all of operations of the point cloud video acquisition unit 10001 of FIG. 1 may be performed or some or all of operations of the data input unit 12000 of FIG. 12 may be performed.

In operation 71002 of encoding the point cloud data, some or all of operations of the point cloud video encoder 10002 of FIG. 1, the encoding 20001 of FIG. 2, the point cloud video encoder of FIG. 4, the point cloud video encoder of FIG. 12, the geometry encoder of FIG. 25, the geometry encoder of FIG. 26, or the geometry encoding process of FIG. 27 may be performed to encode the geometry information.

In operation 71002 of encoding the point cloud data according to embodiments, the aforementioned octree structure may be split into one or more layer groups. A specific layer group may be re-segmented into one or more subgroups. Motion estimation may be performed in units of layer groups and/or in units of sub-groups to obtain a global motion vector of a layer group unit or a sub-group unit and to compress geometry information.

The description of FIGS. 15 to 31 may be referenced for splitting a layer group and/or a sub-group based on the octree structure and performing motion estimation and compensation based on the split layer group and/or sub-group. The geometry information (e.g. residual information and/or prediction mode information) of each compressed point is entropy-encoded and then output in the form of a geometry bitstream.

According to embodiments, in operation 71002 of encoding the point cloud data, attribute information is compressed based on positions at which geometry encoding is not performed and/or reconstructed geometry information. According to an embodiment, the attribute information may be coded by combining one or more of RAHT coding, LOD-based predictive transform coding, and lifting transform coding.

In the present specification, the signaling information may include geometry compression related information. According to an embodiment, the geometry compression related information is included in the geometry_data_unit_header( ) According to another embodiment, the geometry compression related information may be signaled to SPS, GPS, APS, or TPS. The geometry compression related information is described above, and thus a detailed description thereof is not omitted herein.

Figure 37:
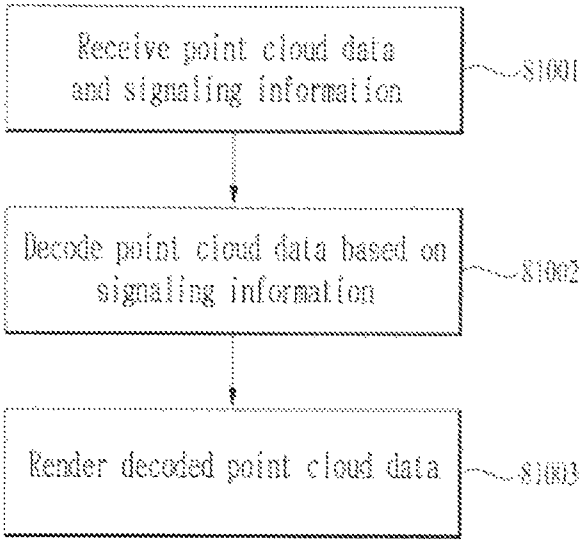
FIG. 37 is a flowchart illustrating a point cloud data reception method according to embodiments.

FIG. 37 is a flowchart illustrating a point cloud data reception method according to embodiments.

The point cloud data reception method according to embodiments may include receiving encoded point cloud data and signaling information (81001), decoding point cloud data based on the signaling information (81002), and rendering the decoded point cloud data (81003).

Operation 81001 of receiving the point cloud data and the signaling information according to embodiments may be performed in the receiver 10005 of FIG. 1, the transmission 20002 or the decoding 20003 of FIG. 2, and the receiver 13000 or the reception processor 13001 of FIG. 13.

In operation 81002 of decoding the point cloud data according to embodiments, some or all of operations of the point cloud video decoder 10006 of FIG. 1, the decoding 20003 of FIG. 2, the point cloud video decoder of FIG. 11, the point cloud video decoder of FIG. 13, the geometry decoder of FIG. 33, the geometry decoder of FIG. 34, or the geometry decoding process of FIG. 35 may be performed to decode the geometry information.

In operation 81002 of decoding the point cloud data according to embodiments, motion compensation may be performed in units of layer groups and/or in units of sub-groups based on geometry compression related information included in the signaling information and then geometry information compressed and received by performing inter prediction between layer groups or between sub-groups may be decoded (i.e., restored). Details will be described in detail with reference to FIGS. 15 to 24 and 28 to 35.

In operation 81002 of decoding the point cloud data according to embodiments, the attribute information may be decoded (i.e., decompressed) based on the restored geometry information. According to an embodiment, the attribute information may be decoded by combining one or more of RAHT coding, LOD-based predictive transform coding, and lifting transform coding.

In the rendering operation 81003 according to embodiments, the point cloud data may be restored based on the restored (or reconstructed) geometry information and attribute information and rendered using various rendering methods. For example, points of the point cloud content may be rendered to a vertex having a constant thickness, a cube having a particular minimum size centered at a corresponding vertex position, or a circle centered at the vertex position. All or some regions of the rendered point cloud content are provided to a user via a display (e.g. a VR/AR display or a general display). Operation 81003 of rendering the point cloud data according to embodiments may be performed by the renderer 10007 of FIG. 1, the rendering 20004 of FIG. 2, or the renderer 13011 of FIG. 13.

As described above, compression (i.e. the transmission device) and the restoration (i.e. the receiving device) of the geometry information based on a similarity between the layer groups and/or between the sub-groups in an octree structure described in the present disclosure may be used for compressing and restoring the point cloud data.

The aforementioned operation according to embodiments may be performed through components of the point cloud transmitting and receiving device/method including a memory and/or a processor. The memory may store programs for processing/controlling operations according to embodiments. Each component of the point cloud transmitting and receiving device/method according to embodiments may correspond to hardware, software, a processor, and/or a combination thereof. The processor may control the various operations described in the present disclosure. The processor may be referred to as a controller or the like. The operations according to embodiments may be performed by firmware, software, and/or a combination thereof and firmware, software, and/or a combination thereof may be stored in the processor or stored in the memory. In the present embodiment, the method of compressing geometry information of point cloud data has been described, but the methods described in the specification may be applied to attribute information compression and other compression methods.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

Operations according to the embodiments described in this specification may be performed by a transmission/reception device including one or more memories and/or one or more processors according to embodiments. The one or more memories may store programs for processing/controlling the operations according to the embodiments, and the one or more processors may control various operations described in this specification. The one or more processors may be referred to as a controller or the like. In embodiments, operations may be performed by firmware, software, and/or combinations thereof. The firmware, software, and/or combinations thereof may be stored in the processor or the memory.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise. The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition. Embodiments may include variations/modifications within the scope of the claims and their equivalents. It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

Additionally, the operations according to the embodiments described in this document may be performed by transmitting and receiving devices, each of which includes a memory and/or processor, depending on the embodiments. The memory may store programs for processing and controlling the operations according to the embodiments, and the processor may control various operations described in this document. The processor may be referred to as a controller or the like. The operations according to the embodiments may be implemented by firmware, software, and/or combinations thereof, and the firmware, software, and/or combinations thereof may be stored in the processor or memory.

MODE FOR DISCLOSURE

The details have been specifically described in the best mode for the disclosure.

INDUSTRIAL APPLICABILITY

It will be apparent to those skilled in the art that various modifications and variations are possible without departing from the spirit or scope of the embodiments. Thus, it is intended that the embodiments cover the modifications and variations of the embodiments provided they come within the appended claims and their equivalents.

The invention claimed is:

1. A method of encoding point cloud data, the method comprising:

encoding the point cloud data; and transmitting the encoded point cloud data and signaling information, wherein a tree structure including the point cloud data is segmented into one or more layer group, wherein each of the one or more layer-groups includes one or more subgroups, and wherein the encoding of the point cloud data is performed in units of subgroups, wherein the signaling information includes first identification information for identifying each layer group, second identification information for identifying each subgroup, origin information for specifying an origin position of a bounding box of a subgroup identified by the first identification information and the second identification information, size information for specifying a size of the bounding box of the subgroup, first length information for specifying a length in bits of the origin information, and second length information for specifying a length in bits of the size information.

2. The method of claim 1, wherein a layer group of the one or more layer groups is a group of consecutive layers of the tree structure.

3. A device for encoding point cloud data, the device comprising:

an encoder configured to encode the point cloud data; and a transmitter configured to transmit the encoded point cloud data and signaling information, wherein a tree structure including the point cloud data is segmented into one or more layer group, wherein each of the one or more layer-groups includes one or more subgroups, wherein the encoding is performed in units of subgroups, and wherein the signaling information includes first identification information for identifying each layer group, second identification information for identifying each subgroup, origin information for specifying an origin position of a bounding box of a subgroup identified by the first identification information and the second identification information, size information for specifying a size of the bounding box of the subgroup, first length information for specifying a length in bits of the origin information, and second length information for specifying a length in bits of the size information.

4. The device of claim 3, wherein a layer group of the one or more layer groups is a group of consecutive layers of the tree structure.

5. A method of decoding point cloud data, the method comprising:

receiving the point cloud data and signaling information; and decoding the point cloud data based on the signaling information, wherein a tree structure including the point cloud data is segmented into one or more layer groups, wherein each of the one or more layer-groups includes one or more subgroups, wherein the decoding of the point cloud data is performed in units of subgroups based on the signaling information, and wherein the signaling information includes first identification information for identifying each layer group, second identification information for identifying each subgroup, origin information for specifying an origin position of a bounding box of a subgroup identified by the first identification information and the second identification information, size information for specifying a size of the bounding box of the subgroup, first length information for specifying a length in bits of the origin information, and second length information for specifying a length in bits of the size information.

6. The method of claim 5, wherein a layer group of the one or more layer groups is a group of consecutive layers of the tree structure.

7. A device for decoding point cloud data, the device comprising:

a receiver configured to the point cloud data and signaling information; and a decoder configured to decode the point cloud data based on the signaling information, wherein a tree structure including the point cloud data is segmented into one or more layer groups, wherein each of the one or more layer-groups includes one or more subgroups, wherein the decoding of the point cloud data is performed in units of subgroups based on the signaling information, and wherein the signaling information includes first identification information for identifying each layer group, second identification information for identifying each subgroup, origin information for specifying an origin position of a bounding box of a subgroup identified by the first identification information and the second identification information, size information for specifying a size of the bounding box of the subgroup, first length information for specifying a length in bits of the origin information, and second length information for specifying a length in bits of the size information.

8. The device of claim 7, wherein a layer group of the one or more layer groups is a group of consecutive layers of the tree structure.

* * * * *